(12) United States Patent
Jeong

(10) Patent No.: US 8,280,256 B2
(45) Date of Patent: Oct. 2, 2012

(54) OPTICAL HYBRID CIRCUIT, OPTICAL RECEIVER AND LIGHT RECEIVING METHOD

(75) Inventor: Seok-Hwan Jeong, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 473 days.

(21) Appl. No.: 12/647,209

(22) Filed: Dec. 24, 2009

(65) Prior Publication Data

US 2010/0166427 A1 Jul. 1, 2010

(30) Foreign Application Priority Data

Dec. 26, 2008 (JP) ................................ 2008-333753
Jun. 11, 2009 (JP) ................................ 2009-140362

(51) Int. Cl.
*H04J 14/02* (2006.01)
(52) U.S. Cl. ................ 398/82; 398/79; 398/68; 385/15; 385/27
(58) Field of Classification Search ............... 398/82, 398/79, 43, 68; 385/15, 27, 28, 31, 32, 39, 385/41, 42, 43
See application file for complete search history.

(56) References Cited

U.S. PATENT DOCUMENTS

| | | | | |
|---|---|---|---|---|
| 7,343,104 | B2 * | 3/2008 | Doerr et al. | 398/212 |
| 7,583,903 | B2 * | 9/2009 | Cuenot et al. | 398/188 |
| 7,649,678 | B2 * | 1/2010 | Hasegawa et al. | 359/325 |
| 7,715,720 | B2 * | 5/2010 | Shpantzer et al. | 398/82 |
| 2004/0071472 | A1 | 4/2004 | Ito | |

FOREIGN PATENT DOCUMENTS

JP 2004-132719 4/2004

OTHER PUBLICATIONS

D, Hoffmann et al.,"Integrated Optics Eight-Port 90° Hybrid on LiNbO3",*Journal of Lightwave Technology* vol. 7 No. 5 May 1989, 794-798.
E. C. M., Pennings et al.,"Ultracompact, All-Passive Optical 90°-Hybrid on InP Using Self-Imaging",*IEEE Photnics Technology Letters* vol. 5 No. 6 Jun. 1993, 701-703.
L. B., Soldano et al.,"Optical Multi-Mode Interference Devices Based on Self Imaging: Principles and Applications.",*Journal of Lightwave Technology* vol. 13, No. 4 Apr. 1995, 615-627.

* cited by examiner

*Primary Examiner* — M. R. Sedighian
(74) *Attorney, Agent, or Firm* — Fujitsu Patent Center

(57) ABSTRACT

An optical hybrid circuit includes a MMI coupler including a pair of input channels provided at positions symmetrical with respect to a center position in a widthwise direction thereof, a pair of first output channels outputting a pair of first optical signals having an in-phase relationship, and a pair of second output channels neighboring with each other outputting a pair of second optical signals having an in-phase relationship. The MMI coupler converts QPSK signal light or DQPSK signal light into the pair of first optical signals and the pair of second optical signals having an in-phase relationship. The optical hybrid circuit includes a 2:2 optical coupler connected to the first or the second output channels. The 2:2 optical coupler converts the pair of first optical signals or the pair of second optical signals into a pair of third optical signals having a quadrature phase relationship with the pair of first or second optical signals.

20 Claims, 51 Drawing Sheets

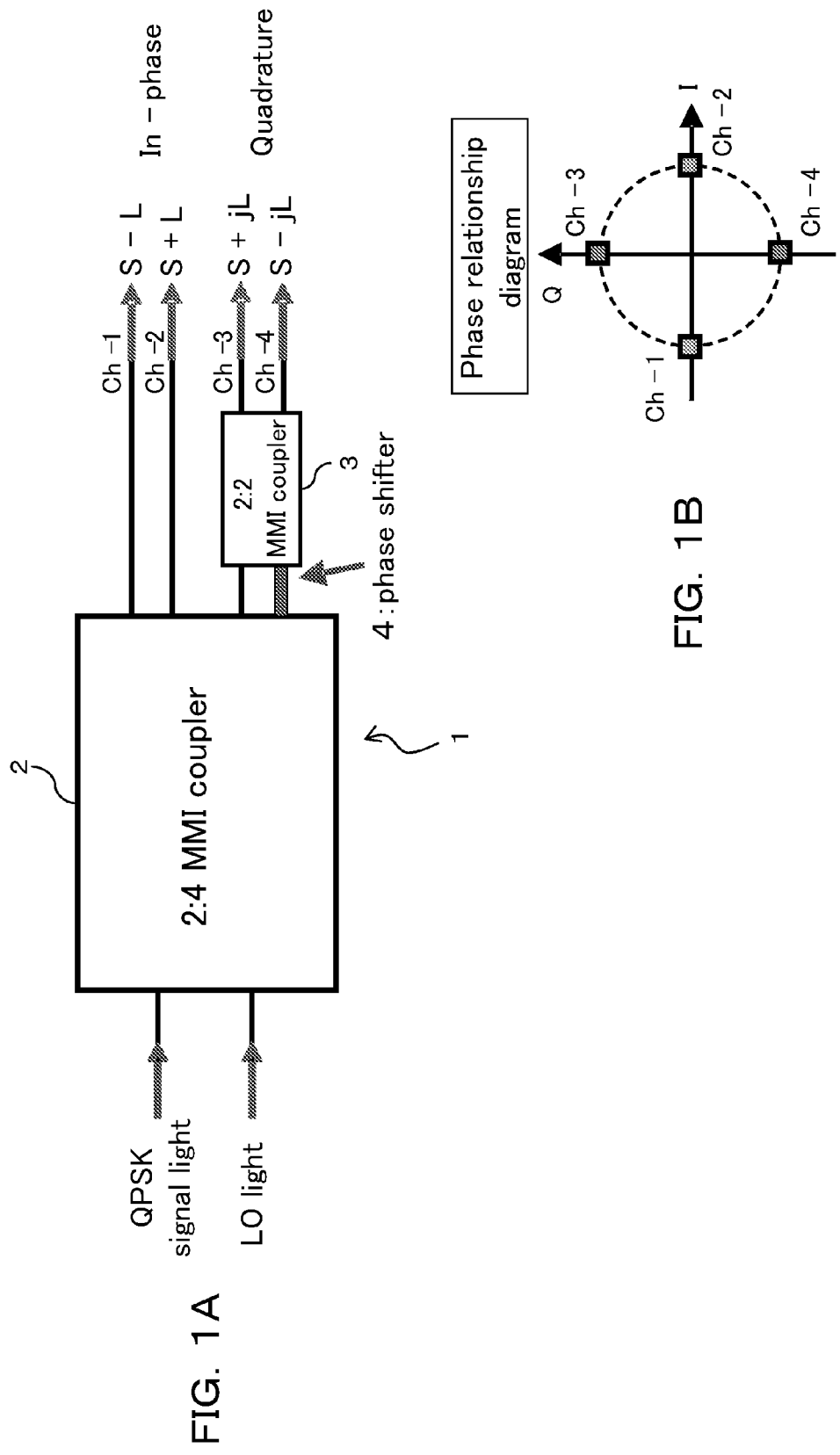

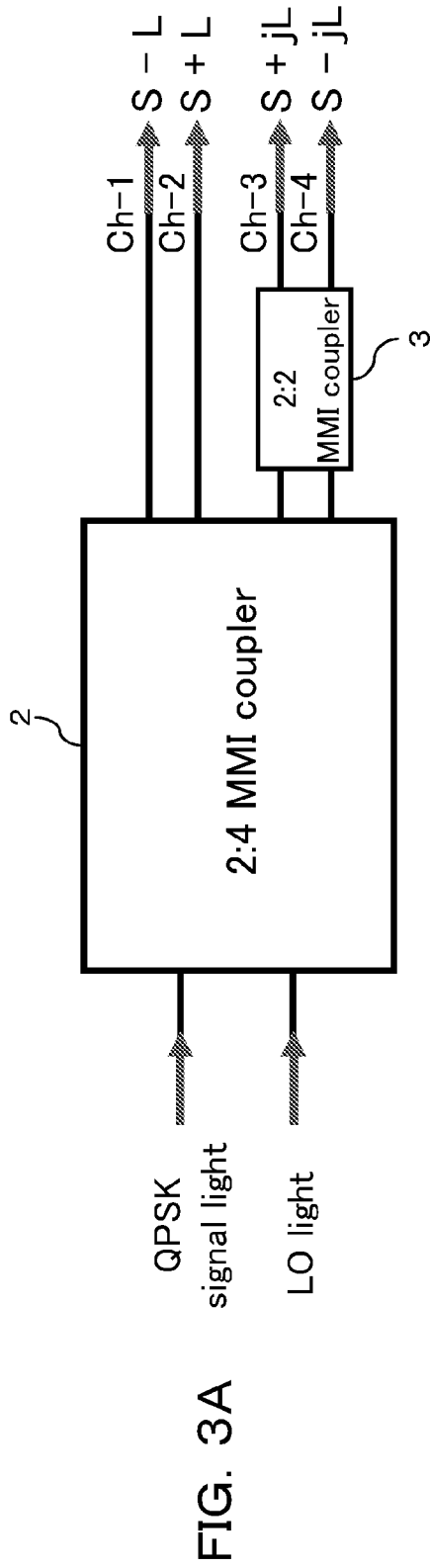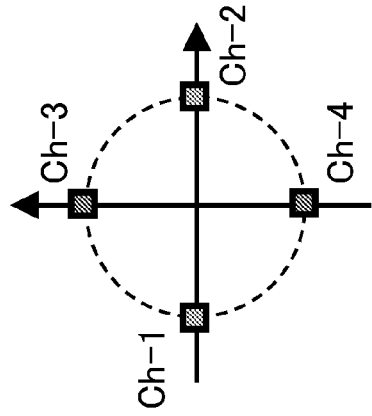
FIG. 3A
FIG. 3B

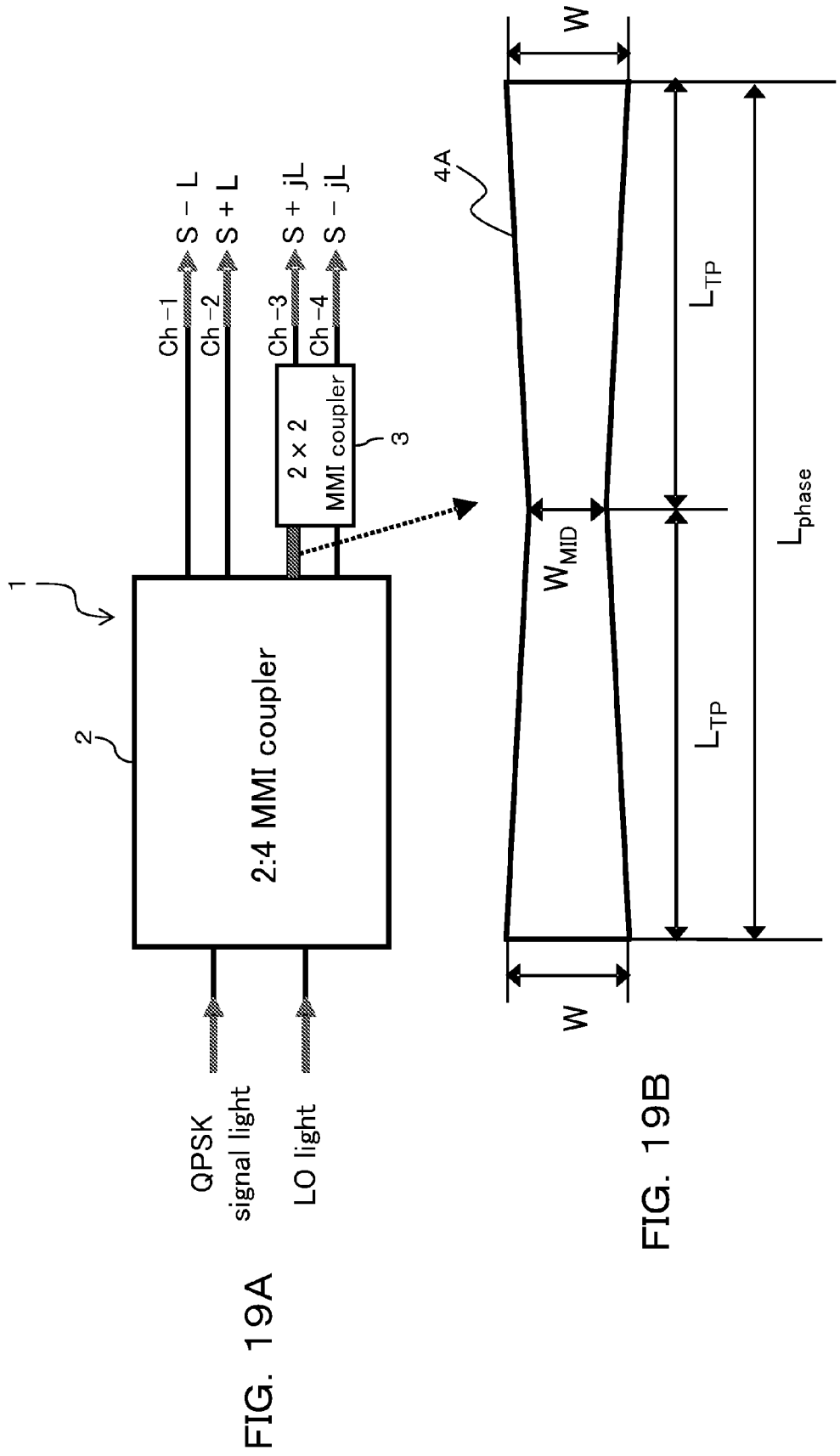

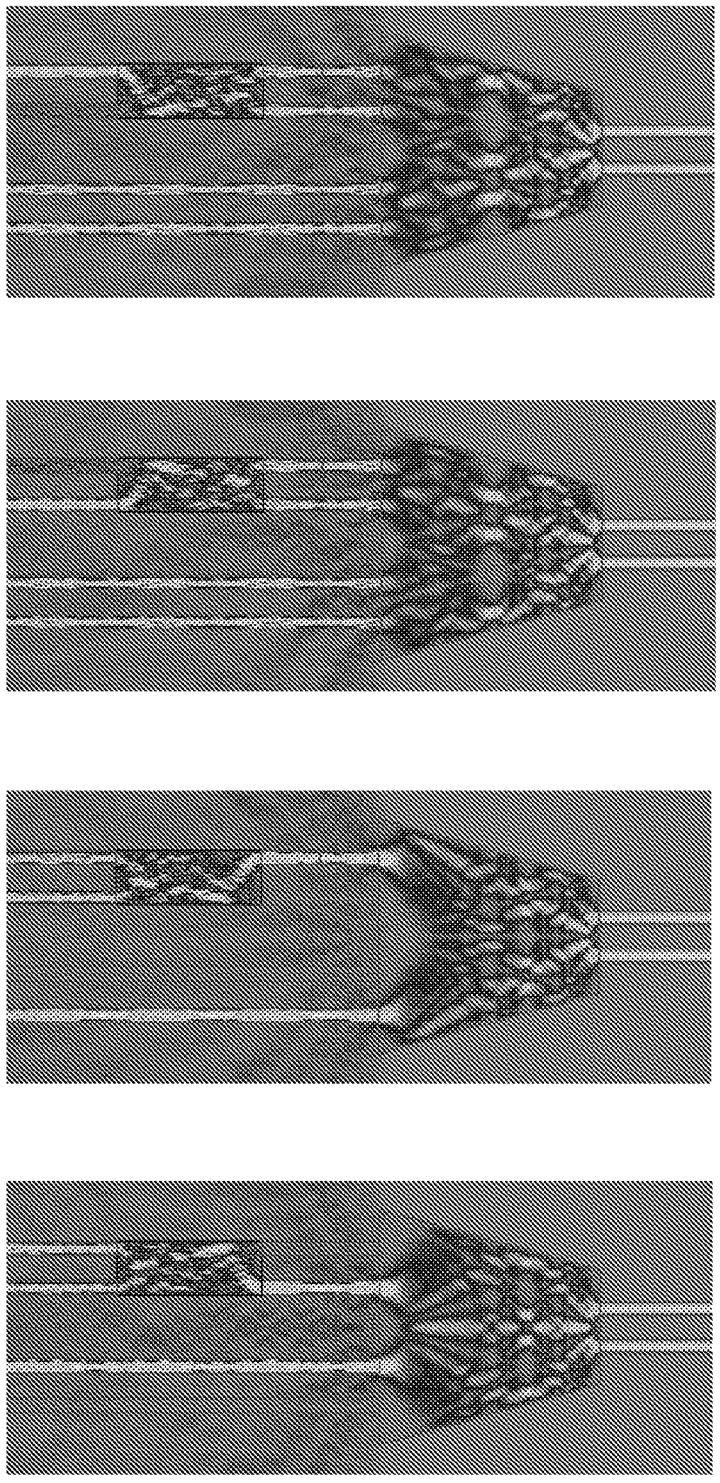

OPTICAL HYBRID CIRCUIT, OPTICAL RECEIVER AND LIGHT RECEIVING METHOD

CROSS-REFERENCE TO RELATED APPLICATIONS

This application is based upon and claims the benefit of priority of the two prior Japanese Patent Applications No. 2008-333753, filed on Dec. 26, 2008 and No. 2009-140362 filed on Jun. 11, 2009, the entire contents of which are incorporated herein by reference.

FIELD

The embodiments discussed herein are related to an optical hybrid circuit, an optical receiver and a light receiving method.

BACKGROUND

In recent years, in order to increase the transmission capacity of an optical transmission system, an optical transmission system having a high bit rate higher than 40 Gbit/s has been and is being researched and developed.

In order to cope with rapid increase of the network traffic, further increase of the bit rate is essentially required. Particularly as an optical modulation system which achieves optical transmission of 50 Gbit/s or more, a quadrature phase shift keying (QPSK) system or a differential quadrature phase shift keying (DQPSK) system is considered most promising.

In order to demodulate signal light modulated by such a QPSK system or a DQPSK system as just described, a coherent optical receiver including a 90-degree hybrid is required. Here, the 90-degree hybrid exhibits output forms (patterns) having a different branching radio depending upon the phase modulation state of QPSK signal light or DQPSK signal light and is the most important component of a coherent optical receiver.

As conditions demanded for such a 90-degree hybrid as just described, low loss, a wide band characteristic property of an operating wavelength (low wavelength dependency), a low phase displacement characteristic, compactness, a monolithic integration characteristic and so forth can be listed.

At present, 90-degree hybrids which use a bulk component are placed on the market.

FIG. 48A is a view illustrating a general configuration of a 90-degree hybrid which uses a bulk component, and FIG. 48B is a phase relationship diagram illustrating a phase relationship of optical signals outputted from the 90-degree hybrid.

It is to be noted that reference characters S−L, S+L, S+jL and S−jL in FIG. 48A indicate what relative relationship the phase of local oscillation (LO) light (L) has with reference to the phase of signal light (S). Here, S−L and S+L indicate that they have a phase relationship displaced by 180 degrees from each other, and S+jL and S−jL indicate that they have a phase relationship displaced by 90 degrees with respect to S+L and S−L, respectively. Further, the phase relationship diagram of FIG. 48B illustrates a phase relationship of optical signals outputted from the 90-degree hybrid in response to a relative phase difference between the QPSK signal light and the LO light.

As seen in FIG. 48A, QPSK signal light and LO light are inputted to two input channels of the 90-degree hybrid. Then, optical signals having an in-phase relationship with each other are outputted from a first output channel (Ch-1) and a second output channel (Ch-2) from among four output channels. Meanwhile, optical signals having a quadrature phase relationship with the optical signals having the in-phase relationship are outputted from a third output channel (Ch-3) and a fourth output channel (Ch-4) from among the four output channels of the 90-degree hybrid.

Such a 90-degree hybrid formed using a bulk component as just described has such superior characteristics as low loss, a low wavelength dependency and a low phase deviation characteristic.

Meanwhile, also a 90-degree hybrid having an optical waveguide structure which can be monolithically integrated has been and is being researched and developed.

FIGS. 49A and 50A illustrate general configurations of 90-degree hybrids based on waveguide optics, and FIGS. 49B and 50B are phase relationship diagrams illustrating phase relationships of optical signals outputted from the 90-degree hybrids of FIGS. 49A and 50A, respectively.

It is to be noted that reference characters S−L, S+L, S+jL and S−jL in each of FIGS. 49A and 50A indicate what relative relationship the phase of LO light (L) has with reference to the phase of signal light (S). Here, S−L and S+L indicate that they have a phase relationship displaced by 180 degrees from each other, and S+jL and S−jL have a phase relationship displaced by 90 degrees with respect to S+L and S−L, respectively. Further, the phase relationship diagram of each of FIGS. 49B and 50B illustrates a phase relationship of optical signals outputted from the 90-degree hybrid in response to a relative phase difference between the QPSK signal light and the LO light.

First, the 90-degree hybrid illustrated in FIG. 49A is formed from four 3-dB couplers and a 90-degree phase shifter. A phase relationship of optical signals outputted from the 90-degree hybrid formed in this manner is similar to that of the 90-degree hybrid formed using a bulk component described hereinabove as illustrated in FIG. 49B.

The 90-degree hybrid having such a configuration as described above is suitable for monolithic integration and is expected to have a low wavelength dependency and a low phase displacement characteristic.

On the other hand, the 90-degree hybrid illustrated in FIG. 50A is formed from a 4:4 multimode interference (MMI) coupler having four channels on both of the input side and the output side thereof.

Here, in order to obtain 90-degree hybrid operation using a 4:4 MMI coupler, it is necessary to select two channels at asymmetrical positions from among four channels on the input side of the 4:4 MMI coupler as input channels for inputting QPSK signal light and LO light. With such selection, a relationship of phases different from each other by 90 degrees is obtained inevitably by mode interference in the MMI region of the 4:4 MMI coupler, and therefore, the 4:4 MMI coupler can be used as a 90-degree hybrid.

The 90-degree hybrid having such a configuration as described above is suitable for monolithic integration and is superior in that it can be configured compact.

However, a phase relationship of optical signals outputted from the 90-degree hybrid just described indicates rotation by approximately 45 degrees with respect to the phase relationships [refer to FIGS. 48B and 49B] of the 90-degree hybrids illustrated in FIGS. 48A and 49A as illustrated in FIG. 50B. This is because, when two input lights interfere in mode with each other, a phase difference by 45 degrees is produced inevitably.

Meanwhile, in the case of the 90-degree hybrid illustrated in FIG. 50A, a pair of optical signals having an in-phase relationship with each other are outputted from the two outer side channels (Ch-1 and Ch-4) while a pair of optical signal having a quadrature phase relationship with the pair of optical signals having the in-phase relationship are outputted from the two inner side channels (Ch-2 and Ch-3). In short, a pair of optical signals having an in-phase relationship with each other are outputted from two output channels (Ch-1 and Ch-4) spatially spaced away from each other.

SUMMARY

According to an aspect of the embodiment, an optical hybrid circuit includes a multimode interference coupler including a pair of input channels provided at positions symmetrical with each other with respect to a center position in a widthwise direction thereof, a pair of first output channels neighboring with each other for outputting a pair of first optical signals having an in-phase relationship with each other, and a pair of second output channels neighboring with each other for outputting a pair of second optical signals having an in-phase relationship with each other, the multimode interference coupler being adapted to convert quadrature phase shift keying signal light or differential quadrature phase shift keying signal light into the pair of first optical signals having an in-phase relationship with each other and the pair of second optical signals having an in-phase relationship with each other, and a 2:2 optical coupler connected to the first output channels or the second output channels and having two channels on the input side and two channels on the output side, the 2:2 optical coupler being adapted to convert the pair of first optical signals or the pair of second optical signals into a pair of third optical signals having a quadrature phase relationship with the pair of first or second optical signals.

According to another aspect of the embodiment, an optical hybrid circuit includes a multimode interference coupler including a pair of input channels provided at positions symmetrical with each other with respect to a center position in a widthwise direction thereof, a pair of first output channels neighboring with each other for outputting a pair of first optical signals having an in-phase relationship with each other, and a pair of second output channels neighboring with each other for outputting a pair of second optical signals having an in-phase relationship with each other, the multimode interference coupler being adapted to convert quadrature phase shift keying signal light or differential quadrature phase shift keying signal light into the pair of first optical signals having an in-phase relationship with each other and the pair of second optical signals having an in-phase relationship with each other, and a 2:2 optical coupler connected to the first output channels or the second output channels and having two channels on the input side and two channels on the output side, the 2:2 optical coupler being adapted to convert the pair of first optical signals or the pair of second optical signals into a pair of third optical signals having a quadrature phase relationship with the pair of first or second optical signals, the multimode interference coupler having an input end of a first width and an output end of a second width different from the first width such that a phase difference between the pair of first optical signals or a phase difference between the pair of second optical signals becomes equal to $\pi/2+p*\pi$, p being an integer.

According to a further aspect of the embodiment, an optical receiver includes a multimode interference coupler including a pair of input channels provided at positions symmetrical with each other with respect to a center position in a widthwise direction thereof, a pair of first output channels neighboring with each other for outputting a pair of first optical signals having an in-phase relationship with each other, and a pair of second output channels neighboring with each other for outputting a pair of second optical signals having an in-phase relationship with each other, the multimode interference coupler being adapted to convert quadrature phase shift keying signal light or differential quadrature phase shift keying signal light into the pair of first optical signals having an in-phase relationship with each other and the pair of second optical signals having an in-phase relationship with each other, and a 2:2 optical coupler connected to the first output channels or the second output channels and having two channels on the input side and two channels on the output side, the 2:2 optical coupler being adapted to convert the pair of first optical signals or the pair of second optical signals into a pair of third optical signals having a quadrature phase relationship with the pair of first or second optical signals, a photodiode adapted to convert the first optical signals or the second optical signals outputted from the multimode interference coupler and the third optical signals outputted from the 2:2 optical coupler into an analog electric signal, an analog-digital conversion circuit adapted to convert the analog electric signal outputted from the photodiode into a digital electric signal, and a digital arithmetic circuit adapted to execute a arithmetic processing using the digital electric signal outputted from the analog-digital conversion circuit.

According to a still further aspect of the embodiment, an optical receiver includes an optical hybrid circuit including a multimode interference coupler including a pair of input channels provided at positions symmetrical with each other with respect to a center position in a widthwise direction thereof, a pair of first output channels neighboring with each other for outputting a pair of first optical signals having an in-phase relationship with each other, and a pair of second output channels neighboring with each other for outputting a pair of second optical signals having an in-phase relationship with each other, the multimode interference coupler being adapted to convert quadrature phase shift keying signal light or differential quadrature phase shift keying signal light into the pair of first optical signals having an in-phase relationship with each other and the pair of second optical signals having an in-phase relationship with each other, and a 2:2 optical coupler connected to the first output channels or the second output channels and having two channels on the input side and two channels on the output side, the 2:2 optical coupler being adapted to convert the pair of first optical signals or the pair of second optical signals into a pair of third optical signals having a quadrature phase relationship with the pair of first or second optical signals, the multimode interference coupler having an input end of a first width and an output end of a second width different from the first width such that a phase difference between the pair of first optical signals or a phase difference between the pair of second optical signals becomes equal to $\pi/2+p*\pi$, p being an integer, a photodiode adapted to convert the first optical signals or the second optical signals outputted from the multimode interference coupler and the third optical signals outputted from the 2:2 optical coupler into an analog electric signal, an analog-digital conversion circuit adapted to convert the analog electric signal outputted from the photodiode into a digital electric signal, and a digital arithmetic circuit adapted to execute arithmetic processing using the digital electric signal outputted from the analog-digital conversion circuit.

According to a yet further aspect of the embodiment, a light receiving method includes converting, using a multimode interference coupler including a pair of input channels provided at positions symmetrical with each other with respect to a center position in a widthwise direction thereof, a pair of first output channels neighboring with each other for outputting a pair of first optical signals having an in-phase relationship with each other, and a pair of second output channels neighboring with each other for outputting a pair of second optical signals having an in-phase relationship with each other, quadrature phase shift keying signal light or differential quadrature phase shift keying signal light into the pair of first optical signals having an in-phase relationship with each other and the pair of second optical signals having an in-phase relationship with each other, converting, using a 2:2 optical coupler connected to the first output channels or the second output channels and having two channels on the input side and two channels on the output side, the pair of first optical signals or the pair of second optical signals into a pair of third optical signals having a quadrature phase relationship with the pair of first or second optical signals, and receiving the first optical signals or the second optical signals and the third optical signals.

According to a yet further aspect of the embodiment, a light receiving method includes converting, using a multimode interference coupler including a pair of input channels provided at positions symmetrical with each other with respect to a center position in a widthwise direction thereof, a pair of first output channels neighboring with each other for outputting a pair of first optical signals having an in-phase relationship with each other, and a pair of second output channels neighboring with each other for outputting a pair of second optical signals having an in-phase relationship with each other, quadrature phase shift keying signal light or differential quadrature phase shift keying signal light into the pair of first optical signals having an in-phase relationship with each other and the pair of second optical signals having an in-phase relationship with each other, converting, using a 2:2 optical coupler connected to the first output channels or the second output channels and having two channels on the input side and two channels on the output side, the pair of first optical signals or the pair of second optical signals into a pair of third optical signals having a quadrature phase relationship with the pair of first or second optical signals, receiving the first optical signals or the second optical signals and the third optical signals, the multimode interference coupler having an input end of a first width and an output end of a second width different from the first width such that a phase difference between the pair of first optical signals or a phase difference between the pair of second optical signals becomes equal to $\pi/2 + p^*\pi$, p being an integer.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1A is a schematic view illustrating a configuration of an optical hybrid circuit according to a first embodiment, and FIG. 1B is a phase relationship diagram illustrating a phase relationship of lights outputted from each of channels of the optical hybrid circuit illustrated in FIG. 1A;

FIG. 3A is a schematic view illustrating operation by the 2:4 MMI coupler and a 2:2 MMI coupler which compose the optical hybrid circuit according to the first embodiment, and FIG. 3B is a phase relationship diagram illustrating a phase relationship of lights outputted from each of channels of the 2:4 MMI coupler and the 2:2 MMI coupler illustrated in FIG. 3A;

FIGS. 9A to 9D are views illustrating input-output characteristics where QPSK signal light (Signal) and LO light are inputted to the optical semiconductor device which composes the optical hybrid circuit according to the first embodiment, and wherein FIG. 9A illustrates an input-output characteristic where $\Delta\phi=0$, FIG. 9B illustrates an input-output characteristic where $\Delta\phi=\pi$, FIG. 9C illustrates an input-output characteristic where $\Delta\phi=-\pi/2$, and FIG. 9D illustrates an input-output characteristic where $\Delta\phi=\pi/2$;

FIGS. 19A and 19B are schematic views illustrating a configuration of an optical hybrid apparatus according to a still further modification to the first embodiment;

FIGS. 26A to 26D are views illustrating input-output characteristics where the QPSK signal light (Signal) and the LO light are inputted to the optical semiconductor device which composes the optical hybrid circuit according to the second embodiment, and wherein FIG. 26A illustrates an input-output characteristic where $\Delta\phi=0$, FIG. 26B illustrates an input-output characteristic where $\Delta\phi=\pi$, FIG. 26C illustrates an input-output characteristic where $\Delta\phi=-\pi/2$, and FIG. 26D illustrates an input-output characteristic where $\Delta\phi=\pi/2$;

FIGS. 33A to 33D are views illustrating input-output characteristics where the QPSK signal light (Signal) and the LO light are inputted to the optical semiconductor device which composes the optical hybrid circuit according to the different modification to the second embodiment, and wherein FIG. 33A illustrates an input-output characteristic where $\Delta\phi=0$, FIG. 33B illustrates an input-output characteristic where $\Delta\phi=\pi$, FIG. 33C illustrates an input-output characteristic where $\Delta\phi=-\pi/2$, and FIG. 33D illustrates an input-output characteristic where $\Delta\phi=\pi/2$;

DESCRIPTION OF EMBODIMENTS

Figures 48A, 48B:
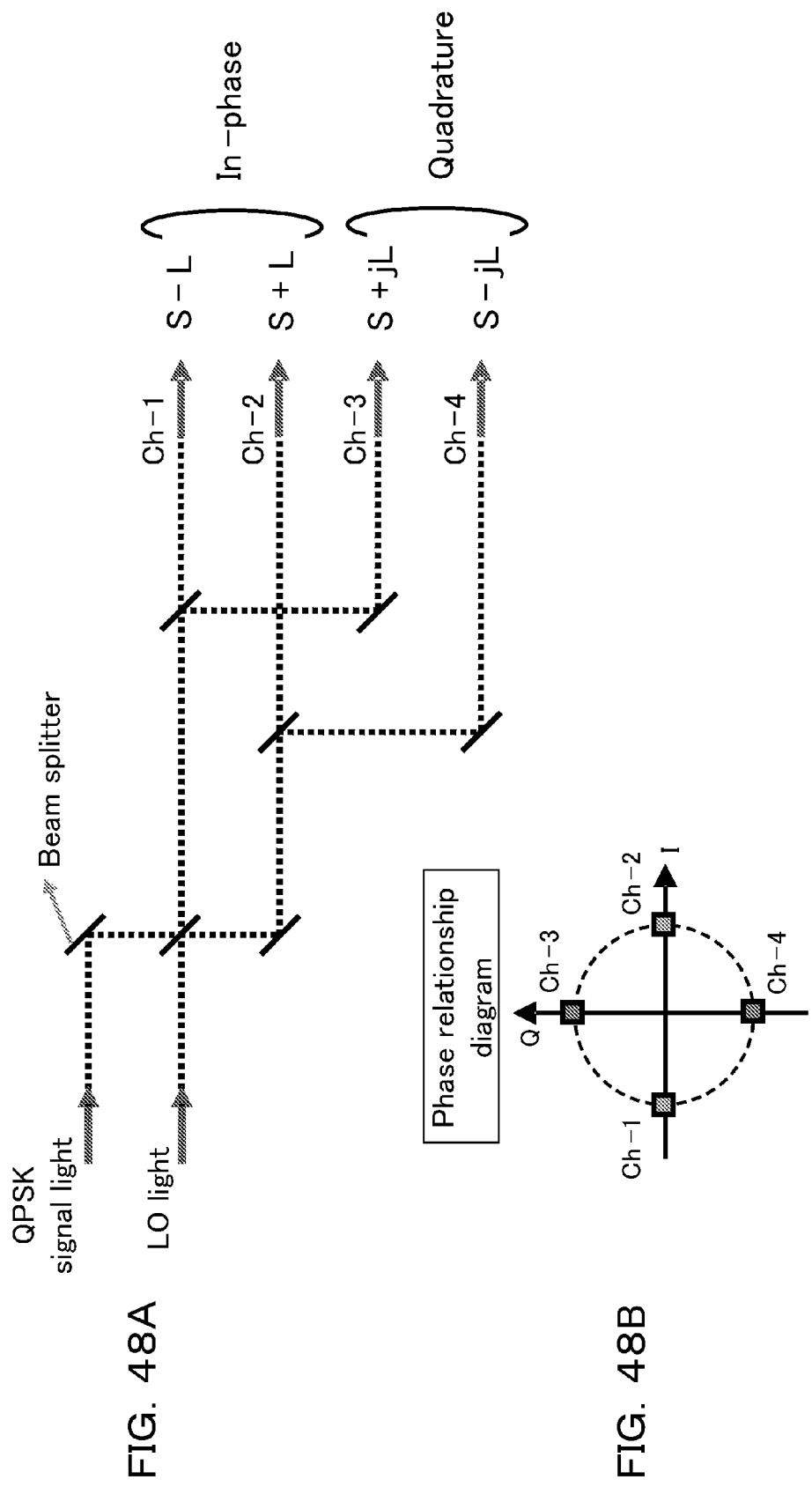
FIG. 48A is a schematic view illustrating a configuration of a conventional 90-degree hybrid based on bulk optics and FIG. 48B is a phase relationship diagram illustrating a phase relationship of lights outputted from each of channels of the 90-degree hybrid illustrated in FIG. 48A.

Since the 90-degree hybrid described hereinabove with reference to FIG. 48A uses a bulk component, it has such demerits that it is not suitable for monolithic integration, that it lacks compactness and that it is high in cost.

Figure 49A:
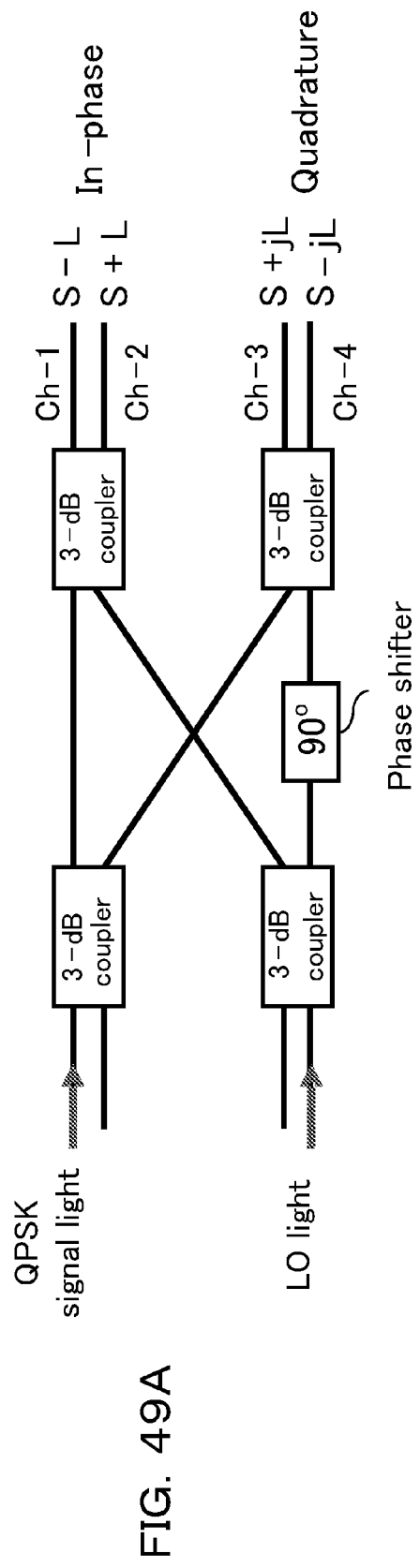
FIG. 49A is a schematic view illustrating a configuration of a 90-degree hybrid which uses four 3-dB couplers and a phase shifter and FIG. 49B is a phase relationship diagram illustrating a phase relationship of lights outputted from each of channels of the 90-degree hybrid illustrated in FIG. 49A.
Figure 49B:
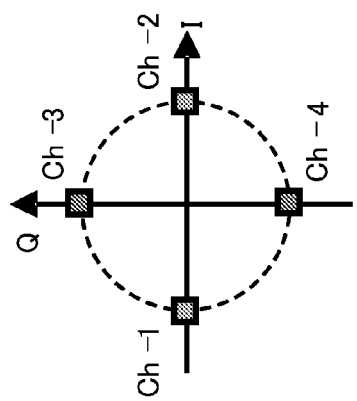

Meanwhile, since the 90-degree described hereinabove with reference to FIG. 49A requires four 3-dB couplers and a phase shifter, it includes many components and has a demerit that it is complicated in configuration. Further, since it includes without fail a region in which optical waveguides intersect with each other, it has another demerit that it involves excessive loss in the intersecting region.

Further, the 90-degree hybrid described hereinabove with reference to FIG. 50A has a demerit that it exhibits a conspicuous wavelength dependency in comparison with the 90-degree hybrid described hereinabove with reference to FIG. 49A. In other words, the 90-degree hybrid described hereinabove with reference to FIG. 50A has a demerit that it has a comparatively high wavelength dependency.

Figures 50A, 50B:
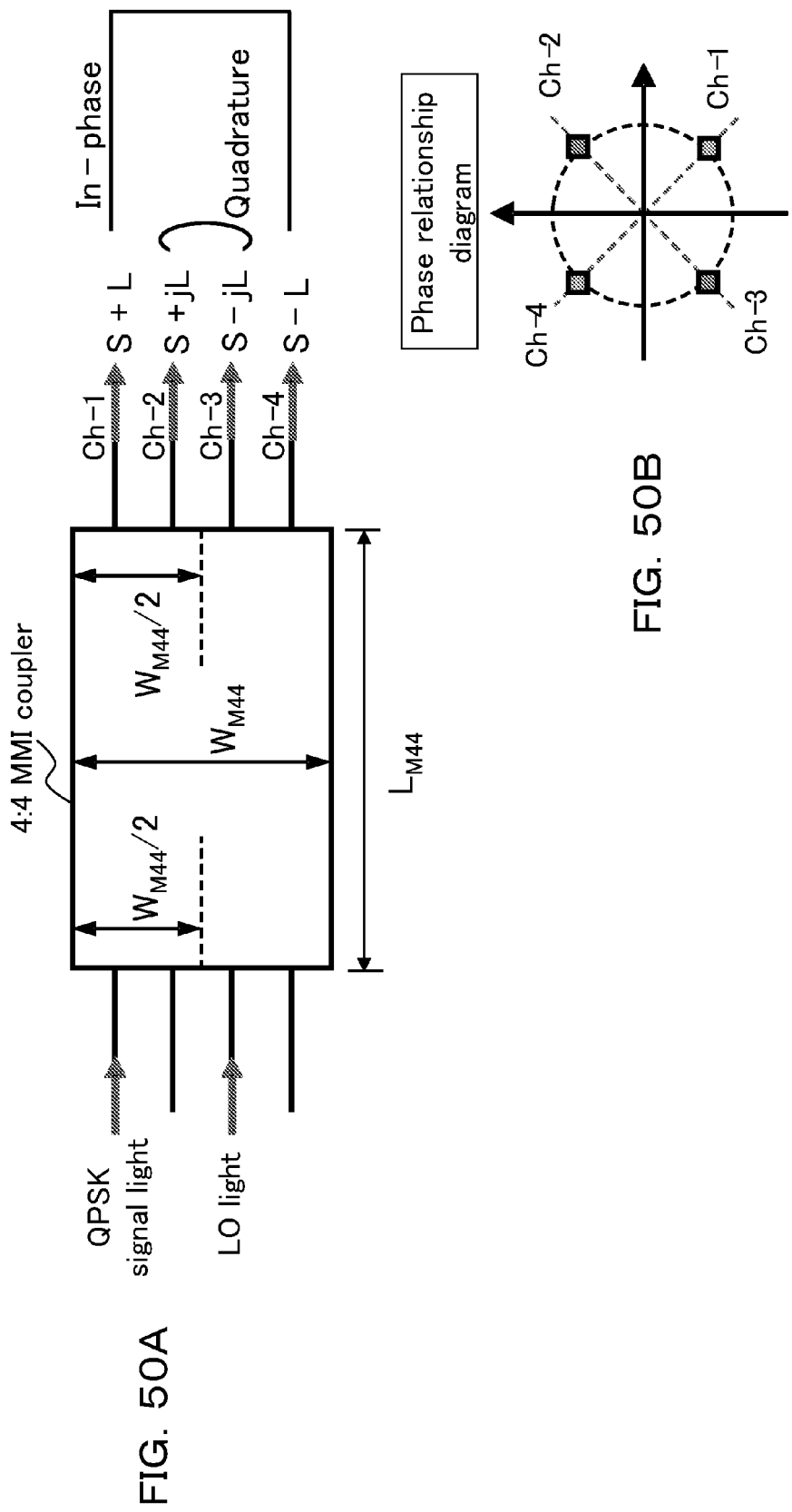
FIG. 50A is a schematic view illustrating a configuration of a 90-degree hybrid which uses a 4:4 MMI coupler
FIG. 50B is a phase relationship diagram illustrating a phase relationship of lights outputted from each of channels of the 90-degree hybrid illustrated in FIG. 50A.
Figure 51:
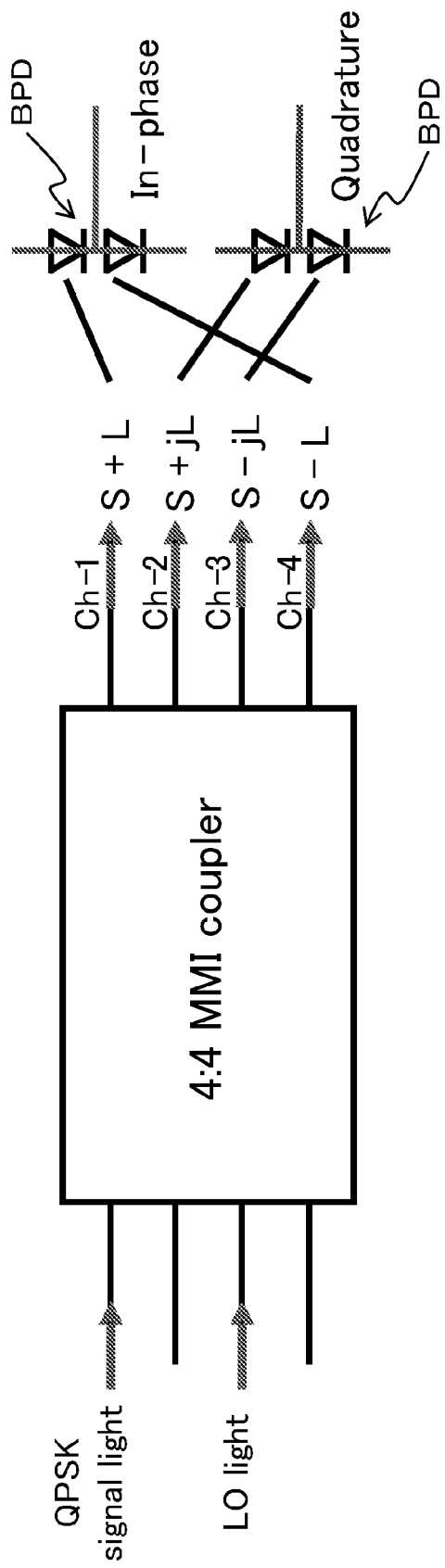
FIG. 51 is a schematic view illustrating a connection relationship between the 90-degree hybrid illustrated in FIG. 50A and photodiodes.

Further, in the 90-degree hybrid described hereinabove with reference to FIG. 50A, where the output channels thereof and balanced photodiodes (BPD) are connected to each other to carry out optoelectronic conversion, optical waveguides for connecting them intersect with each other as illustrated in FIG. 51. Therefore, the 90-degree hybrid described hereinabove with reference to FIG. 50A has demerits also that it gives rise to excessive loss in the intersecting region and that it is poor in compatibility with a 90-degree hybrid used in coherent optical receivers and so forth at present.

In particular, optical signals outputted from a 90-degree hybrid are normally detected by BPDs as illustrated in FIG. 51 in order to carry out photoelectric conversion.

In the case of the 90-degree hybrid described hereinabove with reference to FIG. 50A, it is necessary to connect two output channels (Ch-1 and Ch-4) from which a pair of optical signals having an in-phase relationship with each other are outputted to one BPD and connect two output channels (Ch-2 and Ch-3) from which a pair of optical signals having a quadrature phase relationship with the pair of optical signals having the in-phase relationship are outputted to the other BPD.

However, in the 90-degree hybrid described hereinabove with reference to FIG. 50A, a pair of optical signals having an in-phase relationship with each other are outputted from two output channels (Ch-1 and Ch-4) which are spatially spaced away from each other. Therefore, as illustrated in FIG. 51, optical waveguides which connect the two output channels (Ch-1 and Ch-4) and one BPD to each other and optical waveguides which connect the other two output channels (Ch-2 and Ch-3) and the other BPD inevitably intersect with each other. Accordingly, the 90-degree hybrid described hereinabove with reference to FIG. 50A has a demerit that excessive loss occurs in the intersecting region of the optical waveguides, which gives rise to deterioration of the reception efficiency.

Also it seems a possible idea to connect output channels and BPDs such that an intersecting region does not appear while an electric wiring scheme of the BPDs is adjusted. Any schemes intersecting the electrodes are not preferred due to the reason of complicating the fabrication processes, as well as the reason of the electrode capacitance.

Therefore, it is desired to implement an optical hybrid circuit, an optical receiver and a light receiving method which have a low wavelength dependency, a low phase displacement characteristic and low insertion loss and are suitable for compactness and monolithic integration.

In the following, an optical hybrid circuit, an optical receiver and an optical transceiver and a light receiving method according to embodiments are described with reference to the drawings.

First Embodiment

First, an optical hybrid circuit according to a first embodiment is described with reference to FIGS. 1A to 15B.

The optical hybrid circuit according to the present embodiment is a 90-degree hybrid circuit (hereinafter referred to as 90-degree hybrid) used for identification (demodulation) of phase modulation information of a quadrature phase shift keying (QPSK) signal in an optical transmission system (optical communication system).

In the present embodiment, as illustrated in FIG. 1A, the optical hybrid circuit 1 includes a multimode interference (MMI) coupler 2 at a preceding stage and an optical coupler 3 at a succeeding stage, which are connected in cascade connection to each other. The optical hybrid circuit 1 is configured from an optical semiconductor device which includes the MMI coupler 2 and the optical coupler 3 and has a semiconductor waveguide structure.

Here, the MMI coupler 2 at the preceding stage is a 2:4 MMI coupler which has two channels on the input side and has four channels on the output side thereof.

More particularly, the MMI coupler 2 is a 2:4 MMI coupler based on paired interference (PI). In other words, the MMI coupler 2 is a 2:4 MMI coupler wherein the centers of the two input channels are positioned at ⅓ and ⅔ from the upper side of the MMI width (refer to FIG. 6) and higher-order modes of the (3s−1)th order (s is a natural number equal to or greater than 1) is not excited in the MMI region. Therefore, the device length can be reduced.

It is to be noted that, while a 2:4 MMI coupler based on PI is used here, the MMI coupler 2 is not limited to this, but a 2:4 MMI coupler may be used which has a structure having a center symmetric property such that a pair of input channels are provided at symmetrical positions with respect to the center portion in the widthwise direction. For example, a 2:4 MMI coupler based on general mode interference (GI: General Interference). In other words, a 2:4 MMI coupler may be used wherein the centers of the two input channels are positioned within regions except the positions of ⅓ and ⅔ of the MMI width within a range within which the center symmetrical property of the MMI region is not lost and all modes according to the MMI width are excited.

The optical coupler 3 at the succeeding stage is a 2:2 optical coupler which has two channels on the input side thereof and has two channels on the output side thereof and has a function of delaying the phase of light, which propagates from the two input channels toward the two output channels positioned on diagonal lines, by 90 degrees.

In particular, the optical coupler 3 is a 2:2 MMI coupler. Here, the 2:2 MMI coupler 3 is connected to the two channels on the output side of the 2:4 MMI coupler 2 which are positioned on the third and the fourth from above (in other words, to a pair of second output channels neighboring with each other). It is to be noted that the 2:2 MMI coupler 3 may be based on PI or on GI.

Therefore, the optical hybrid circuit 1 has two channels on the input side and has four channels (Ch-1, Ch-2, Ch-3 and Ch-4) on the output side thereof.

To one of the channels on the input side of the optical hybrid circuit 1, that is, to one of the channels of the input side of the 2:4 MMI coupler 2, QPSK signal light is inputted. In other words, one of the channels on the input side of the optical hybrid circuit 1 is an input channel for inputting QPSK signal light. Meanwhile, to the other channel on the input side of the optical hybrid circuit 1, that is, to the other channel on the input side of the 2:4 MMI coupler 2, local oscillation (LO) light is inputted. In other words, the other channel on the input side of the optical hybrid circuit 1 is an input channel for inputting LO light.

Figure 2A:
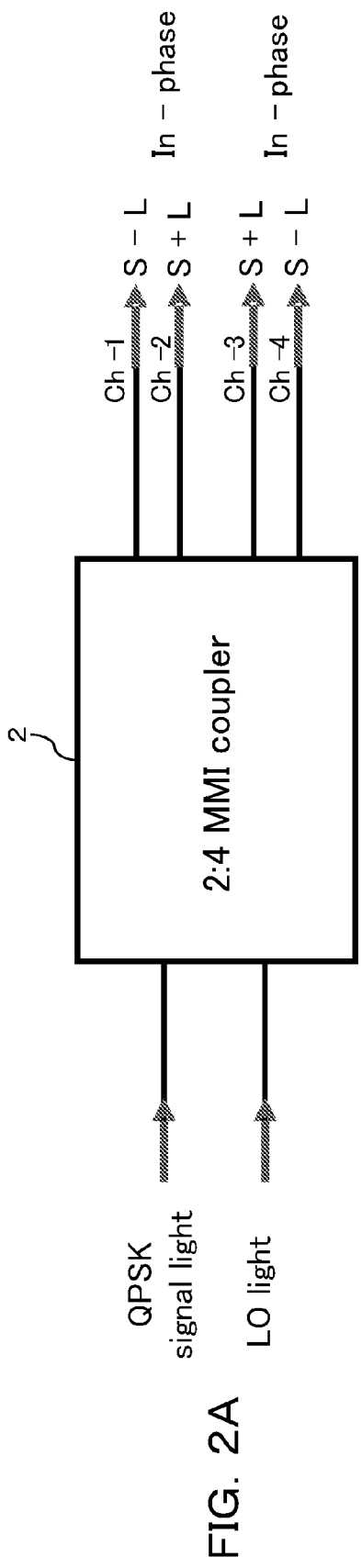
FIG. 2A is a schematic view illustrating action by a 2:4 MMI coupler which composes the optical hybrid circuit according to the first embodiment.
Figure 2B:
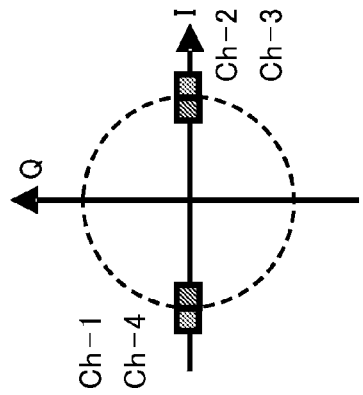
FIG. 2B is a phase relationship diagram illustrating a phase relationship of lights outputted from each of channels of the 2:4 MMI coupler shown in FIG. 2A.

Then, as illustrated in FIG. 2A and FIG. 2B, the 2:4 MMI coupler 2 converts the QPSK signal light into a pair of first optical signals having an in-phase relationship with each other and a pair of second optical signals having an in-phase relationship with each other. In particular, the QPSK signal light is converted into a pair of first optical signals which do not include a quadrature phase component (Q-component) but include only an in-phase component (I-component) and a pair of second optical signals which do not include a quadrature phase component (Q-component) but include only an in-phase component (I-component).

It is to be noted that S−L and S+L in FIG. 2A illustrate what relationship the phase of the LO light (L) has relatively with reference to the phase of the signal light (S). Here, it is illustrated that S−L and S+L have a phase relationship displaced by 180 degrees from each other. Meanwhile, the phase relationship diagram of FIG. 2B illustrates a phase relationship of optical signals outputted in response to the relative phase difference between the QPSK signal light and the LO light.

Here, the pair of first optical signals are outputted from the two channels on the output side of the 2:4 MMI coupler 2 which are positioned on the first and the second from above (in other words, a pair of first output channels neighboring with each other), that is, from the two channels (Ch-1 and Ch-2) on the output side of the optical hybrid circuit 1 which are positioned on the first and the second from above. Meanwhile, the pair of second optical signals are outputted from the two channels on the output side of the 2:4 MMI coupler 2 which are positioned on the third and the fourth from above (in other words, a pair of second output channels neighboring with each other), and inputted to the two channels on the input side of the 2:2 MMI coupler 3 which are positioned on the first and the second from above.

Then, as illustrated in FIGS. 3A and 3B, the pair of second optical signals are converted into a pair of third optical signals having a quadrature phase relationship with the pair of first optical signals by the 2:2 MMI coupler 3. In other words, the pair of second optical signals which include only an in-phase component (I-component) are converted into a pair of third optical signals which include only a quadrature phase components (Q-component).

Then, the pair of third optical signals are outputted from the two channels on the output side of the 2:2 MMI coupler 3 which are positioned on the first and second from above, that is, from the two channels (Ch-3 and Ch-4) on the output side of the optical hybrid circuit 1 which are positioned on the third and the fourth from above.

The optical hybrid circuit 1 having such a configuration as described above outputs a pair of first optical signals (S−L and S+L) having an in-phase relationship with each other and a pair of third optical signal (S−jL and S+jL) having a quadrature phase relationship with the pair of first optical signals as illustrated in FIGS. 3A and 3B.

It is to be noted that reference characters S−L, S+L, S+jL and S−jL in FIG. 3A indicate what relative relationship the phase of the LO light (L) has with reference to the phase of the signal light (S). Here, S−L and S+L indicate that they have a phase relationship displaced by 180 degrees from each other, and S+jL and S−jL indicate that they have a phase relationship displaced by 90 degrees with respect to S+L and S−L, respectively. Further, the phase relationship diagram of FIG. 3B illustrates a phase relationship of optical signals outputted from the 90-degree hybrid in response to a relative phase difference between the QPSK signal light and the LO light.

In this manner, the output intensity ratio of the signal lights outputted from the four output channels (Ch-1, Ch-2, Ch-3 and Ch-4) of the optical hybrid circuit 1 differs depending upon the phase $(0, \pi, -\pi/2 \text{ and } +\pi/2)$ of the QPSK signal light.

The reason why the QPSK signal light is converted into first optical signals having an in-phase relationship with each other and second optical signals having an in-phase relationship with each other by the 2:4 MMI coupler 2 and then the second optical signals are converted into third optical signals having a quadrature phase relationship with the first optical signals by the 2:2 MMI coupler 3 as described above is such as follows.

If QPSK signal light and LO light are inputted to the 2:4 MMI coupler 2 as illustrated in FIG. 2A, then a pair of first optical signals having an in-phase relationship with each other are outputted from two channels of the 2:4 MMI coupler 2 and a pair of second optical signals having an in-phase relationship with each other are outputted from the other two channels of the 2:4 MMI coupler 2.

Where the relative phase difference Δφ between the QPSK signal and the LO light is 0 and π, the intensity ratio among the four output components (output intensity ratio) is 0:2:2:0 and 2:0:0:2, respectively. In other words, where the relative phase difference Δφ is 0 and π, output forms having different branching ratios from each other can be obtained.

However, in both of the cases wherein the relative phase difference Δφ is −π/2 and +π/2, the output intensity ratio is 1:1:1:1. In other words, where the relative phase difference Δφ is −π/2 and +π/2, an output form having an equal branching ratio is exhibited.

Therefore, as illustrated in the phase relationship diagram of FIG. 2B, the optical hybrid circuit 1 does not function as a 90-degree hybrid although it functions as a 180-degree hybrid. Where a 2:4 MMI coupler having a center symmetric property, for example, like a 2:4 MMI coupler which is based on PI, it is impossible in principle to cause the 2:4 MMI coupler to operate as a 90-degree hybrid.

Therefore, the 2:2 MMI coupler 3 is connected in cascade connection to the 2:4 MMI coupler 2 having a structure having a center symmetric property as illustrated in FIG. 3A to form a structure having an asymmetric property so that the optical hybrid circuit 1 can function as a 90-degree hybrid.

In particular, the 2:2 MMI coupler 3 is connected in cascade connection to the third and fourth output channels of the 2:4 MMI coupler 2 so that only output components of the third and fourth output channels of the 2:4 MMI coupler 2 are subject to new phase shift together with a coupling action when they propagate in the 2:2 MMI coupler 3. Here, by the provision of the 2:2 MMI coupler 3, output forms having different branching ratios can be obtained also where the relative phase difference Δφ is −π/2 and +π/2 as illustrated in the phase relationship diagram of FIG. 3B. It is to be noted that a similar characteristic can be obtained with the 2:2 MMI coupler 3 only if it is based on GI or PI.

Consequently, the optical hybrid circuit 1 outputs a pair of first optical signals (S−L, S+L) having an in-phase relationship with each other and a pair of third optical signals (S−jL, S+jL) having a quadrature phase relationship with the pair of first optical signals as illustrated in FIG. 3A.

Figure 4:
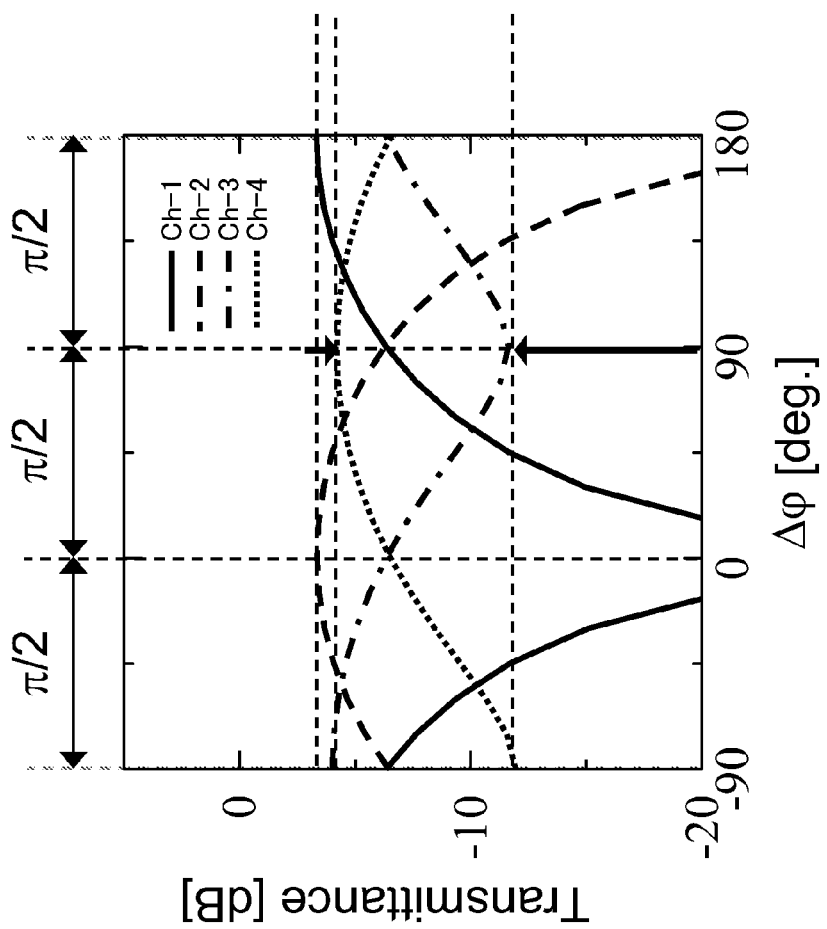
FIG. 4 is a view illustrating a subject of the optical hybrid circuit having such a configuration as illustrated in FIG. 3A and illustrating a relative output intensity (Transmittance) of the 90-degree hybrid with respect to $\Delta\phi$.

Here, FIG. 4 is a result of plotting of the output intensity ratio (relative output intensity; transmittance) with respect to the relative phase difference Δφ of the optical hybrid circuit having such a configuration as illustrated in FIG. 3A.

If the output intensity ratio to the relative phase difference Δφ is converted into a linear value and compared, then it becomes 0:2:1:1 (Δφ=0), 2:0:1:1 (Δφ=n), 1:1:1.7:0.3 (Δφ=−π/2) and 1:1:0.3:1.7 (Δφ=+π/2) as illustrated in FIG. 4. In particular, in comparison with where the relative phase difference Δφ is 0 or n, where the relative phase difference Δφ is −π/2 or π/2, the branching ratios of the third and fourth output channels have a tendency that a high output component of the optical output power decreases and a low output component of the optical output power increases. Therefore, crosstalk appears, and the characteristic deteriorates. However, where the relative phase difference Δφ is 0, n, −π/2 and +π/2, since output forms having different branching ratios are obtained (that is, since a phase condition for a 90-degree hybrid is satisfied), the optical hybrid circuit 1 functions as a 90-degree hybrid.

Incidentally, if the optical hybrid circuit 1 is configured in such a manner as illustrated in FIG. 3A, then where the relative phase difference Δφ is −π/2 or +π/2, it is estimated that the characteristic may deteriorate with output components of the third and fourth output channels. This arises from the fact that a phase matching is not satisfied between the output signals of the third and fourth output channels of the 2:4 MMI coupler 2 and the 2:2 MMI coupler 3.

In order to prevent such deterioration of the characteristic so that 90-degree hybrid operation can be obtained with certainty, it is essentially required to establish a phase matching between the output signals of the third and fourth output channels of the 2:4 MMI coupler 2 and the 2:2 MMI coupler 3.

In particular, if the phase of light (a pair of second optical signals) outputted from one (or both) of the third and fourth output channels of the 2:4 MMI coupler 2 is controlled so that the relative phase difference Δφ between a pair of second optical signals becomes π/2+p*π (p is an integer), then deterioration of the characteristic disappears.

Therefore, in the present embodiment, a phase controlling region within which the phase can be controlled so that characteristic deterioration of a quadrature phase component may not occur is provided between the 2:4 MMI coupler 2 and the 2:2 MMI coupler 3. In particular, the phase of light (a pair of second optical signals) outputted from one (or both) of the third and fourth output channels of the 2:4 MMI coupler 2 may be controlled by a phase controlling region 4 so that the phase difference between the lights to be inputted to the two channels on the input side of the 2:2 MMI coupler 3 may be 90 degrees. It is to be noted that the phase controlling region 4 may be configured as a region for controlling the phase so that the phase difference between a pair of second optical signals may be π/2+p*π (p is an integer).

Here, as illustrated in FIG. 1A, a phase shifter 4 is provided in the phase controlling region. The phase shifter 4 is formed by varying the width of the optical waveguide, which connects the fourth channel on the output side of the 2:4 MMI coupler 2 and the second channel on the input side of the 2:2 MMI coupler 3 to each other, in a tapered manner. In particular, the waveguide type phase shifter 4 which has a width varying in a tapered manner is provided for one of the pair of output channels of the 2:4 MMI coupler 2 to which the 2:2 MMI coupler 3 is connected.

Figure 8:
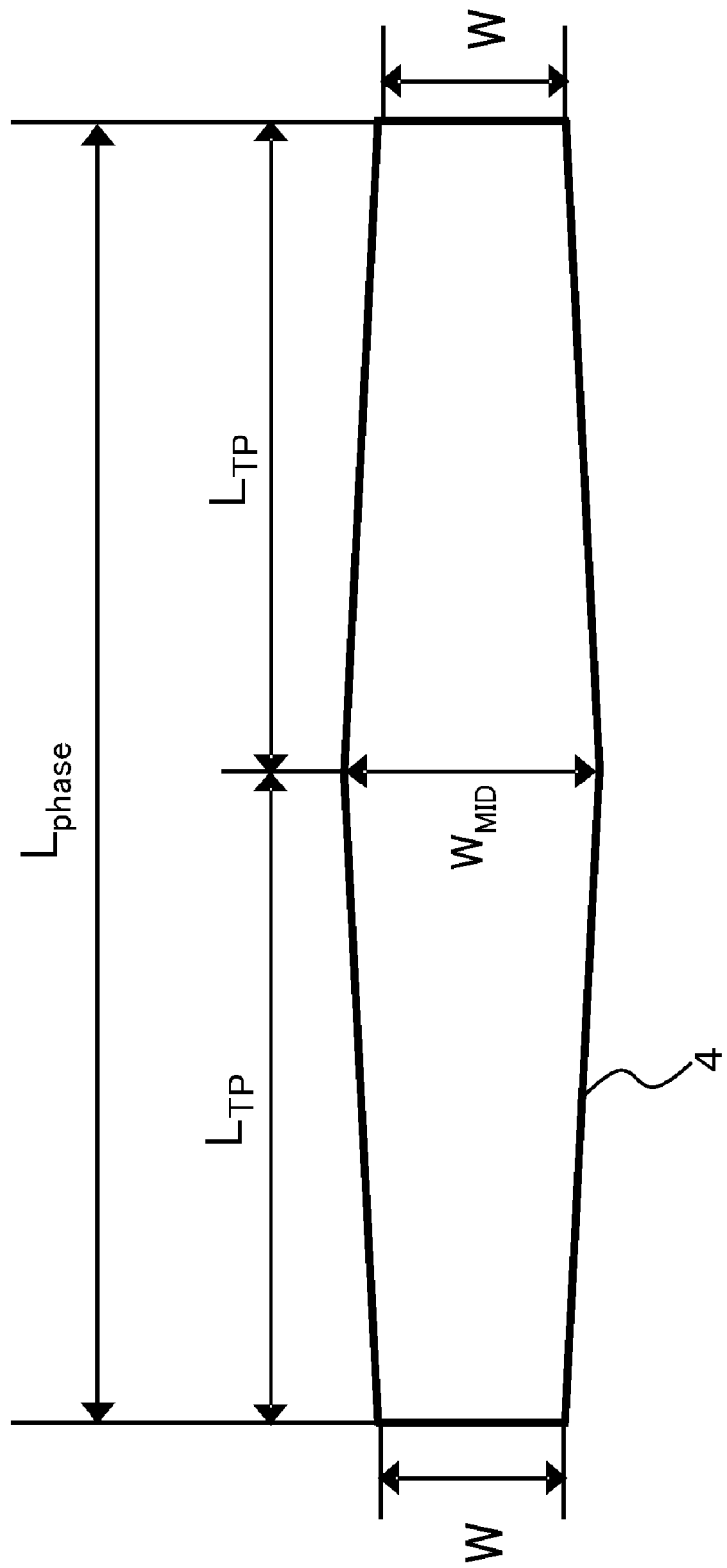
FIG. 8 is a schematic plan view illustrating a configuration of a phase shifter which composes the optical hybrid circuit according to the first embodiment.

In particular, the phase shifter 4 is formed such that, as illustrated in FIG. 8, the width of the optical waveguide between the output port of the 2:4 MMI coupler 2 and the input port of the 2:2 MMI coupler 3 linearly increases from the output port toward a middle position in the lengthwise direction and then linearly decreases from the middle position toward the input port. In this instance, light inputted to the second channel on the input side of the 2:2 MMI coupler 3 is forwarded in phase with respect to light inputted to the first channel on the input side of the optical coupler 3.

Consequently, the optical hybrid circuit 1 outputs a pair of first optical signals (S−L, S+L) having an in-phase relationship with each other and a pair of third optical signals (S−jL, S+jL) having a quadrature phase relationship with the pair of first optical signals as illustrated in FIGS. 1A and 1B, and 90-degree hybrid operation can be obtained with certainty. In short, QPSK signal light is converted into a pair of first optical signals which include only an in-phase component (I-component) and a pair of third optical signals which include only a quadrature phase component (Q-component) and 90-degree hybrid operation can be obtained with certainty by the optical hybrid circuit 1.

Here, the pair of first optical signals having an in-phase relationship with each other, that is, the pair of first optical signals which include only an in-phase component, are a pair of optical signals whose phases are displaced by 180 degrees from each other. Meanwhile, the pair of third optical signals having a quadrature phase relationship with the pair of first optical signals, that is, the pair of third optical signals which include only a quadrature phase component, are a pair of optical signals whose phases are displaced by 90 degrees from the pair of first optical signals. It is to be noted that the pair of third optical signals are a pair of optical signals whose phases are displaced by 180 degrees from each other.

It is to be noted that reference characters S−L, S+L, S+jL and S−jL in FIG. 1A indicate what relative relationship the phase of LO light (L) has with reference to the phase of signal light (S). Here, S−L and S+L indicate that they have a phase relationship displaced by 180 degrees from each other, and S+jL and S−jL have a phase relationship displaced by 90 degrees with respect to S+L and S−L, respectively. Further, the phase relationship diagram of FIG. 1B illustrates a phase relationship of optical signals outputted in response to a relative phase difference between the QPSK signal light and the LO light.

It is to be noted that, while, in the present embodiment, the phase controlling region (here, the phase shifter 4) is provided in order that 90-degree hybrid operation may be obtained with certainty, the provision of the phase controlling region is not essentially required. For example, even if the output signals having an in-phase relationship and the output signals having a quadrature phase relationship do not have a relationship that they have a phase difference by 90 degrees from each other accurately and the phase thereof are displaced from each other, if the phase displacement is permissible to a receiving circuit including photo detectors, then the phase controlling region need not be provided.

Now, an example of a particular configuration of an optical semiconductor device which forms the optical hybrid circuit is described with reference to FIGS. 5 to 8.

Figure 5:
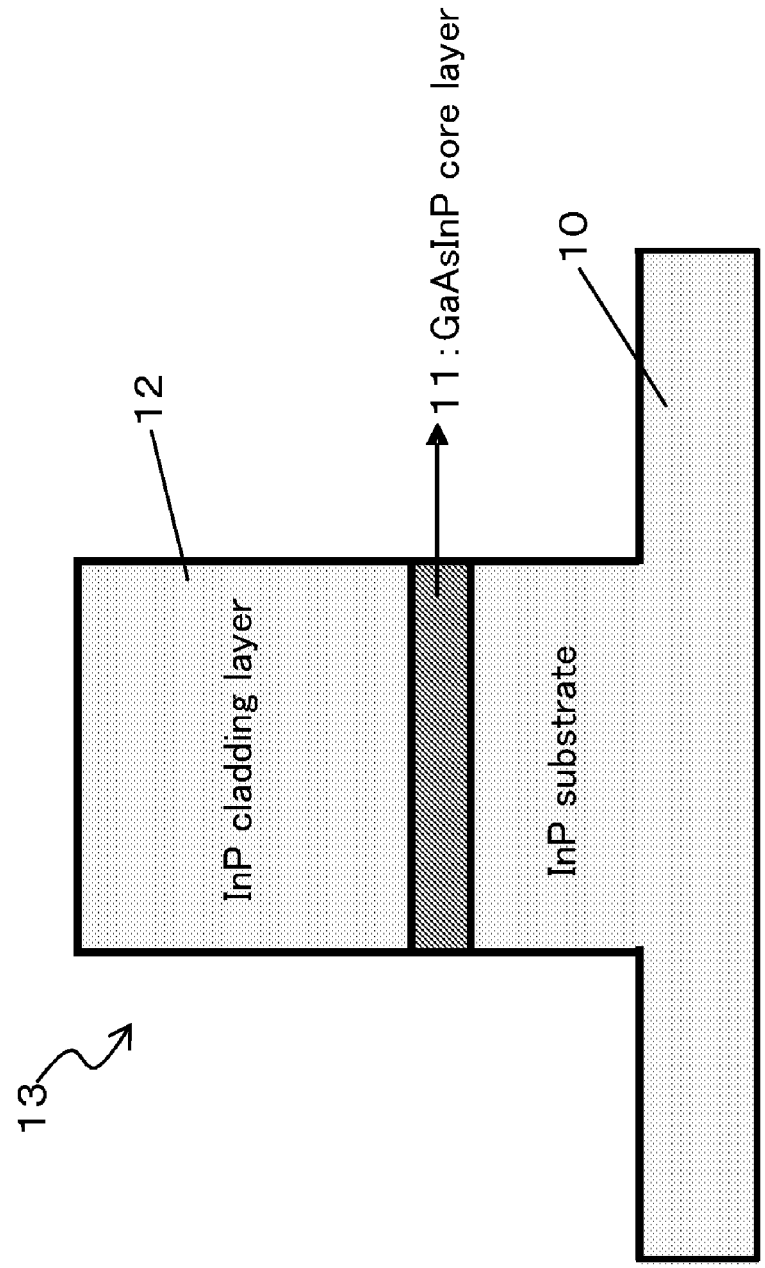
FIG. 5 is a schematic sectional view illustrating a configuration of an optical semiconductor device which composes the optical hybrid circuit according to the first embodiment.

Referring first to FIG. 5, the optical hybrid circuit 1 is formed as an optical semiconductor device 13 which includes a GaInAsP core layer 11 and an InP cladding layer 12 provided over an InP substrate 10 and has a high mesa waveguide structure.

Here, the 2:4 MMI coupler 2 is set in the following manner.

Figure 6:
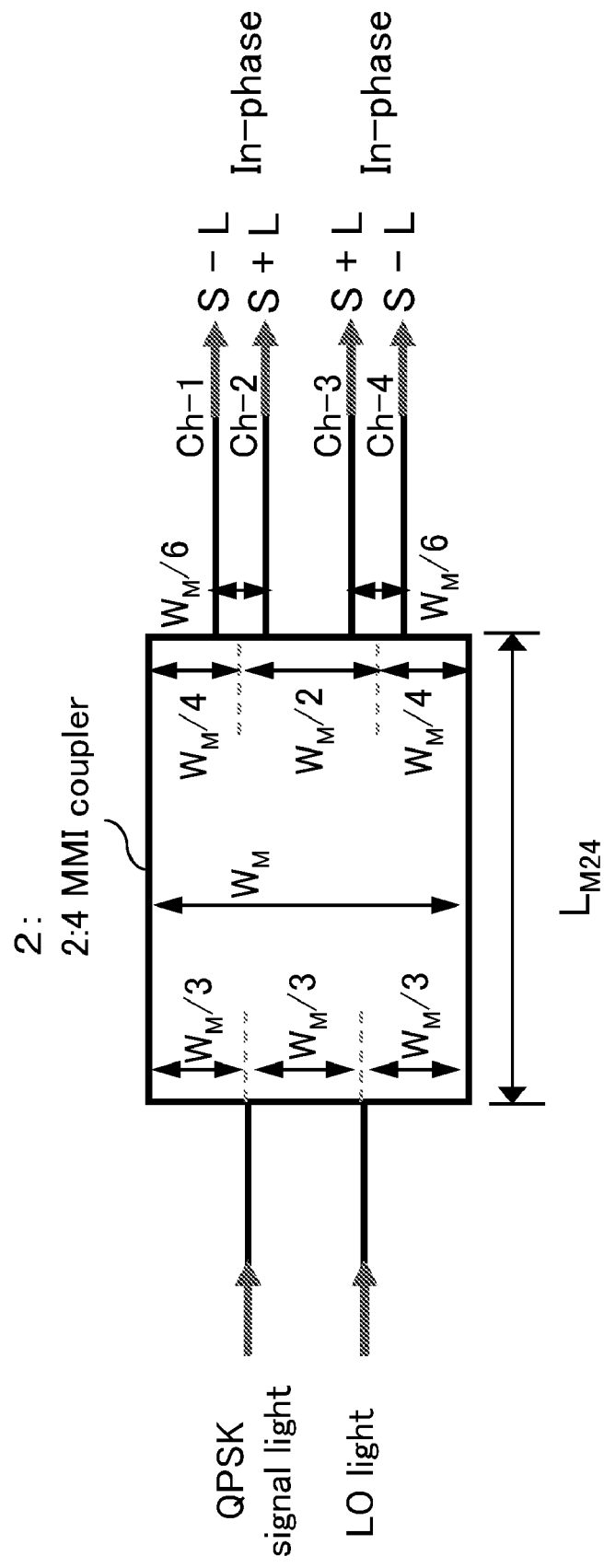
FIG. 6 is a schematic view illustrating an example of a particular configuration of the 2:4 MMI coupler which composes the optical hybrid circuit according to the first embodiment.

In particular, where the width (MMI width) of the MMI region of the 2:4 MMI coupler 2 is represented by $W_M$, the two input channels (input waveguides) are provided such that they are positioned at ⅓ and ⅔ from the upper side of the MMI width $W_M$ in such a manner as illustrated in FIG. 6. Further, the four output channels (output waveguides) are provided such that middle positions of the two first and second output channels from above and middle positions of the two third and fourth output channels from above are positioned at ¼ and ¾ from the upper side of the MMI width $W_M$, respectively. Furthermore, both of the distance (gap) between the two first and second output channels and the distance (gap) between the two third and fourth output channels are set equal to ⅙ the MMI width $W_M$.

For example, the 2:4 MMI coupler 2 is configured such that the minimum distance between the input and output channels, that is, the distance between two output channels ($W_M/6$), is set to approximately 3.5 μm and the waveguide width (input/output waveguide width) W of the input channels and the output channels is set, for example, approximately 2.0 μm so that a single mode condition is satisfied. In this instance, the MMI width $W_M$ is decided to approximately 33 μm. In this instance, the length $L_{M24}$ of the 2:4 MMI coupler becomes approximately 758 μm.

Further, the 2:4 MMI coupler 2 is configured such that the minimum distance between the input and output channels, that is, the distance between two output channels ($W_M/6$), is set to approximately 2.3 μm and the waveguide width (input/output waveguide width) W of the input channels and the output channels is set, for example, to approximately 2.0 μm so that a single mode condition is satisfied. In this instance, the MMI width $W_M$ is decided to approximately 25.8 μm. In this instance, the length $L_{M24}$ of the 2:4 MMI coupler becomes approximately 463 μm.

Meanwhile, the 2:2 MMI coupler 3 is set in the following manner.

Figure 7A:
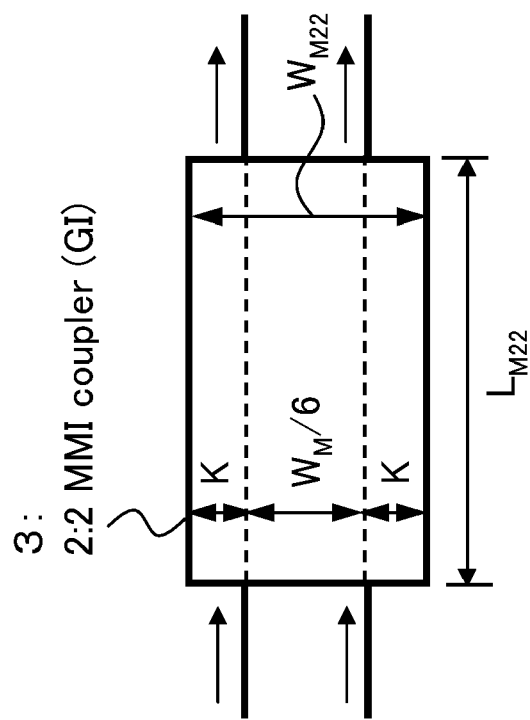
FIGS. 7A and 7B are schematic views illustrating an example of a particular configuration of the 2:2 MMI coupler which composes the optical hybrid circuit according to the first embodiment.

In particular, where the 2:2 MMI coupler 3 is configured based on PI, the two input channels (input waveguides) are provided such that the centers thereof are individually provided at $W_M/6$ from the side faces of the MMI region with reference to the MMI width $W_M$ of the 2:4 MMI coupler 2 as illustrated in FIG. 7A. Also the two output channels (output waveguides) are individually provided so as to be positioned at $W_M/6$ from the side faces of the MMI region. Further, both of the distances (gaps) between the two input and output channels are set to $W_M/6$. Therefore, the width (MMI width) $W_{M22}$ of the MMI region of the 2:2 MMI coupler 3 becomes $W_M/2$.

Figure 7B:
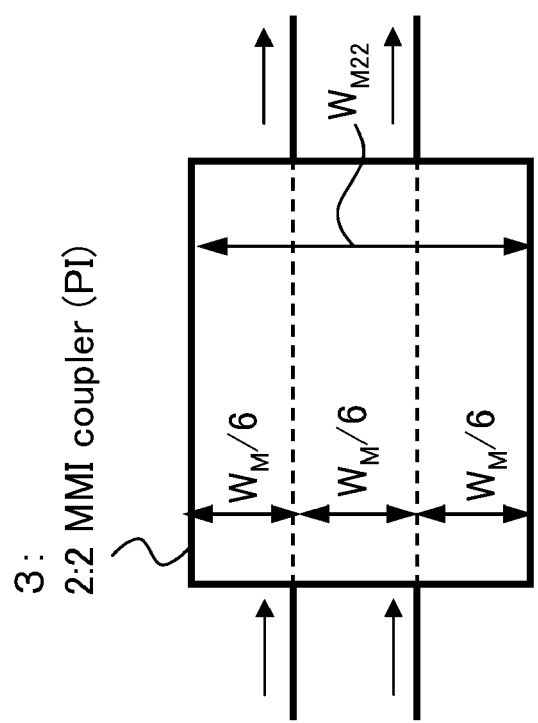

On the other hand, where the 2:2, MMI coupler 3 is configured based on GI, with reference to the MMI width $W_M$ of the 2:4 MMI coupler 2, the two input channels (input waveguides) are provided such that the centers thereof are individually positioned at any other than $W_M/6$ from the side faces of the MMI region and they have a center symmetric property as illustrated in FIG. 7B. In other words, the two input channels are provided such that the centers thereof are individually positioned at distances from the side faces of the MMI region (arbitrary real number greater than 0 except K=$W_M/6$). Also the two output channels (output waveguides) are provided such that the centers thereof are individually positioned at any other than $W_M/6$ from the side faces of the MMI region. In other words, the two output channels are provided such that the centers thereof are individually positioned at the distances K from the side faces of the MMI region (arbitrary real number greater than 0 except K=$W_M/6$). Furthermore the distances (gaps) between the input and output channels are individually set to $W_M/6$. Therefore, the width (MMI width) $W_{M22}$ of the MMI region of the 2:2 MMI coupler 3 becomes $2K+W_M/6$.

For example, the 2:2 MMI coupler 3 based on GI is configured such that the minimum distance between the input/output channels, that is, the distance between the two input channels and the distance between the two output channels ($W_M/6$), is set to approximately 3.5 μm and the waveguide width (input/output waveguide width) W of the input channels and the output channels is set, for example, approximately 2.0 μm so that a single mode condition is satisfied. In this instance, the MMI width $W_{M22}$ is decided to approximately 7.5 μm. In this instance, the length $L_{M22}$ of the 2:2 MMI coupler becomes approximately 235 μm.

Further, the 2:2 MMI coupler 3 based on GI is configured such that the minimum distance between the input/output channels, that is, the distance between the two input channels and the distance between two output channels ($W_M/6$), is set to approximately 2.3 μm and the waveguide width (input/output waveguide width) W of the input channels and the output channels is set, for example, to approximately 2.0 μm so that a single mode condition is satisfied. In this instance, the MMI width $W_{M22}$ is decided to approximately 6.3 μm. In this instance, the length $L_{M22}$ of the 2:2 MMI coupler becomes approximately 165 μm.

Further, the phase shifter 4 is set in the following manner in order to establish a phase matching between two signal components to be inputted to the 2:2 MMI coupler 3.

In particular, the waveguide width W of portions of the phase shifter 4 which are connected to the output ports of the 2:4 MMI coupler 2 and the input ports of 2:2 MMI coupler 3 is set to approximately 2.0 μm as illustrated in FIG. 8. Meanwhile, the distance $L_{TP}$ from the output ports of the 2:4 MMI coupler 2 or the input ports of the 2:2 MMI coupler 3 to the middle position in the lengthwise direction are set to 100 μm. In other words, the length (taper length) of both of a width-increasing tapered portion along which the waveguide width increases linearly from the output ports of the 2:4 MMI coupler 2 to the middle position in the lengthwise direction and a width-decreasing tapered portion along which the waveguide width decreases linearly from the middle position in the lengthwise direction to the input ports of the 2:2 MMI coupler 3 are set to approximately 100 μm. In this instance, the waveguide width $W_{MID}$ at the middle position in the lengthwise position is approximately 2.1 μm. Meanwhile, the length $L_{phase}$ of the phase shifter 4 is approximately 200 μm.

It is to be noted that the values of the parameters regarding the phase shifter 4, that is, the taper length $L_{TP}$ and the waveguide width $W_{MID}$ at the middle position, are not limited to the values mentioned above, but may have any value only if a phase displacement (phase shift amount) corresponding to π/4 can be provided between two signal components to be inputted to the 2:2 MMI coupler 3. For example, the taper length $L_{TP}$ and the waveguide width $W_{MID}$ at the middle position may be set to values with which a phase shift amount corresponding, for example, to π/4×2nπ (n is an integer) can be provided, and also in this instance, a similar effect can be achieved. Further, the taper length $L_{TP}$ and the waveguide width $W_{MID}$ at the middle position may be set to approximately 20 μm and approximately 2.4 μm, respectively, and also in this instance, a phase displacement quite same as that described above can be provided. In this instance, the length $L_{phase}$ of the phase shifter can be set to approximately 40 μm or less and can be formed compact.

The optical hybrid circuit 1 configured as an optical semiconductor device in this manner is fabricated in the following manner.

First, an undoped GaInAsP core layer 11 and an undoped InP cladding layer 12 are epitaxially grown in order on an n-type InP substrate 10 as illustrated in FIG. 5, for example, by a metal organic chemical vapor deposition (MOVPE) method.

Here, the undoped GaInAsP core layer 11 has a light emission wavelength of approximately 1.30 μm and a layer thickness of approximately 0.3 μm. Meanwhile, the undoped InP cladding layer 12 has a layer thickness of approximately 2.0 μm. It is to be noted that the substrate may be an undoped InP substrate. Meanwhile, the cladding layer may be a p-type doped InP cladding layer.

Then, for example, an $SiO_2$ film is formed on the surface of the wafer, for which the epitaxial growth has been carried out in such a manner as described above, for example, by deposition apparatus, and a waveguide pattern for forming the optical hybrid circuit 1 is patterned, for example, by a light exposure process.

Then, using the $SiO_2$ film patterned in this manner as a mask, dry etching is carried out using a method such as, for example, inductively coupled plasma-reactive ion etching (ICP-RIE). Consequently, a high mesa waveguide stripe structure of a height of, for example, approximately 3 μm is formed.

The optical hybrid circuit 1 is completed through such a fabrication as described above.

Here, FIGS. 9A to 9D illustrate an input/output characteristic where QPSK signal light (Signal) of a wavelength of 1.55 μm and LO light are inputted to the optical hybrid circuit 1 configured in such a manner as described above for each relative phase difference Δϕ between the QPSK signal light and the LO light.

Figures 9A, 9B, 9C, 9D:
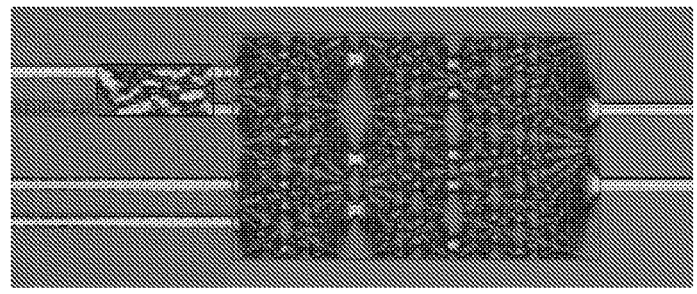

It is to be noted that the results of calculation illustrated in FIGS. 9A to 9D are based on a beam propagation method (BPM). FIG. 9A illustrates an input/output characteristic where the relative phase difference Δϕ is 0, FIG. 9B illustrates an input/output characteristic where the relative phase difference Δϕ is π, FIG. 9C illustrates an input/output characteristic where the relative phase difference Δϕ is −π/2, and FIG. 9D illustrates an input/output characteristic where the relative phase difference Δϕ is +π/2.

Where the relative phase difference Δϕ is 0 and π as illustrated in FIGS. 9A and 9B, the output intensity ratio of the optical hybrid circuit 1 is 0:2:1:1 and 2:0:1:1, respectively.

On the other hand, where the relative phase difference Δϕ is −π/2 and +π/2 as illustrated in FIGS. 9C and 9D, the output intensity ratio of the optical hybrid circuit 1 is 1:1:2:0 and 1:1:0:2, respectively.

In this manner, with the optical hybrid circuit 1, output forms having different branching ratios are obtained in response to the phase state of the QPSK signal light. Further, in the optical hybrid circuit 1, since the phase shifter 4 is provided, crosstalk in a quadrature component decreases significantly. Accordingly, the optical hybrid circuit 1 functions as a 90-degree hybrid with certainty.

Figure 10B:
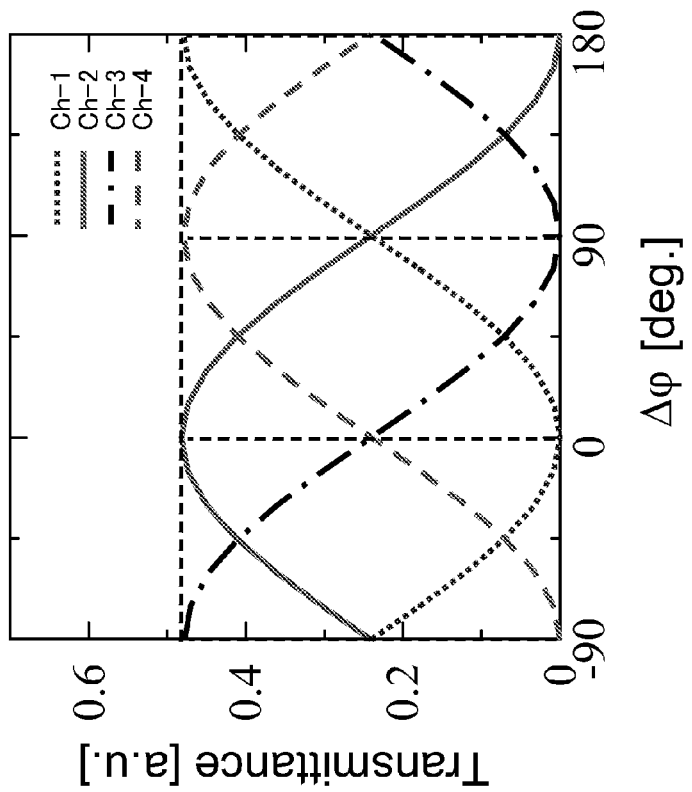
FIG. 10B is a view illustrating a relative output intensity (Transmittance) of the 90-degree hybrid according to the first embodiment with respect to $\Delta\phi$.
Figure 10A:
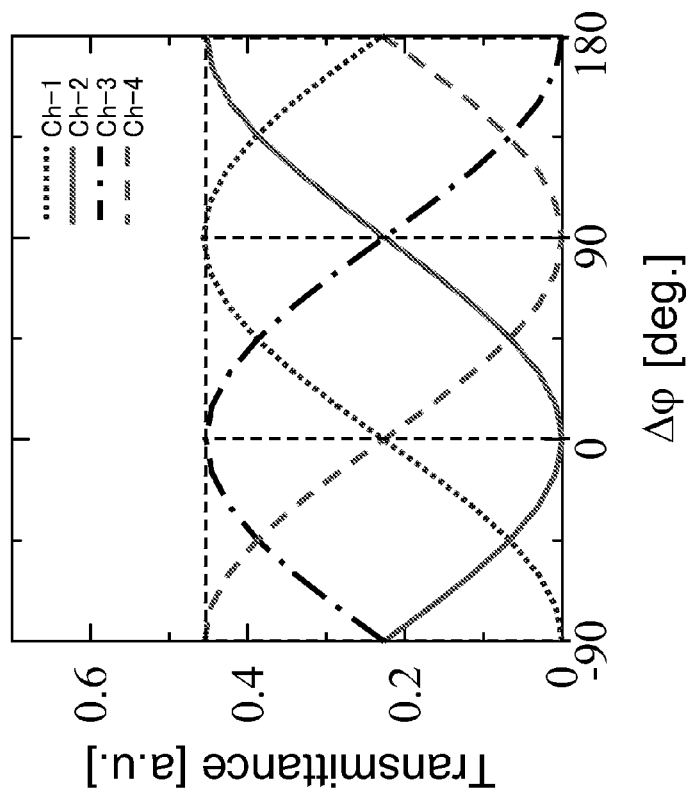
FIG. 10A is a view illustrating a relative output intensity (Transmittance) of the 90-degree hybrid which uses a 4:4 MMI coupler with respect to $\Delta\phi$.

FIG. 10A illustrates a relative output intensity (transmittance) of a conventional 90-degree hybrid [refer to FIG. 50A], which uses a 4:4 MMI coupler, with respect to the relative phase difference Δϕ, and FIG. 10B illustrates a relative output intensity (transmittance) of the optical hybrid circuit 1 with respect to the relative phase difference Δϕ.

It is to be noted that FIGS. 10A and 10B illustrate relative intensities of each of the output channels where the relative phase difference Δϕ varies continuously.

As illustrated in FIGS. 10A and 10B, in both cases, the relative output intensity with respect to the relative phase difference Δϕ varies in a sine wave function. However, in FIG. 10A, the relative output intensity is plotted reflecting the phase difference of 45 degrees which inevitably appears in mode interference of the 4:4 MMI coupler.

As illustrated in FIGS. 10A and 10B, it is recognized that, with the optical hybrid circuit 1, where the relative phase difference Δϕ is 0, π, −π/2 and +π/2, a higher output intensity than that of the conventional 90-degree hybrid is obtained and the insertion loss is low.

Further, as illustrated in FIG. 10A, it is recognized that, with the conventional 90-degree hybrid, the output intensity variation of the first output channel (Ch-1) and the output intensity variation of the fourth output channel (Ch-4) have an x-axis symmetrical property. Further, it is recognized that the output intensity variation of the second channel (Ch-2) and the output intensity variation of the third output channel (Ch-3) have an x-axis symmetrical property.

Particularly, it is recognized that, where the relative phase difference Δϕ is 0, the output intensity of the third output channel (Ch-3) is the highest. Further, it is recognized that, where the relative phase difference Δϕ is n, the output intensity of the second output channel (Ch-2) is the highest. Further, it is recognized that, where the relative phase difference $\Delta\phi$ is $-\pi/2$, the output intensity of the fourth channel (Ch-4) is the highest. Furthermore, it is recognized that, where the relative phase difference $\Delta\phi$ is $+\pi/2$, the output intensity of the first output channel (Ch-1) is the highest.

In this instance, the optical signal outputted from the first output channel (Ch-1) and the optical signal outputted from the fourth output channel (Ch-4) have an in-phase relationship with each other. Meanwhile, the optical signal outputted from the second output channel (Ch-2) and the optical signal outputted form the third output channel (Ch-3) have an in-phase relationship with each other. Further, the optical signals outputted from the second and third channels have a quadrature phase relationship with the optical signals outputted from the first and fourth output channels.

This signifies that intersection of the optical waveguides cannot be avoided because optical signals outputted from the conventional 90-degree hybrid are inputted to photodiodes (BPDs) for photoelectric conversion (refer to FIG. 51). Therefore, excessive loss by the intersection of optical waveguides occurs, and the light reception efficiency deteriorates.

In contrast, as illustrated in FIG. 10B, it is recognized that, with the optical hybrid circuit 1, the output intensity variation of the first output channel (Ch-1) and the output intensity variation of the second output channel (Ch-2) have an x-axis symmetrical property. Further, it is recognized that the output intensity variation of the third output channel (Ch-3) and the output intensity variation of the fourth output channel (Ch-4) have an x-axis symmetrical property.

It is recognized that, particularly where the relative phase difference $\Delta\phi$ is 0, the output intensity of the second output channel (Ch-2) is the highest. Further, it is recognized that, where the relative phase difference $\Delta\phi$ is n, the output intensity of the first output channel (Ch-1) is the highest. Further, it is recognized that, where the relative phase difference $\Delta\phi$ is $-\pi/2$, the output intensity of the third output channel (Ch-3) is the highest. Furthermore, it is recognized that, where the relative phase difference $\Delta\phi$ is $+\pi/2$, the output intensity of the fourth output channel (Ch-4) is the highest.

In this instance, the optical signal outputted from the first output channel (Ch-1) and the optical signal outputted from the second output channel (Ch-2) have an in-phase relationship with each other. Meanwhile, the optical signal outputted from the third output channel (Ch-3) and the optical signal outputted form the fourth output channel (Ch-4) have an in-phase relationship with each other. Further, the optical signals outputted from the first and second channels have a quadrature phase relationship with the optical signals outputted from the third and fourth output channels.

In this instance, different from the case of FIG. 4, no crosstalk occurs with output components of Ch-3 and Ch-4 which are a quadrature phase component. This signifies that the relative phase difference between the output components of Ch-3 and Ch-4 is made proper by the phase shifter 4 and a phase matching with the 2:2 MMI coupler 3 is established.

Figure 11:
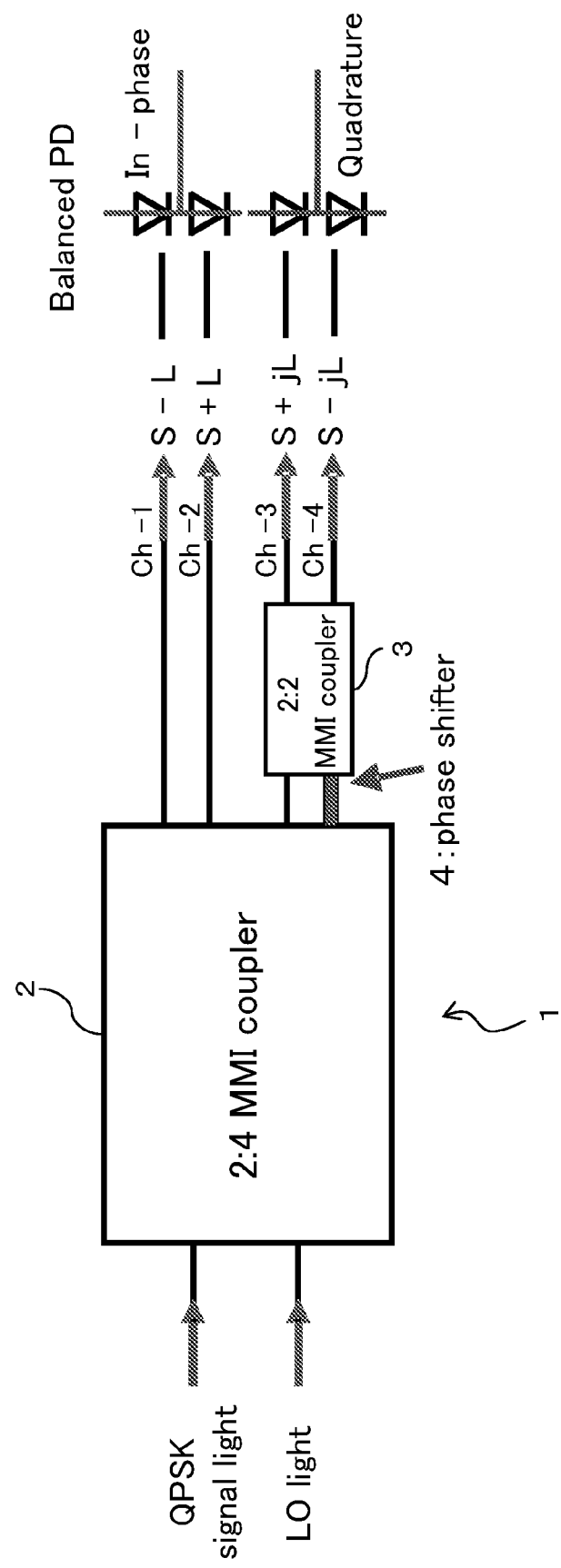
FIG. 11 is a view illustrating a connection relationship between the optical hybrid circuit according to the first embodiment and photodiodes.

Further, it is signified that, in order to input the optical signals outputted from the optical hybrid circuit 1 to the photodiodes (BPDs) for photoelectric conversion, there is no necessity to lay the optical waveguides in an intersecting relationship as illustrated in FIG. 11. Therefore, excessive loss can be prevented.

Figure 12A:
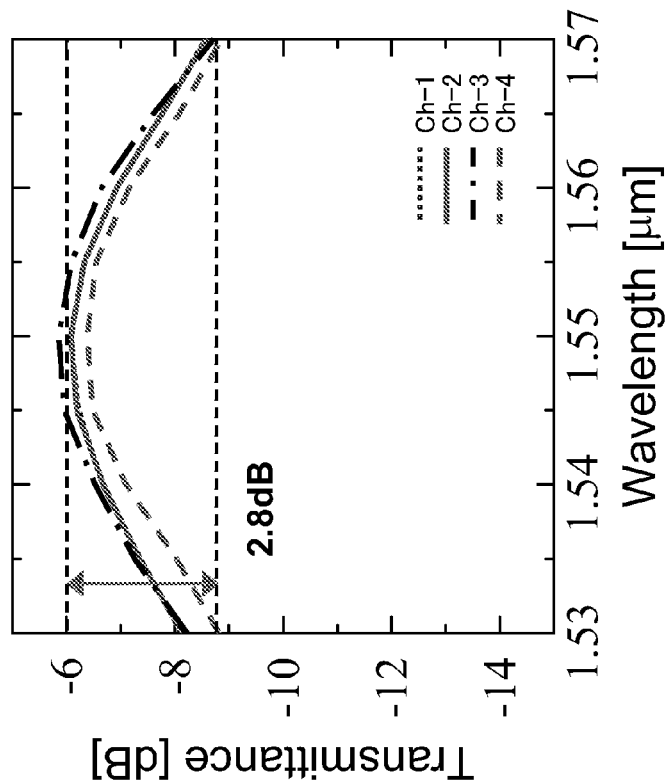
FIG. 12A is a view illustrating a wavelength dependency of the transmittance of lights outputted from four output channels (Ch-1, Ch-2, Ch-3 and Ch-4) where the signal light is inputted to one input channel in an example of a configuration of a 90-degree hybrid which uses a 4:4 MMI coupler.
Figure 12B:
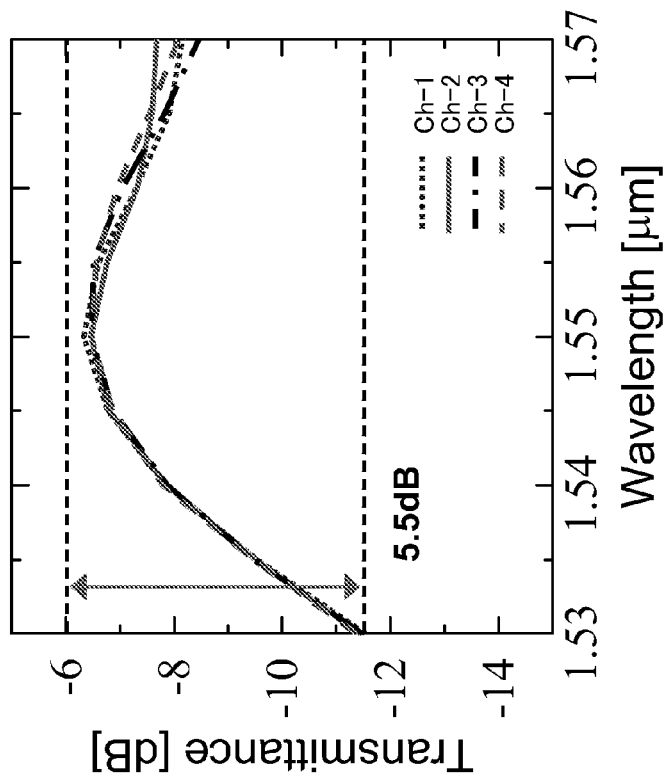
FIG. 12B is a view illustrating a wavelength dependency of the transmittance of lights outputted from four output channels (Ch-1, Ch-2, Ch-3 and Ch-4) where the signal light is inputted to one input channel in an example of the configuration of the 90-degree hybrid according to the first embodiment.

FIG. 12A illustrates a wavelength dependency of the transmittance for each of the four output channels where QPSK signal light is inputted from one of the input channels of the conventional 90-degree hybrid [refer to FIG. 50A] which uses a 4:4 MMI coupler. Meanwhile, FIG. 12B illustrates a wavelength dependency of the transmittance in the four output channels where QPSK signal light is inputted from one of the input channels of the optical hybrid circuit 1. It is to be noted that, from whichever input channel the QPSK signal light is inputted, the characteristics illustrated in FIGS. 12A and 12B are substantially similar to each other.

Here, in all cases, the minimum distance (gap) between the input/output waveguides is set to approximately 3.5 µm.

Then, if the input/output waveguide width W is approximately 2 µm, then the MMI width $W_{M44}$ of the 4:4 MMI coupler, the MMI width $W_M$ of the 2:4 MMI coupler 2 and the MMI width $W_{M22}$ of the 2:2 MMI coupler 3 based on GI are approximately 22 µm, approximately 33 µm and approximately 7.5 µm, respectively.

In this instance, the length $L_{M44}$ of the 4:4 MMI coupler, the length $L_{M24}$ of the 2:4 MMI coupler 2 and the length $L_{M22}$ of the 2:2 MMI coupler 3 are approximately 1,011 µm, approximately 758 µm and approximately 235 µm, respectively.

Further, the length $L_{TP}$ and the waveguide width $W_{MID}$ at the middle position of the phase shifter 4 provided in the optical hybrid circuit 1 are approximately 20 µm and approximately 2.4 µm.

In this instance, the device length $L_{Tot1}$ ($=L_{M44}$) of the conventional 90-degree hybrid which uses a 4:4 MMI coupler and the device length $L_{Tot2}$ ($=L_{M24}+L_{phase}+L_{M22}$) of the present 90-degree hybrid 1 are approximately 1,011 µm and approximately 1,033 µm, respectively.

As illustrated in FIGS. 12A and 12B, the present 90-degree hybrid 1 has a low wavelength dependency over a wavelength range of the C band in comparison with the conventional 90-degree hybrid. Further, while the conventional 90-degree hybrid exhibits a loss difference of approximately 5.5 dB in the maximum within the wavelength range of the C band, the loss difference by the present 90-degree hybrid is suppressed to approximately 2.8 dB in the maximum.

Figure 13A:
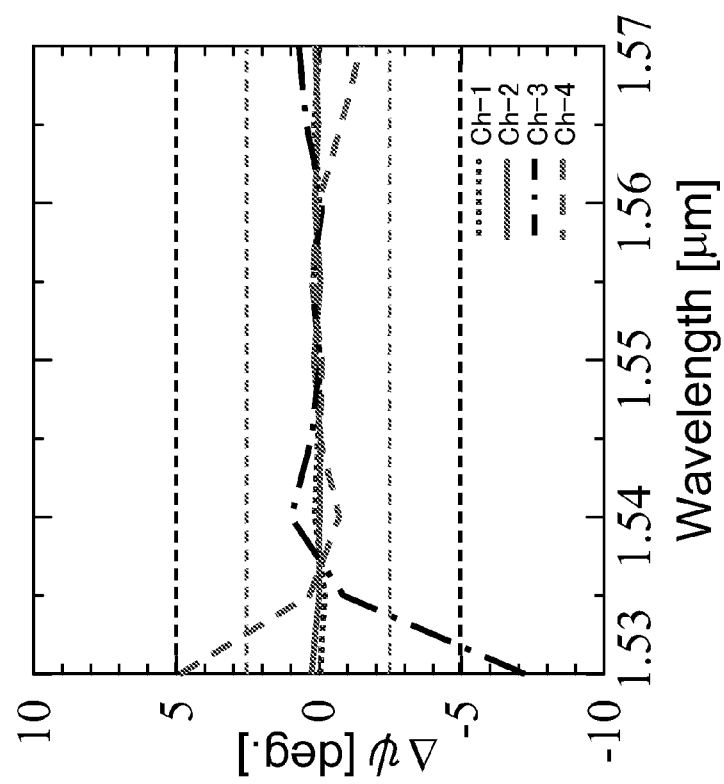
FIG. 13A is a view illustrating a wavelength dependency of the phase displacement amount $\Delta\psi$ of lights outputted from the four output channels (Ch-1, Ch-2, Ch-3 and Ch-4) where the signal light and the LO light have an in-phase relationship with each other ($\Delta\phi=0$) in an example of a configuration of a 90-degree hybrid which uses a 4:4 MMI coupler.
Figure 13B:
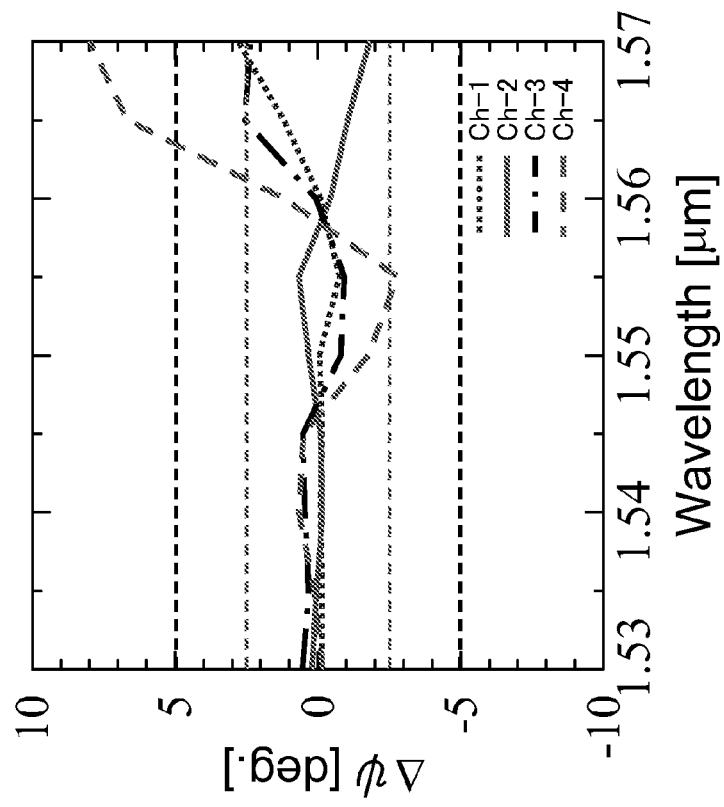
FIG. 13B is a view illustrating a wavelength dependency of the phase displacement amount $\Delta\psi$ of lights outputted from the four output channels (Ch-1, Ch-2, Ch-3 and Ch-4) where the signal light and the LO light have an in-phase relationship with each other ($\Delta\phi=0$) in the example of the configuration of the 90-degree hybrid according to the first embodiment.

FIG. 13A illustrates a wavelength dependency of the phase displacement $\Delta\psi$ of the conventional 90-degree hybrid [refer to FIG. 50A] which uses a 4:4 MMI coupler. Meanwhile, FIG. 13B illustrates a wavelength dependency of the phase displacement $\Delta\psi$ of the present 90-degree hybrid 1. It is to be noted that the parameters of the 90-degree hybrids are similar to those in the case of FIGS. 12A and 12B.

It is to be noted that, in FIGS. 13A and 13B, the difference (phase displacement amount) $\Delta\psi$ between an absolute phase of an output component outputted from each of the four output channels and a reference phase is plotted where the relative phase difference between the QPSK signal light and the LO light is 0 ($\Delta\phi=0$). Here, the reference phases are a phase of an output component outputted from each of the channels in the phase relationship diagrams illustrated in FIGS. 50B and 1B. Meanwhile, the phase displacement amount is excessive phase displacement amount from the reference phase. Accordingly, the phase displacement amount is better where it is minimized. In order to demodulate a QPSK modulation signal in error-free, it is desirable that no phase displacement occurs. Even if a phase displacement occurs, it is necessary to minimize the same, and normally it is desirable to suppress the phase displacement amount $\Delta\psi$ so as to be approximately ±5 degrees or less (preferably approximately ±2.5 degrees or less).

As illustrated in FIGS. 13A and 13B, where it is intended to suppress the phase displacement amount to less than ±5 degrees, the allowable bandwidth in the conventional 90-degree hybrid and the present 90-degree hybrid 1 is approximately 33 nm and approximately 38.3 nm, respectively. In particular, while the conventional 90-degree hybrid fails to cover the entire C band range, the present 90-degree hybrid 1 can cover the entire C band range.

Further, with the present 90-degree hybrid 1, even where the phase displacement amount is to be suppressed to less than approximately ±2.5 degrees, the bandwidth is approximately 36.4 nm and it is possible to cover almost the entire C band range.

In this manner, the present 90-degree hybrid 1 can lower the wavelength dependency of the transmittance and the phase displacement in comparison with the conventional 90-degree hybrid. Such a characteristic may be further improved by changing the parameter of the 90-degree hybrid.

As described more particularly below, the wavelength dependency of the transmittance and the phase displacement can be further lowered, for example, by decreasing the minimum distance (gap) between the input/output waveguides.

Figure 14A:
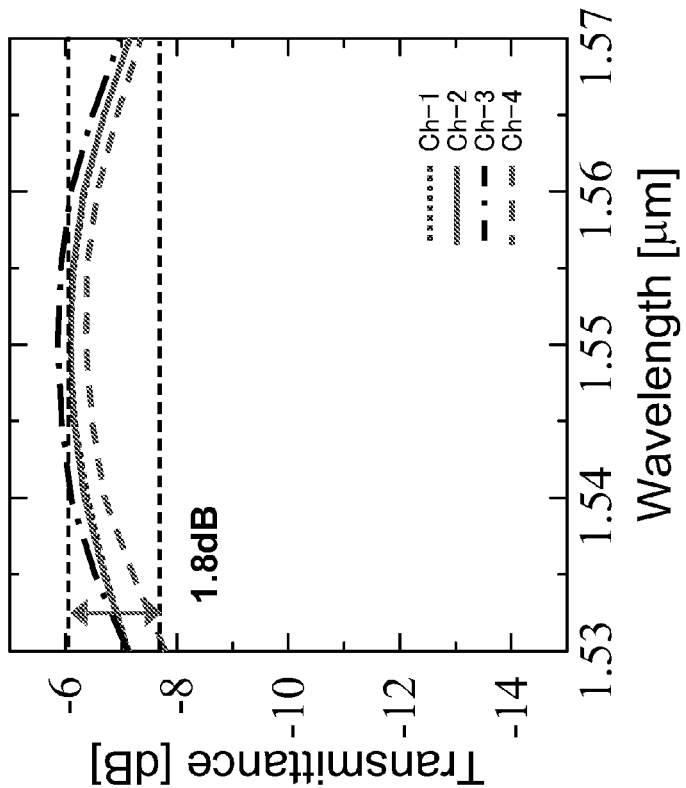
FIG. 14A is a view illustrating a wavelength dependency of the transmittance of lights outputted from the four output channels (Ch-1, Ch-2, Ch-3 and Ch-4) where the signal light is inputted to one input channel in a different example of a configuration of a 90-degree hybrid according to the first embodiment.
Figure 14B:
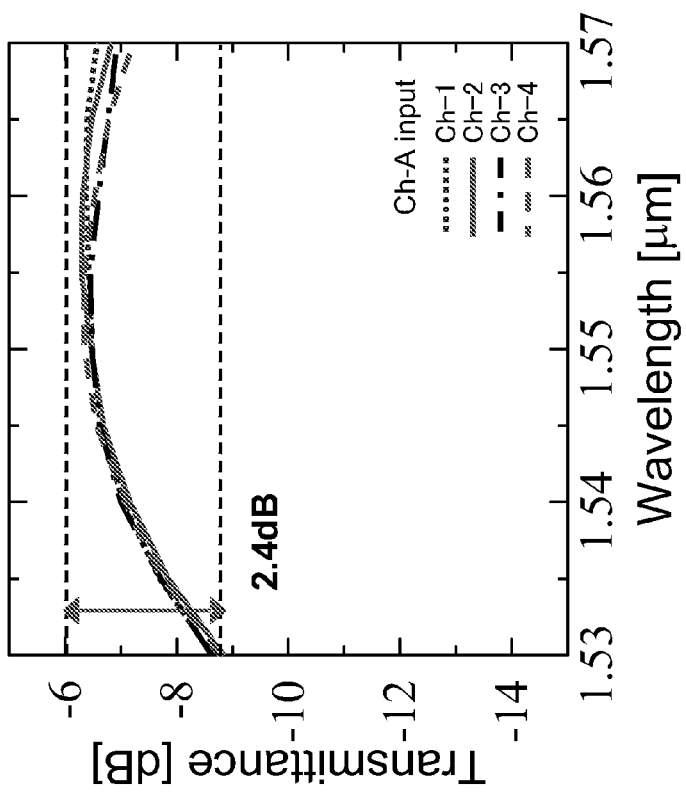
FIG. 14B is a view illustrating a wavelength dependency of the transmittance of lights outputted from four output channels (Ch-1, Ch-2, Ch-3 and Ch-4) where the signal light is inputted to one input channel in a different example of the configuration of the 90-degree hybrid according to the first embodiment.

Here, FIG. 14A illustrates a wavelength dependency of the transmittance for each of the four output channels where QPSK signal light is inputted from one of the input channels of the conventional 90-degree hybrid [refer to FIG. 50A] which uses a 4:4 MMI coupler. Meanwhile, FIG. 14B illustrates a wavelength dependency of the transmittance for each of the four output channels where QPSK signal light is inputted from one of the input channels of the present 90-degree hybrid 1. It is to be noted that the characteristics illustrated in FIGS. 14A and 14B are substantially similar from whichever input channel the QPSK signal light is inputted.

Here, in both cases, the minimum distance (gap) between the input/output waveguides is set to approximately 2.3 µm.

And, where the input/output waveguide width W is set to approximately 2 µm, the MMI width $W_{M44}$ of the 4:4 MMI coupler, the MMI width $W_M$ of the 2:4 MMI coupler 2 and the MMI width $W_{M22}$ of the 2:2 MMI coupler 3 based on GI are decided to approximately 17.2 µm, approximately 25.8 µm and approximately 6.3 µm, respectively.

In this instance, the length $L_{M44}$ of the 4:4 MMI coupler, the length $L_{M24}$ of the 2:4 MMI coupler 2 and the length $L_{M22}$ of the 2:2 MMI coupler 3 are approximately 620 µm, approximately 463 µm and approximately 165 µm, respectively.

Further, the length $L_{TP}$ and the waveguide width $W_{MID}$ at the middle position of the phase shifter 4 provided in the present 90-degree hybrid 1 are 20 µm and 2.4 µm, respectively.

In this instance, the device length $L_{Tot1}$ (=$L_{M44}$) of the conventional 90-degree hybrid which uses a 4:4 MMI coupler and the device length $L_{Tot2}$ (=$L_{M24}$+$L_{phase}$+$L_{M22}$) of the present 90-degree hybrid 1 are approximately 620 µm and approximately 668 µm, respectively.

As illustrated in FIGS. 14A and 14B, the present 90-degree hybrid 1 has a low wavelength dependency within a wavelength range of the C band in comparison with the conventional 90-degree hybrid. Further, while, in the conventional 90-degree hybrid, the loss difference appearing in the wavelength range of the C band is approximately 2.4 dB in the maximum, with the present 90-degree hybrid 1, the loss difference is suppressed to approximately 1.8 dB in the maximum.

Figure 15A:
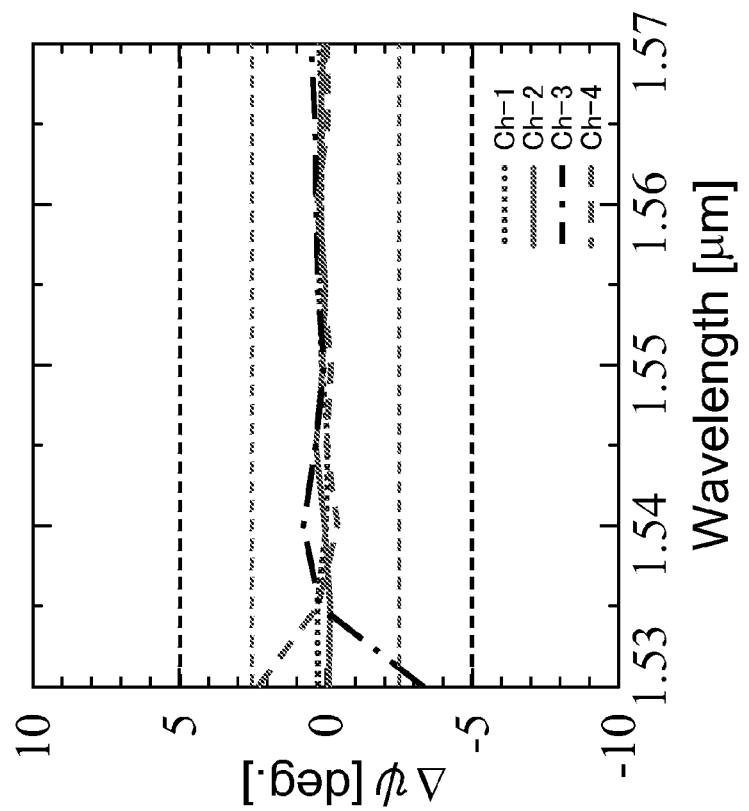
FIG. 15A is a view illustrating a wavelength dependency of the phase displacement amount $\Delta\psi$ of lights outputted from the four output channels (Ch-1, Ch-2, Ch-3 and Ch-4) where the signal light and the LO light have an in-phase relationship with each other ($\Delta\phi=0$) in a different example of a configuration of a 90-degree hybrid which uses a 4:4 MMI coupler.
Figure 15B:
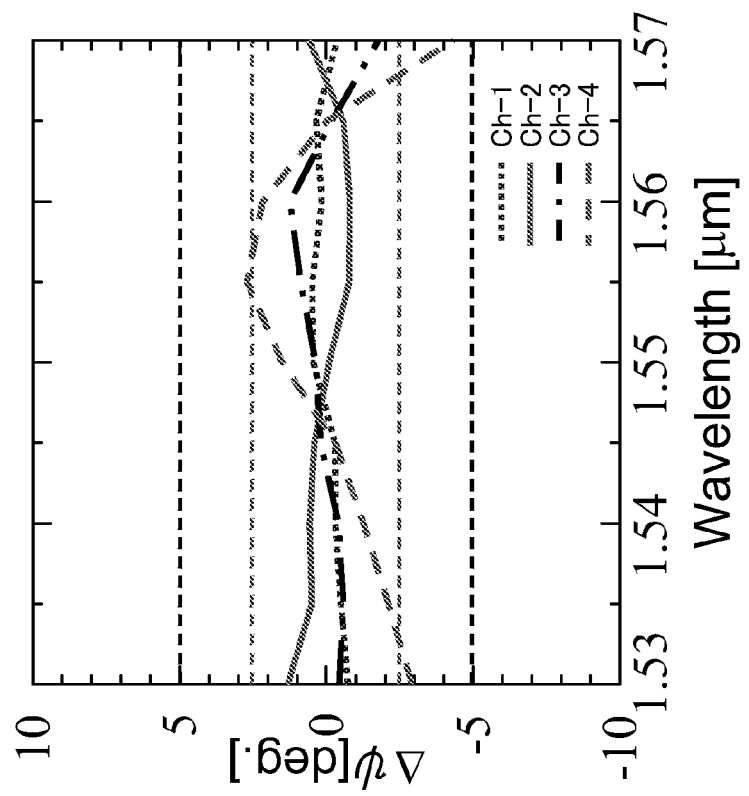
FIG. 15B is a view illustrating a wavelength dependency of the phase displacement amount $\Delta\psi$ of lights outputted from the four output channels (Ch-1, Ch-2, Ch-3 and Ch-4) where the signal light and the LO light have an in-phase relationship with each other ($\Delta\phi=0$) in the different example of the configuration of the 90-degree hybrid according to the first embodiment.

FIG. 15A illustrates a wavelength dependency of the conventional 90-degree hybrid [refer to FIG. 50A] which uses a 4:4 MMI coupler. Meanwhile, FIG. 15B illustrates a wavelength dependency of the phase displacement of the present 90-degree hybrid 1. It is to be noted that the parameters of the 90-degree hybrids are similar to those in the case described hereinabove with reference to FIGS. 14A and 14B.

As illustrated in FIGS. 15A and 15B, where it is desired to suppress the phase displacement amount so as to be approximately ±5 degrees, both of the conventional 90-degree hybrid and the present 90-degree hybrid 1 can cover the entire C band range. However, the present 90-degree hybrid 1 has a superior characteristic that the phase displacement amount can be kept ±1 degree or less except a region around the wavelength of approximately 1.53 µm.

In this manner, by decreasing the minimum distance (gap) between the input/output waveguides, the wavelength dependency of the transmittance and the phase displacement can be improved while the superiority over the conventional 90-degree hybrid is maintained.

Accordingly, the optical hybrid circuit according to the present embodiment is advantageous in that it exhibits a low wavelength dependency, a low phase displacement characteristic and low insertion loss and a 90-degree hybrid suitable for compactness and monolithic integration can be implemented.

Further, since an intersecting portion of optical waveguides which is not inevitable with the conventional 90-degree hybrid [refer to FIG. 50A] which uses a 4:4 MMI coupler is not required, there is an advantage also in that the excessive loss can be suppressed to the minimum. Furthermore, since the phase relationship of the four output signals can be made similar to that in the conventional 90-degree hybrid [refer to FIGS. 48A and 49A], the optical hybrid circuit according to the embodiment is superior also in compatibility with 90-degree hybrids which are currently used in coherent optical receivers, coherent detection systems and so forth.

It is to be noted that, while, in the embodiment described above, a case wherein the 2:4 MMI coupler 2 is used as the MMI coupler at the preceding stage is taken as an example, the MMI coupler at the preceding stage is not limited to this. The MMI coupler at the preceding stage may be any MMI coupler which converts quadrature phase shift keying signal light into a pair of first optical signals having an in-phase relationship with each other and a pair of second optical signals having an in-phase relationship with each other.

Figure 16:
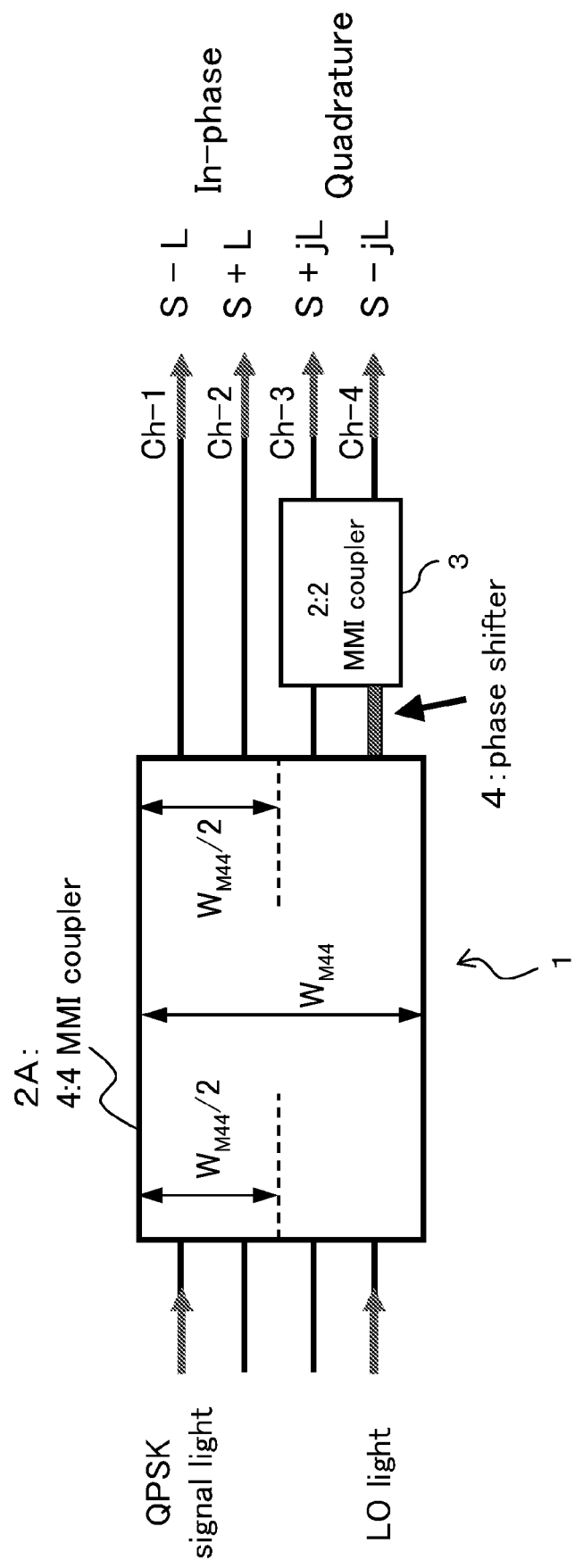
FIG. 16 is a schematic view illustrating a configuration of an optical hybrid circuit according to a modification to the first embodiment.

For example, the 2:4 MMI coupler 2 which composes the optical hybrid circuit 1 of the embodiment described above may be replaced by a 4:4 MMI coupler 2A having four channels on the input side thereof and having four channels on the output side thereof as illustrated in FIG. 16. And, if light is inputted to the two channels (a pair of input channels) provided at symmetrical positions with respect to the center position in the widthwise direction from among the four channels on the input side of the 4:4 MMI coupler 2A, then 90-degree hybrid operation is obtained similarly as in the case of the embodiment described above. Consequently, the necessity for optical waveguides to be laid in an intersecting relationship in order to connect photo detectors as in the conventional 90-degree hybrid (refer to FIG. 51) which uses a 4:4 MMI coupler is eliminated. It is to be noted that, in FIG. 16, like elements to those in the embodiment described hereinabove [refer to FIG. 1A] are denoted by like reference characters.

Here, while light is inputted to the first and fourth channels from above from among the four channels on the input side of the 4:4 MMI coupler 2A, light may otherwise be inputted to the second and third channels. By the configuration just described, the 4:4 MMI coupler 2A functions as a 180-degree hybrid similarly to the 2:4 MMI coupler 2 in the embodiment described above.

In this instance, the 4:4 MMI coupler 2A is based on GI, and the input channels and the output channels can be positioned freely within a range within which the center axis symmetry property of the MMI region is not lost. In particular, the positions of the first and second channels from above on the input side and the third and fourth channels on the input side may be any positions only if they have a center axis symmetric property. Further, the positions of the first and second channels from above on the output side and the third and fourth channels on the output side may be any positions only if they have a center axis symmetric property. However, the channel positions have some influence on the branching characteristic.

Further, while, in the embodiment described above, a case wherein a 2:2 MMI coupler is used as the 2:2 MMI coupler 3 at the succeeding stage is described as an example, the optical coupler 3 is not limited to this. The optical coupler 3 at the succeeding stage may be any optical coupler which converts the first optical signals or the second optical signals into a pair of third optical signals having a quadrature phase relationship with the first or second optical signals.

Figure 17:
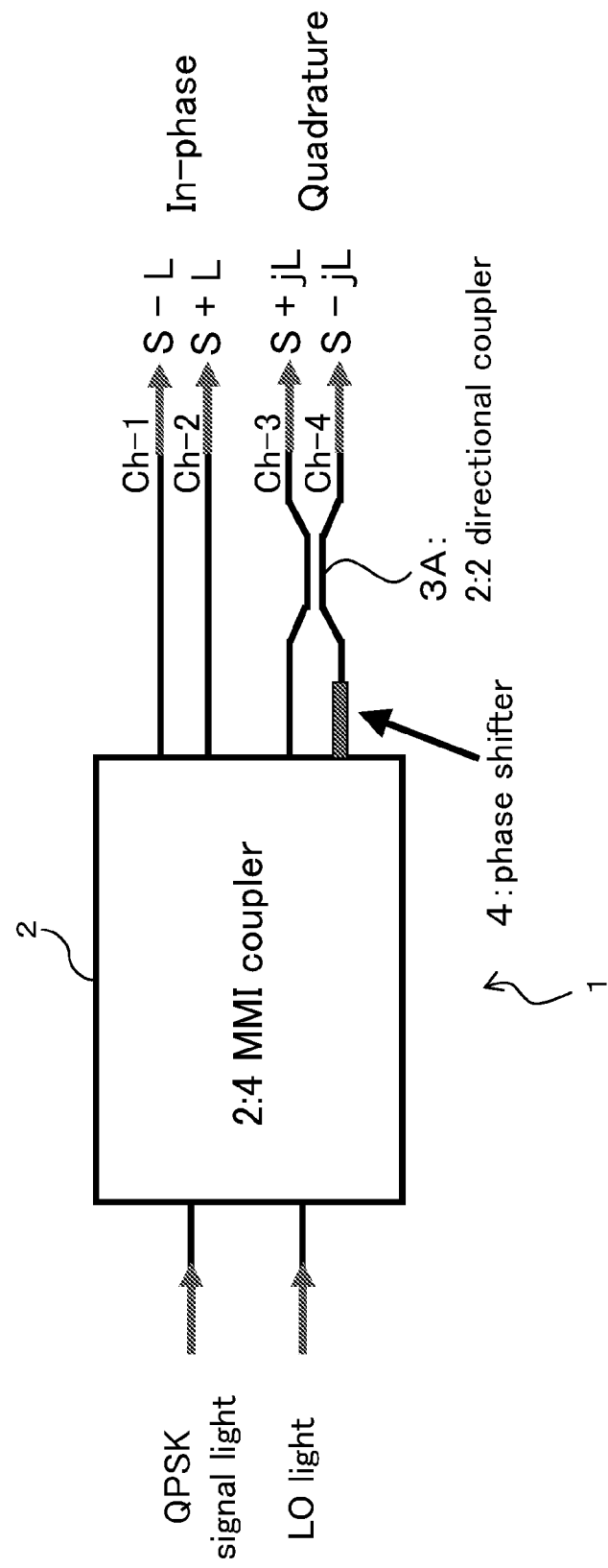
FIG. 17 is a schematic view illustrating a configuration of an optical hybrid circuit according to another modification to the first embodiment.
Figure 18:
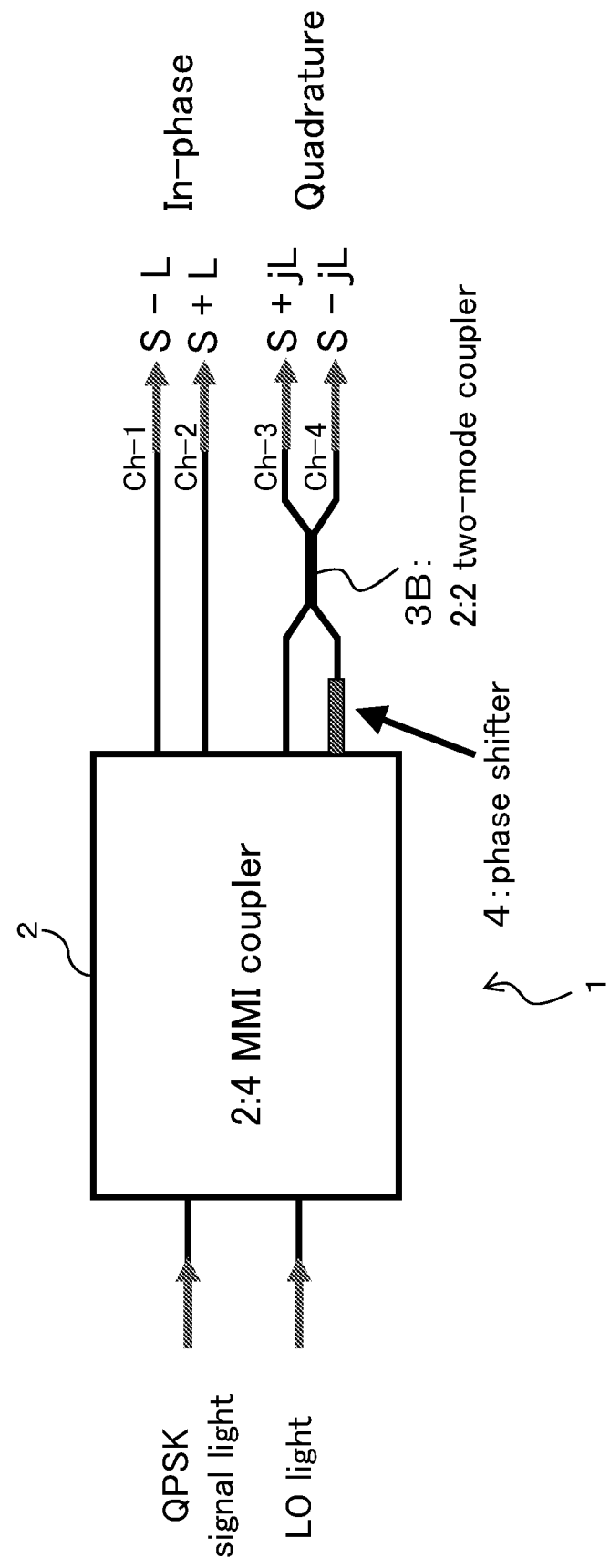
FIG. 18 is a schematic view illustrating a configuration of an optical hybrid circuit according to a further modification to the first embodiment.

For example, the 2:2 MMI coupler 3 which composes the optical hybrid circuit 1 of the embodiment described hereinabove may be replaced by a directional coupler (3-dB coupler; for example, a 2:2 directional coupler) 3A as illustrated in FIG. 17. It is to be noted that, in FIG. 17, like elements to those in the embodiment described hereinabove [refer to FIG. 1A] are denoted by like reference characters. Or, the 2:2 MMI coupler 3 which composes the optical hybrid circuit 1 of the embodiment described hereinabove may be replaced by a two-mode interference coupler (for example, a 2:2 two-mode interference coupler) 3B as illustrated in FIG. 18. It is to be noted that, in FIG. 18, like elements to those in the embodiment described hereinabove [refer to FIG. 1A] are denoted by like reference characters. Also in those cases, similar effects to those of the embodiment described hereinabove can be achieved. Further, although the circuits of FIGS. 17 and 18 are described as modifications to the embodiment described hereinabove [refer to FIG. 1A], the modifications can be applied also to a modification wherein a 4:4 MMI coupler is used as the MMI coupler at the preceding stage (refer to FIG. 16).

Further, while, in the embodiment described hereinabove, a case wherein the phase shifter (phase controlling region) 4 is provided between the fourth channel (port) on the output side of the 2:4 MMI coupler 2 and the first channel (port) on the input side of the 2:2 MMI coupler 3 is taken as an example, the provision of the phase shifter 4 is not limited to this.

For example, the phase controlling region may be provided between the third channel (port) on the output side of the 2:4 MMI coupler 2 and the first channel (port) on the input side of the 2:2 MMI coupler 3 as illustrated in FIG. 19A. In other words, a phase shifter 4A may be provided for the other one of the pair of output channels (a pair of second output channels neighboring with each other) of the 2:4 MMI coupler 2 to which the 2:2 MMI coupler 3 is connected.

In this instance, the phase shifter 4A is similar to that in the embodiment described hereinabove in that it includes a waveguide type phase shifter wherein the width of the optical waveguides for connecting the output ports of the 2:4 MMI coupler 2 and the input ports of the 2:2 MMI coupler 3 is varied such that the optical waveguide has a tapered shape. However, the shape of the tapered optical waveguide is different from that in the embodiment described hereinabove. In particular, the phase shifter 4A is formed such that the width of the optical waveguide of the output port of the 2:4 MMI coupler 2 and the input port of the 2:2 MMI coupler 3 decreases linearly from the output port to the middle position in the lengthwise direction and then increases linearly from the middle position toward the input port. In this instance, the phase of light inputted to the first channel on the input side of the 2:2 MMI coupler 3 advances with respect to light inputted to the second channel on the input side of the 2:2 MMI coupler 3.

In particular, the waveguide width W of portions of the tapered optical waveguide (the phase shifter 4) which are connected to the output port of the 2:4 MMI coupler 2 and the input port of the 2:2 MMI coupler 3 is approximately 2.0 µm. Meanwhile, both of the distances $L_{TP}$ from the output port of the 2:4 MMI coupler 2 and the input port of the 2:2 MMI coupler 3 to the middle position in the lengthwise direction are set to approximately 20 µm. In other words, the length (tepar length) of both of a width-decreasing tapered portion along which the waveguide width decreases linearly from the output port of the 2:4 MMI coupler 2 to the middle position in the lengthwise direction and a width-increasing tapered portion along which the waveguide width increases linearly from the middle position in the lengthwise direction to the input port of the 2:2 MMI coupler 3 are set to approximately 20 µm. In this instance, the waveguide width $W_{MID}$ at the intermediate position in the lengthwise position is approximately 1.6 µm. Meanwhile, the length $L_{phase}$ of the phase shifter is approximately 40 µm.

It is to be noted that the values of the parameters regarding the phase shifter 4A, that is, of the taper length $L_{TP}$ and the waveguide width $W_{MID}$, are not limited to the values given above, but may be set such that a phase displacement (phase shift amount) corresponding to π/4 may be provided between two signal components to be inputted to the 2:2 MMI coupler 2.

Also where the configuration described is adopted, a phase shift corresponding to π/4 can be provided similarly as in the embodiment described hereinabove, and similar effects to those of the embodiment described hereinabove can be achieved [refer to, for example, FIGS. 9 and 10B].

Further, while, in the embodiment described above, a case wherein a pair of second optical signals having an in-phase relationship with each other is converted into a pair of third optical signals having a quadrature phase relationship with the pair of first optical signals, the optical conversion is not limited to this.

Figures 20A, 20B:
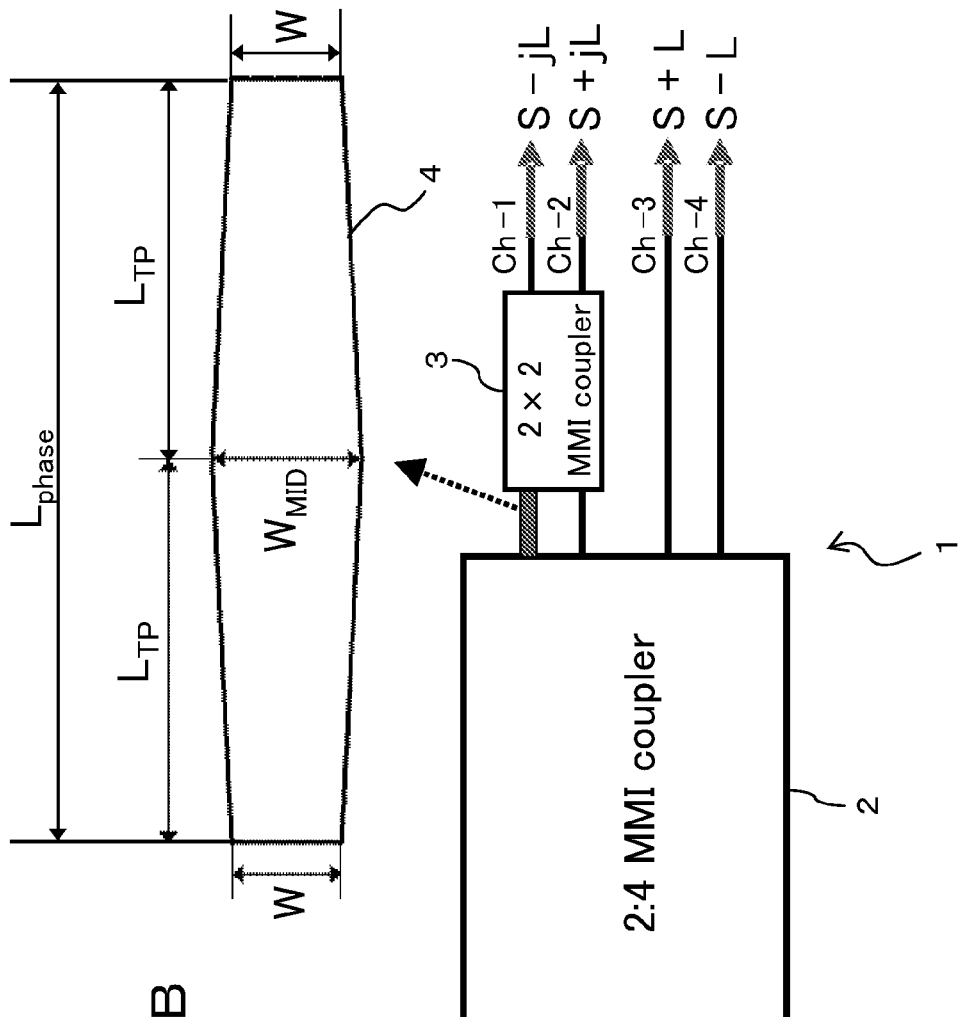
FIGS. 20A and 20B are schematic views illustrating a configuration of an optical hybrid apparatus according to a yet further modification to the first embodiment.
Figures 21A, 21B:
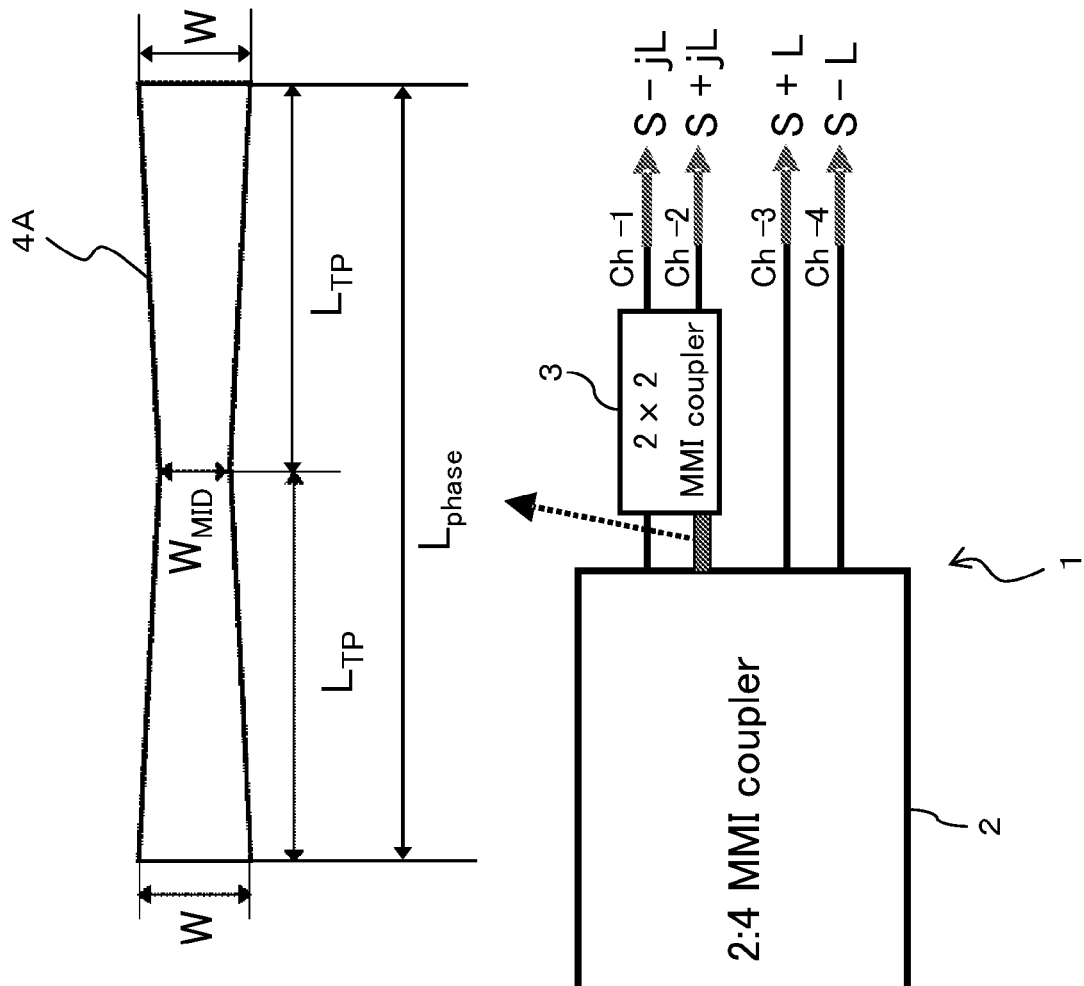
FIGS. 21A and 21B are schematic views illustrating a configuration of an optical hybrid apparatus according to a yet further modification to the first embodiment.

For example, the optical coupler 3 may convert a pair of first optical signals having an in-phase relationship with each other into a pair of third optical signals having a quadrature phase relationship with the pair of first optical signals as illustrated in FIGS. 20A and 21A.

In this instance, the optical coupler 3 is connected to a pair of first output channels neighboring with each other on the output side of the MMI coupler 2 at the preceding stage as seen in FIGS. 20A and 21A.

In particular, as illustrated in FIGS. 20A and 21A, the 2:2 MMI coupler 3 is connected to the two first and second channels (that is, a pair of first output channels neighboring with each other) from above on the output side of the 2:4 MMI coupler 2.

Meanwhile, the phase shifter (phase controlling region) 4 or 4A may be provided for one of the pair of first output channels of the MMI coupler 2 at the preceding stage to which the optical coupler 3 is connected as illustrated in FIGS. 20A and 21A.

For example, the phase shifter 4 may be provided between the first channel (port) on the output side of the 2:4 MMI coupler 2 and the first channel (port) on the input side of the 2:2 MMI coupler 3 as illustrated in FIG. 20A.

In this instance, as the phase shifter 4, a waveguide type phase shifter wherein the width of an optical waveguide for connecting an output port of the 2:4 MMI coupler 2 and an input port of the 2:2 MMI coupler 3 is varied in a tapered manner may be formed in a similar manner as in the case of the embodiment described hereinabove (refer to FIG. 8). In particular, the phase shifter 4 is formed such that the width of the optical waveguide between the output port of the 2:4 MMI coupler 2 and the input port of the 2:2 MMI coupler 3 increases linearly from the output port toward the middle position in the lengthwise direction and then decreases linearly from the middle position toward the input port as illustrated in FIG. 20B. In this instance, the parameters which define the structure of the phase shifter 4 may be set similarly to those in the case of the embodiment described hereinabove (refer to FIG. 8).

Or, for example, the phase shifter 4A may be provided between the second channel (port) on the output side of the 2:4 MMI coupler 2 and the second channel (port) on the input side of the 2:2 MMI coupler 3 as illustrated in FIG. 21A.

In this instance, as the phase shifter 4A, a waveguide type phase shifter wherein the width of the optical waveguide which connects the output port of the 2:4 MMI coupler 2 and the input port of the 2:2 MMI coupler 3 to each other is varied in a tapered manner may be formed similarly as in the case of the modification described hereinabove [refer to FIG. 19B]. In particular, the phase shifter 4A may be formed such that the width of the optical waveguide between the output port of the 2:4 MMI coupler 2 and the input port of the 2:2 MMI coupler 3 decreases linearly from the output port toward the middle position in the lengthwise direction and then increases linearly from the middle position toward the input port as illustrated in FIG. 21B. In this instance, the parameters which define the structure of the phase shifter 4A may be set similarly to those in the case of the modification described hereinabove [refer to FIG. 19B].

Where such a configuration as just described is adopted, the positional relationship of the In-phase output signals and the Quadrature output signals of the 90-degree hybrid is reversed from that of the embodiment and modifications described hereinabove. Further, where the relative phase difference $\Delta\phi$ is 0, n, $-\pi/2$ and $+\pi/2$, the output intensity ratio is 1:1:0:2, 1:1:2:0, 2:0:1:1, and 0:2:1:1, respectively.

Further, while, in the embodiment described hereinabove, a tapered phase shifter wherein the waveguide width is varied linearly is provided in the phase controlling region, the provision of the phase shifter is not limited to this. For example, a tapered phase shifter wherein the waveguide width is varied in an exponential function, a tapered phase shifter wherein the waveguide width is varied in a sine wave function, a tapered phase shifter wherein the waveguide width is varied in an elliptical function or the like may be provided. Also in those cases, similar effects can be achieved. Further, in the phase controlling region, for example, the waveguide width may be fixed while electrodes are provided such that phase control is carried out through current injection or voltage application, or heater electrodes may be provided to carry out phase control through application of heat. Also in those cases, similar effects can be achieved.

Second Embodiment

First, an optical hybrid circuit according to a second embodiment is described with reference to FIGS. 22A to 30B.

The optical hybrid circuit according to the present embodiment is different from that of the first embodiment described hereinabove in the configuration of the MMI coupler (2:4 MMI coupler) at the preceding stage and in that it includes no phase shifter. In the present embodiment, the optical hybrid circuit 1X includes a multimode interference (MMI coupler) 2B at a preceding stage and an optical coupler 3 at a succeeding state, which are connected in cascade connection to each other.

Here, the MMI coupler 2B at the preceding stage is a 2:4 MMI coupler which has two channels on the input side thereof and four channels on the output side thereof.

In particular, the MMI coupler 2B is a 2:4 MMI coupler which is based on paired interference (PI). In particular, the MMI coupler 2B is a 2:4 MMI coupler wherein the centers of the two input channels are positioned at ⅓ and ⅔ from above of the width of the input end and also the positions of the four output channels are associated with the positions of the input channels and a higher-order modes of the (3s−1)th order (s is a natural number greater than 1) is not excited in the MMI region. Therefore, the device length can be reduced.

Here, the optical hybrid circuit 1X uses mode interference action by the MMI coupler.

Normally, interference action between modes of an MMI coupler relies upon the reflective index, excited mode number, interference mechanism and so forth of the MMI coupler, and the amplitude relationship and the phase relationship of output signals of the MMI coupler vary depending upon the interference action between the modes.

Here, a theory of the MMI is described briefly (refer to, for example, Lucas B. Soldano et al., "Optical Multi-Mode Interference Devices Based on Self-Imaging: Principles and Applications", Journal of Lightwave Technology, Vol. 13, No. 4, pp. 615-627, April 1995, the entire content of which is incorporated herein by reference).

Figure 23:
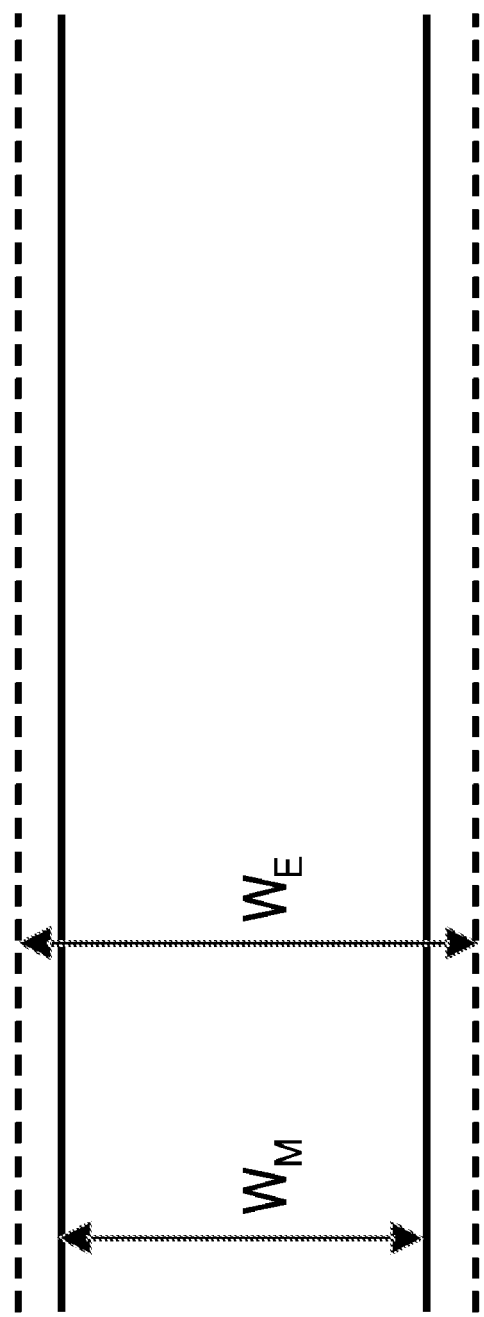
FIG. 23 is a conceptual view of an MMI waveguide.

FIG. 23 illustrates a schematic view of an MMI waveguide.

Usually, within an MMI waveguide (MMI region), the wave number ($k_{yv}$) and the propagation constant ($\beta_v$) is associated with each other by a dispersion equation given by the following expression (1):

$$k_{yv}^2 + \beta_v^2 = k_0^2 n_r^2 \tag{1}$$

where v is the order of the excited mode, $k_{yv}$ is the wave number of the propagating transverse mode, $k_0$ is the wave number in the vacuum, and $n_r$ is the refractive index of the MMI waveguide. It is to be noted that, if $k_{yv} \ll k_0 n_r$ is assumed, then $\beta_v$ can be simplified into the following expression (2):

$$\beta_v = k_0 n_r - \frac{(v+1)^2 \pi \lambda}{4 n_r W_E^2} \tag{2}$$

where $W_E$ is an equivalent MMI width including mode leakage (also called Goose-Henshen shift) into the cladding region of the MMI waveguide. In this instance, a waveguide having a great relative refractive index difference like a high mesa waveguide satisfies a relationship of $W_E \approx W_M$ ($W_M$: physical width of the MMI waveguide; MMI width).

In this instance, the propagation constant difference between the fundamental mode and an arbitrary higher-order mode excited in the MMI waveguide is represented by the following expression (3):

$$\beta_0 - \beta_v \cong \frac{v(v+2)\pi\lambda}{4 n_r W_M^2} = \frac{v(v+2)\pi}{3 L_\pi} \tag{3}$$

where $L_\pi$ is the beat length and is a factor defined as $\pi/(\beta_0 - \beta_1)$.

After all, the field distribution (W) at an arbitrary position of the MMI waveguide can be represented by the following expression (4):

$$\Psi(y, z) = \sum_{v=0}^{m-1} c_v \Phi_v(y) \exp(j(\beta_0 - \beta_v)z) \quad (4)$$

where $c_v$ is the mode excitation coefficient, and $\Phi_v(y)$ is the transverse mode distribution in the MMI waveguide.

As indicated by the expression (4) above, the field distribution at an arbitrary position of the MMI waveguide is represented by a superposition of the excited modes.

The term represented by an exponential function in the expression (4) above is a term representative of a mode phase and can be represented by the following expression $$\exp(j(\beta_0 - \beta_v)z) = \exp\left(j\frac{v(v+2)\pi}{3L_\pi}z\right) \quad (5)$$

In particular, the mode phase term varies depending upon the arbitrary position z in the propagation direction of the MMI waveguide.

For example, with such a 4:4 MMI coupler as illustrated in FIG. 50A, 90-degree hybrid operation is obtained.

Here, the 4:4 MMI coupler is based on general mode interference (GI: General Interference). In particular, this is a 4:4 MMI coupler wherein the centers of the four input channels are positioned in a region except the positions of ⅓, ½ and ⅔ of the MMI width $W_M$ within a range within which the center symmetry property of the MMI waveguide is not lost and all modes according to the MMI width $W_M$ are excited.

In this instance, the minimum propagation length $z^{GI}$ for obtaining an x equal branching characteristic (x is an integer greater than 1) is given by the following expression:

$$z^{GI} = \frac{3L_\pi}{P} \quad (6)$$

Accordingly, in the case of the 4:4 MMI coupler illustrated in FIG. 50A, the minimum propagation length $z^{GI}$ for branching into four equal branches is $3L_\pi/4$.

Meanwhile, for example, in such a 2:4 MMI coupler based on PI as illustrated in FIG. 6, the minimum propagation length $z^{PI}$ for obtaining an x equal branching characteristic is given by the following expression and $z^{PI}$ has a value equal to ⅓ that of $z^{GI}$.

$$z^{PI} = \frac{L_\pi}{P} = \frac{1}{3}z^{GI} \quad (7)$$

In particular, the expression (7) corresponds to reduction of the period of the mode phase term in the expression (5) given hereinabove to ⅓. Where the MMI width $W_M$ is equal, from the expressions (6) and (7), the 2:4 MMI coupler has an MMI length equal to ⅓ that of the 4:4 MMI coupler.

However, as illustrated in FIGS. 50A and 6, the output channel positions are different depending upon the interference mechanism, and even if the MMI width $W_M$ is equal, the minimum distance (Gap) between the input/output channels, that is, the distance between the output channels, is not equal. In any MMI coupler, it is necessary to reduce the MMI width $W_M$ in order to reduce the MMI length, and also the minimum distance between the input/output channels decreases accordingly. It is to be noted that the minimum distance between the input/output channels normally is a parameter restricted by a fabrication technique.

Since the minimum distance between the input/output channels of the MMI coupler based on is smaller than that of the MMI coupler based on GI as illustrated in FIGS. 50A and 6, in order to fix the minimum distance between the input/output channels, it is necessary to increase the MMI width $W_M$ based on PI.

Accordingly, $z^{PI}$ where the minimum distance between the input/output channels is fixed is represented by the following expression:

$$z^{PI} = \frac{3}{4}z^{GI} \quad (8)$$

In particular, if the minimum distance between the input/output channels is fixed, then the shortening effect by PI decreases to ¾ time. Anyway, since the MMI coupler based on PI always has an interaction length (propagation length: MMI length) shorter than that of the MMI coupler based on GI, it is effective to form a compact device (light branching and coupling device).

It is to be noted, although the MMI coupler 2B based on PI is used here, the 2:4 MMI coupler is not limited to this, but any 2:4 MMI coupler wherein a pair of input channels are provided at symmetrical positions with respect to the center position in the widthwise direction such that the 2:4 MMI coupler has a center symmetrical structure may be used. For example, a 2:4 MMI coupler based on general interference (GI) may be used. In particular, a 2:4 MMI coupler may be used wherein the centers of the two input channels are positioned in a region except the positions of ⅓ and ⅔ of the MMI width within a range within which the center symmetric property of the MMI region is not lost and all modes according to the MMI width are excited.

Incidentally, as described hereinabove in connection with the first embodiment, where such a configuration as illustrated in FIG. 3A is used, it is considered that, where the relative phase difference $\Delta\phi$ is $-\pi/2$ and $+\pi/2$, a characteristic may deteriorate with output components of the third and fourth output channels.

In order to prevent deterioration of the characteristic so that 90-degree hybrid operation may be obtained with certainty, it is necessary to establish a phase matching between the output signals of the third and fourth output channels of the 2:4 MMI coupler 2B and the 2:2 MMI coupler 3.

In particular, the deterioration of the characteristic is eliminated if the phase of light (a pair of second optical signals) outputted from one (or both) of the third and fourth output channels of the 2:4 MMI coupler 2B is controlled so that the phase difference $\Delta\theta$ between the pair of second optical signals becomes $\pi/2 + p^*\pi$ (p is an integer).

However, since the phase difference $\Delta\theta$ between a pair of second optical signals outputted from a conventional 2:4 MMI coupler becomes substantially equal to $\pi/4 + p^*\pi$ (p is an integer), it is not easy to prevent occurrence of characteristic deterioration of a quadrature phase component.

Figure 22A:
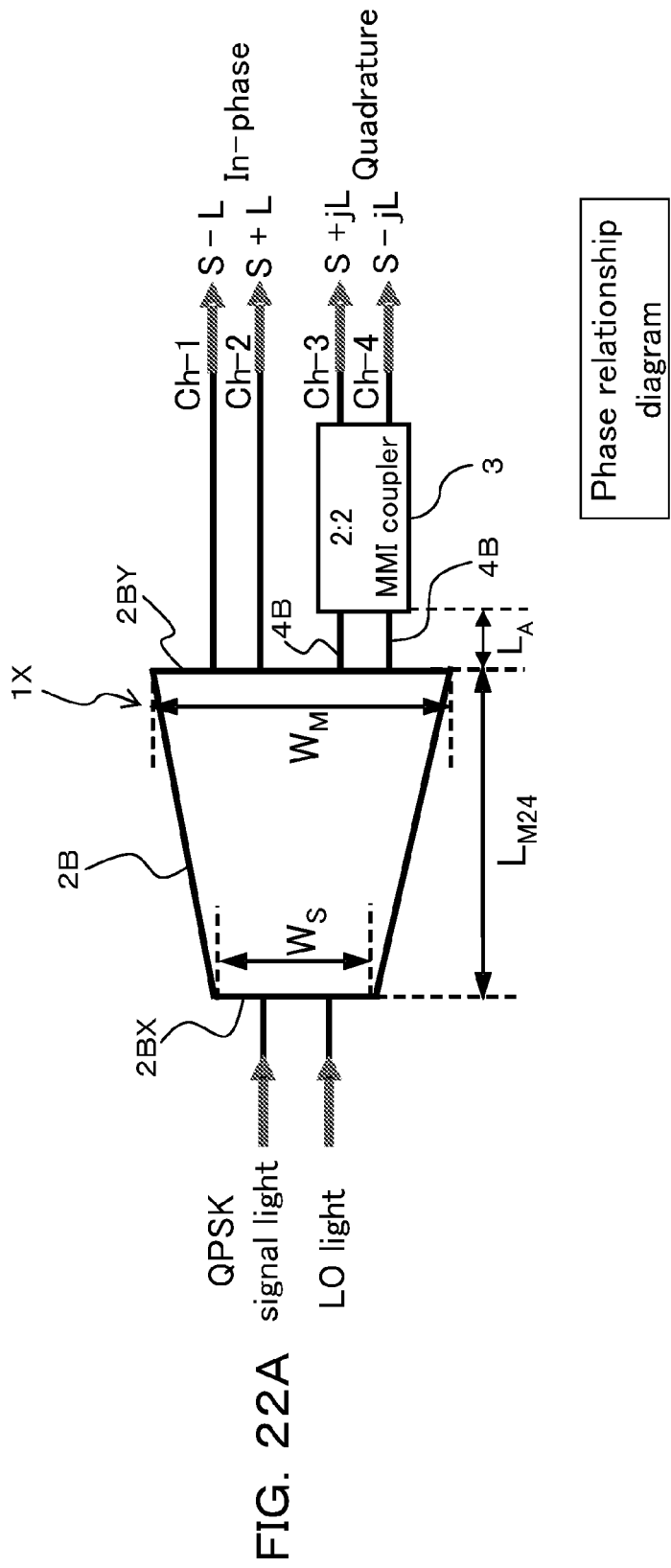
FIG. 22A is a schematic view illustrating a configuration of an optical hybrid circuit according to a second embodiment.

Therefore, in the present embodiment, the 2:4 MMI coupler 2B is formed such that it has a shape (width tapered structure) wherein the width (waveguide width) varies in a tapered manner toward the propagation direction as illustrated in FIG. 22A so that characteristic deterioration of a quadrature phase component may not occur. In particular, the width tapered structure of the 2:4 MMI coupler 2B is adopted such that the phase difference Δθ between a pair of second optical signals to be outputted from the 2:4 MMI coupler 2B may be π/2+p*π (p is an integer) in order that the phase difference of the lights to be inputted to the two channels on the input side of the 2:2 MMI coupler 3 may be 90 degrees.

In this instance, the 2:4 MMI coupler 2B (inclined 2:4 MMI coupler) has an input end 2BX of a first width $W_S$ and an output end 2BY of a second width $W_M$ different from the first width $W_S$ and is configured such that the phase difference Δθ between a pair of second optical signals becomes π/2+p*π (p is an integer).

In particular, the 2:4 MMI coupler 2B has a tapered shape (linear function tapered shape) in which the width (MMI width) thereof varies in a linear function toward the propagation direction. Here, the 2:4 MMI coupler 2B has a tapered shape in which the width thereof increases linearly from the input end 2BX toward the output end 2BY.

Usually, if a width taper is formed on the 2:4 MMI coupler 2B, then the mode phase term in the expression (5) given hereinabove varies depending upon the variation of the difference in propagation constant between excited modes defined by the expression (3) given hereinabove, and as a result, the field distribution represented by the expression (4) varies. Accordingly, both of the amplitude characteristic and the phase characteristic of the 2:4 MMI coupler 2B vary.

As illustrated in FIG. 22A, where the MMI width varies in a linear function, the propagation constant difference between the fundamental mode and an arbitrary higher-order mode varies locally.

In this instance, the net phase shift (Δρ) in the MMI region is represented by the follow expression (9):

$$\Delta\rho = \int_0^{L_{M24}} (\beta_0 - \beta_v) dz = \frac{v(v+2)\pi\lambda}{4n_r} \int_0^{L_{M24}} \frac{dz}{W_M^2(z)} \quad (9)$$

where $W_M(z)$ represents the width taper function, and $L_{M24}$ the 2:4 MMI length.

In the case of the inclined 2:4 MMI coupler 2B illustrated in FIG. 22A, $W_M(z)$ can be represented by the following expression:

$$W_M(z) = W_S + (W_M - W_S)\frac{z}{L_{M24}} \quad (10)$$

From the expressions (9) and (10) given above, the propagation constant difference $\langle\beta_0-\beta_v\rangle$ between the fundamental mode and an arbitrary higher-order mode is represented by the following expression:

$$\langle\beta_0 - \beta_v\rangle = \frac{v(v+2)\pi\lambda}{4n_r W_M^2} \chi^{ST} \quad (11)$$

$$\chi^{ST} = \frac{W_M}{W_S} \quad (12)$$

where $\chi^{ST}$ is a proportionality constant which relies upon the tapered shape.

From the expressions (11) and (12) given above, the beat length $L_\pi^{ST}$ of the 2:4 MMI coupler 2B having a linear function tapered shape can be represented by the following expression (13):

$$L_\pi^{ST} = \frac{L_\pi}{\chi^{ST}} \quad (13)$$

Accordingly, as the proportionality constant $\chi^{ST}$ increases, the beat length $L_\pi^{ST}$ of the 2:4 MMI coupler 2B having such a linear function tapered shape as illustrated in FIG. 22(A) decreases with respect to the beat length $L_\pi$ of a 2:4 MMI coupler (refer to FIG. 6) which does not have a tapered shape. It is to be noted that the MMI width of the 2:4 MMI coupler (refer to FIG. 6) which does not have a tapered shape is set equal to the width $W_M$ of the output end 2BY of the MMI coupler 2B having a linear function tapered shape in the present embodiment. Here, $1/\chi^{ST}$ is considered to be a parameter which represents a shortening ratio (a reduction ratio) of the MMI length $L_{M24}$ of the 2:4 MMI coupler 2B having a linear function tapered shape in the present embodiment with respect to the MMI length of the 2:4 MMI coupler (refer to FIG. 6) which does not have a tapered shape.

Meanwhile, the phase shift in the 2:4 MMI coupler 2B relies upon the tapered shape which varies like a linear function.

Therefore, by setting $\chi^{ST}$ so that, where Δφ is π/2 and +π/2, the phase difference Δθ between a pair of second optical signals to be outputted from the 2:4 MMI coupler 2B may become π/2+p*π (p is an integer), 90-degree hybrid operation is obtained with certainty. In other words, by setting $\chi^{ST}$ to a proper value, such an optical hybrid circuit as illustrated in FIG. 22A functions as a 90-degree hybrid. Also shortening of the 2:4 MMI length $L_{M24}$ can be anticipated.

Figure 24:
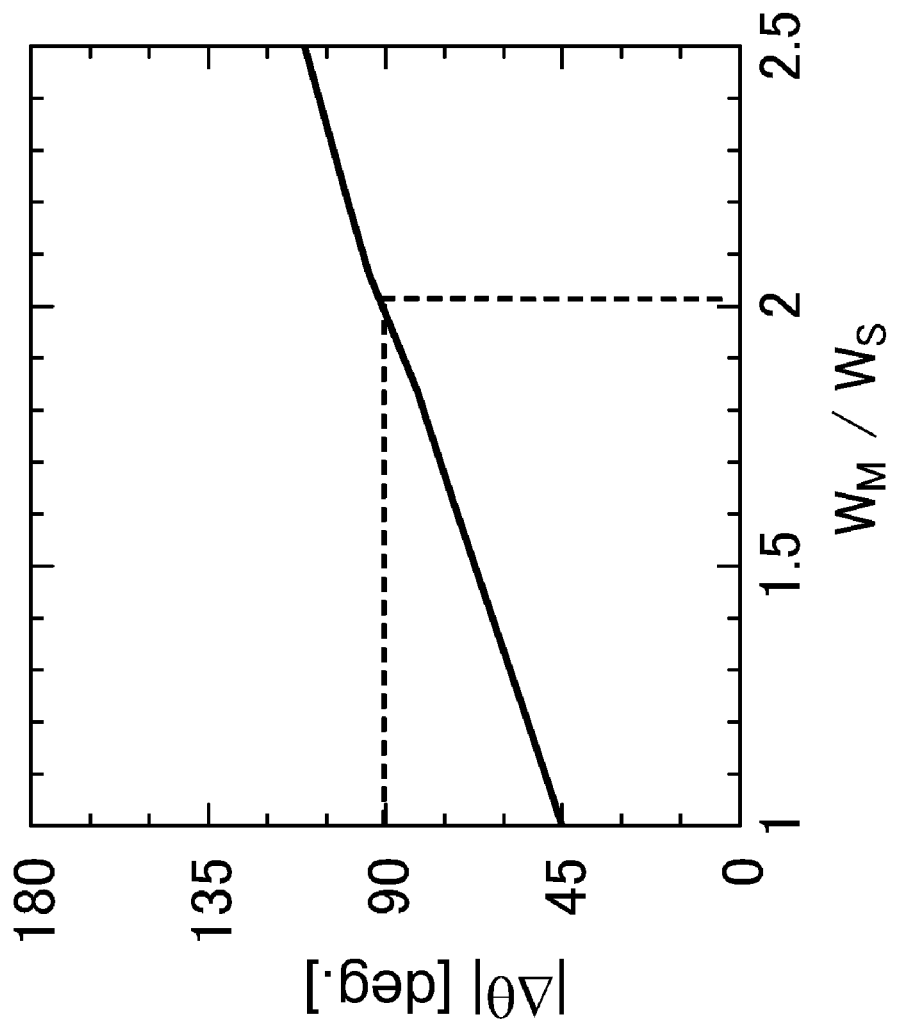
FIG. 24 is a view illustrating a relationship between a ratio $W_M/W_S$ between the width $W_S$ of an input end and the width $W_M$ of an output end of a 2:4 MMI coupler which composes the optical hybrid circuit according to the second embodiment and the absolute value $|\Delta\theta|$ of a phase difference between channels of output signals.

Here, FIG. 24 illustrates a relationship between the variation ratio of the MMI width of the 2:4 MMI coupler 2B, that is, the ratio $W_M/W_S$ between the width $W_S$ of the input end 2BX of the 2:4 MMI coupler 2B and the width $W_M$ of the output end 2BY of the 2:4 MMI coupler 2B and the absolute value |Δθ| of the inter-channel phase difference of the output signals. It is to be noted that, in FIG. 24, the absolute value |Δθ| of the inter-channel phase difference of the output signals is an absolute value of the inter-channel phase difference between the output signals (a pair of second optical signal) outputted from the third and fourth output channels of the 2:4 MMI coupler 2B.

Figure 25:
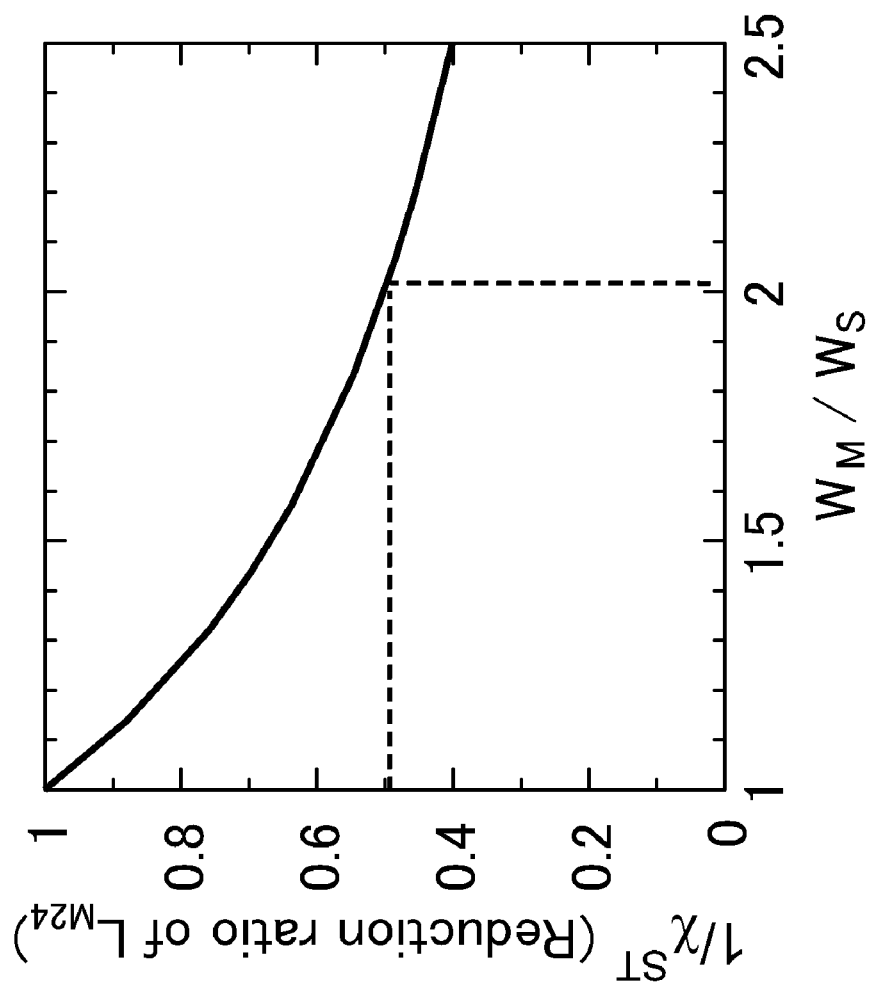
FIG. 25 is a view illustrating the ratio $W_M/W_S$ between the width $W_S$ of the input end and the width $W_M$ of the output end of the 2:4 MMI coupler which composes the optical hybrid circuit and $1/\chi^{ST}$ according to the second embodiment.

Meanwhile, FIG. 25 illustrates a relationship between the variation ratio $W_M/W_S$ of the MMI width of the 2:4 MMI coupler 2B and the reduction ratio of the 2:4 MMI length $L_{M24}$, that is, $1/\chi^{ST}$ (that is, $W_S/W_M$).

It is to be noted that, where the value of $W_M/W_S$ is 1, the 2:4 MMI coupler has no tapered shape (refer to FIG. 6). Here, the width $W_M$ of the output end 2BY of the 2:4 MMI coupler 2B is made equal (fixed) with respect to the 2:4 MMI coupler which has no tapered shape while the width $W_S$ of the input end 2BX is varied. It is to be noted that the width $W_S$ of the input end 2BX of the MMI coupler 2B may be fixed while the width $W_M$ of the output end 2BY is varied.

As illustrated in FIGS. 24 and 25, as the value of $W_M/W_S$ increases, the value of the absolute value |Δθ| of the inter-channel phase difference between the output signals increases linearly and the value of $1/\chi^{ST}$ decreases (the MMI length $L_{M24}$ is shortened).

Therefore, by setting the value of the width $W_S$ of the input end 2BX of the 2:4 MMI coupler 2B (that is, the value of $W_M/W_S$), the absolute value |Δθ| of the inter-channel phase difference between the output signals can be set to the desired value of π/2.

Here, as illustrated in FIG. 24, where the absolute value |Δθ| of the inter-channel phase difference between the output signals the value of $W_M/W_S$ is $\pi/2$ is 2, and as illustrated in FIG. 25, where the value of $W_M/W_S$ is 2 the value of $1/\chi^{ST}$ is approximately 0.48. In this instance, the value of $\chi^{ST}$ is approximately 2.06.

Accordingly, the MMI length $L_{M24}$ of the 2:4 MMI coupler 2B having a linear function tapered shape is $1/\chi^{ST}$ time, that is, approximately 0.48 times, the MMI length of the 2:4 MMI coupler (refer to FIG. 6) which does not have a tapered shape. In other words, the MMI length $L_{M24}$ of the MMI coupler 2B which has a linear function taper is equal to or smaller than one-half the MMI length of the 2:4 MMI coupler (refer to FIG. 6) which does not have a tapered shape.

Further, the relationships illustrated in FIGS. 24 and 25 are satisfied with regard to an arbitrary width $W_S$ of the input end 2BX and an arbitrary width $W_M$ of the output end 2BY. In other words, if an arbitrary width $W_S$ of the input end 2BX and an arbitrary width $W_M$ of the output end 2BY satisfy the condition of $X^{ST}$=approximately 2.06, then $|\Delta\theta|=\pi/2$ is satisfied, and 90-degree hybrid operation is obtained with certainty using the 2:4 MMI coupler 2B having such a linear function tapered shape as illustrated in FIG. 22A.

In particular, where the width $W_M$ of the output end 2BY of the 2:4 MMI coupler 2B is approximately 33 μm, the width $W_S$ of the input end 2BX is decided to approximately 16 μm (refer to FIG. 24) from the condition that the absolute value $|\Delta\theta|$ of the inter-channel phase difference of the output signals is ($|\Delta\theta|=\pi/2$). If the width $W_M$ of the output end 2BY and the width $W_S$ of the input end 2BX of the 2:4 MMI coupler 2B are decided in this manner, then the length $L_{M24}$ of the 2:4 MMI coupler 2B is decided to approximately 368 μm from the condition of $1/\chi^{ST}$=approximately 0.48, that is approximately 2.06. The linear function tapered shape of the 2:4 MMI coupler 2B is defined by an expression [taper function $W_M(z)$] obtained by substituting the values given above into the expression (10) given hereinabove.

If the width $W_M$ of the output end 2BY of the MMI coupler 2B having a linear function tapered shape is set to approximately 26.4 μm (corresponding to approximately 80% of the approximately 33 μm), then the desired width $W_S$ of the input end 2BX becomes approximately 12.8 μm (corresponding to approximately 80% of approximately 16 μm).

Figure 22B:
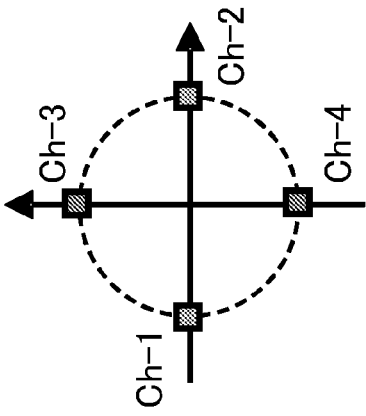
FIG. 22B is a phase relationship diagram illustrating a phase relationship of lights outputted from each of channels of the optical hybrid circuit illustrated in FIG. 22A.

Since a linear function tapered shape is defined in such a manner as described above and the MMI width is modulated with a predetermined taper function, the phase difference $\Delta\theta$ between a pair of second optical signals outputted from the 2:4 MMI coupler 2B becomes $\pi/2+p*\pi$ (p is an integer). Therefore, the optical hybrid circuit 1x outputs a pair of first optical signals (S−L and S+L) having an in-phase relationship with each other and a pair of third optical signals (S−jL and S+jL) having a quadrature phase relationship with the pair of first optical signals as illustrated in FIGS. 22A and 22B. Consequently, 90-degree hybrid operation is obtained with certainty. In short, QPSK signal light is converted into a pair of first optical signals which include only an in-phase component (I-component) and a pair of third optical signals which include only a quadrature phase components (Q-component) as illustrated in FIGS. 22A and 22B by the optical hybrid circuit 1X, and consequently, 90-degree hybrid operation is obtained with certainty.

Here, the pair of first optical signals having an in-phase relationship with each other, that is, the pair of first optical signals which include only an in-phase component, are a pair of optical signals whose phases are displaced by 180 degrees from each other. On the other hand, the pair of third optical signals having a quadrature phase relationship with the pair of first optical signals, that is, the pair of third optical signals which include only a quadrature phase component, are a pair of optical signals whose phases are displaced by 90 degrees from those of the pair of first optical signals. It is to be noted that the pair of third optical signals are a pair of optical signals whose phases are displaced by 180 degrees from each other.

It is to be noted that reference characters S−L, S+L, S+jL and S−jL in FIG. 22A indicate what relative relationship the phase of LO light (L) has with reference to the phase of signal light (S). Here, S−L and S+L indicate that they have a phase relationship displaced by 180 degrees from each other, and S+jL and S−jL have a phase relationship displaced by 90 degrees with respect to S+L and S−L, respectively. Further, the phase relationship diagram of FIG. 22B illustrates a phase relationship of optical signals outputted in response to a relative phase difference between the QPSK signal light and the LO light.

Now, examples (refer to FIGS. 5, 7A and 7B) of a particular configuration of the optical semiconductor device which forms the optical hybrid circuit of the present embodiment are described.

The present optical hybrid circuit 1X is an optical semiconductor device 13 which includes a GaInAsP core layer 11 and an InP cladding layer 12 provided on an InP substrate 10 and has a high mesa waveguide structure similarly as in the case of the first embodiment described hereinabove.

Here, the 2:4 MMI coupler 2B is set in the following manner.

In particular, where the width of the input end 2BX of the 2:4 MMI coupler 2B is $W_S$, the two input channels (input waveguides) are provided such that the centers thereof are positioned at ⅓ and ⅔ from above of the width $W_S$ of the input end 2BX of the 2:4 MMI coupler 2B. Further, where the width of the output end 2BY of the 2:4 MMI coupler 2B is $W_M$, the four output channels (output waveguides) are provided such that a middle position of the two first and second output channels from above and a middle position of the two third and fourth output channels from above are positioned at ¼ and ¾ from above of the width $W_M$ of the output end 2BY of the 2:4 MMI coupler 2B, respectively. Further, the distance (gap) between the two first and second output channels and the distance (gap) between the two third and fourth output channels are both set to ⅙ the width $W_M$ of the output end 2BY of the 2:4 MMI coupler 2B. It is to be noted here that the width $W_M$ of the output end 2BY of the 2:4 MMI coupler 2B is equal to the MMI width of the 2:4 MMI coupler (refer to FIG. 6) which does not have a tapered shape.

For example, the 2:4 MMI coupler 2B is configured such that the minimum distance between the input/output channels, that is, the distance ($W_M/6$) between two output channels, is set to approximately 3.5 μm and the waveguide width (input/output waveguide width) W of the input channels and the output channels is set, for example, to approximately 2.0 μm such that the single mode condition is satisfied. Consequently, the width $W_M$ of the output end 2BY of the 2:4 MMI coupler 2B is decided to approximately 33 μm. Further, in order to establish a phase matching between the two signal components to be inputted to the 2:2 MMI coupler 3, the width $W_S$ of the input end 2BX of the 2:4 MMI coupler 2B is decided to approximately 16 μm from the condition of the absolute value $|\Delta\theta|$ of the inter-channel phase difference of the output signals is $\pi2$ ($|\Delta\theta|=\pi/2$). If the width $W_S$ of the input end 2BX and the width $W_M$ of the output end 2BY of the 2:4 MMI coupler 2B is decided in this manner, then the length $L_{M24}$ of the MMI coupler 2B is decided to 368 μm from the condition of $1/\chi^{ST}$=approximately 0.48, that is, $\chi^{ST}$=approximately 2.06. As a result, the MMI width of the 2:4 MMI coupler 2B comes to have a tapered shape (linear function tapered shape) wherein the width increases linearly from the input end 2BX toward the output end 2BY.

It is to be noted that the parameters regarding the 2:4 MMI coupler 2B are not limited to the values given above, but only it is necessary to set the parameters so that a phase displacement (phase shift amount) corresponding to $\pi/4$ can be provided between the two signal components to be inputted to the 2:2 MMI coupler 3. For example, only it is necessary to provide a phase shift amount corresponding to $\pi/4 \times 2n\pi$ (n is an integer). Alto in this instance, similar effects are achieved.

Further, the 2:2 MMI coupler 3 is set in the following manner.

In particular, where the 2:2 MMI coupler 3 is based on PI [refer to FIG. 7A], the two input channels (input waveguides) are provided such that the centers thereof are positioned at $W_M/6$ from the side faces of the MMI region with reference to the width $W_M$ of the output end 2BY of the 2:4 MMI coupler 2B. Also the two output channels (output waveguides) are provided such that the centers thereof are positioned at $W_M/6$ from the side faces of the MMI region. Furthermore, both of the distances (gaps) between the two input/output channels are set to $W_M/6$. Therefore, the width (MMI width) $W_{M22}$ of the MMI region of the 2:2 MMI coupler 3 becomes $W_M/2$.

Meanwhile, where 2:2 MMI coupler 3 is based on GI [refer to FIG. 7(B)], the two input channels (input waveguides) are provided such that the centers thereof are positioned at any other than $W_M/6$ from the side faces of the MMI region and have a center symmetrical property with reference to the width $W_M$ of the output end 2BY of the 2:4 MMI coupler 2B. In other words, the two input channels are individually provided such that the centers thereof are positioned at distances K (arbitrary real number greater than 0 except $K=W_M/6$) from the side faces of the MMI region. Also the two output channels (output waveguides) are provided such that the centers thereof are individually positioned at any other than $W_M/6$ from the side faces of the MMI region. In other words, the two output channels are provided such that the centers thereof are individually positioned at distances K (arbitrary real number greater than 0 except $K=W_M/6$) from the side faces of the MMI region. Furthermore, both of the distances (gaps) between the two input/output channels are set to $W_M/6$. Therefore, the width (MMI width) $W_{M22}$ of the MMI region of the 2:2 MMI coupler 3 becomes $2K+W_M/6$.

For example, the 2:2 MMI coupler 3 based on GI is configured such that the minimum distance between the input/output channels, that is, the distance ($W_M/6$) between the two input channels and between the two output channels, is set to approximately 3.5 µm and the waveguide width (input/output waveguide width) W of the input channels and the output channels is set, for example, to approximately 2.0 µm such that the single mode condition is satisfied. Consequently, the MMI width $W_{M22}$ is decided to approximately 7.5 µm. In this instance, the length $L_{M22}$ of the 2:2 MMI coupler becomes approximately 235 µm.

Here, FIGS. 26A to 26D illustrate an input/output characteristic where QPSK signal light (Signal) and LO light of a wavelength of approximately 1.55 µm are inputted to the optical hybrid circuit 1X configured in such a manner as described above for each of the relative phase differences $\Delta\phi$ between the QPSK signal light and the LO light. It is to be noted that the 2:4 MMI coupler 2B is configured such that the width $W_M$ of the output end 2BY is approximately 33 µm and the width $W_S$ of the input end 2BX is approximately 16 µm and consequently the 2:4 MMI coupler 2B has a linear function tapered shape which satisfies the condition of $\chi^{ST}$=approximately 2.06.

It is to be noted that the calculation results illustrated in FIGS. 26(A) to 26(D) are based on a beam propagation method (BPM). In particular, FIG. 26(A) illustrates an input/output characteristic where the relative phase difference $\Delta\phi$ is 0; FIG. 26B illustrates an input/output characteristic where the relative phase difference $\Delta\phi$ is $\pi$; FIG. 26C illustrates an input/output characteristic where the relative phase difference $\Delta\phi$ is $-\pi/2$; and FIG. 26D illustrates an input/output characteristic where the relative phase difference $\Delta\phi$ is $+\pi/2$.

As illustrated in FIGS. 26A and 26B, where the relative phase difference $\Delta\phi$ is 0 and $\pi$, the output intensity ratios of the optical hybrid circuit 1X are 0:2:1:1 and 2:0:1:1, respectively.

On the other hand, as illustrated in FIGS. 26(C) and 26D, where the relative phase difference $\Delta\phi$ is $\pi/2$ and $+\pi/2$, the output intensity ratios of the optical hybrid circuit 1X are 1:1:2:0 and 1:1:0:2, respectively.

In this manner, with the present optical hybrid circuit 1X, output forms having different branching ratios from each other are obtained in response to different phase states of QPSK signal light.

Further, the present optical hybrid circuit 1X uses a 2:4 MMI coupler 2B having a linear function tapered shape wherein the width $W_M$ of the output end 2BY and the width $W_S$ of the input end 2BX of the 2:4 MMI coupler 2B satisfy the condition of $|\Delta\theta|=\pi/2$ and the length $L_{M24}$ of the MMI coupler 2B satisfies the condition of $\chi^{ST}$=approximately 2.06. Therefore, no crosstalk occurs between the output signals from the 2:2 MMI coupler 3. Accordingly, the optical hybrid circuit 1X functions as a 90-degree hybrid.

Figure 27A:
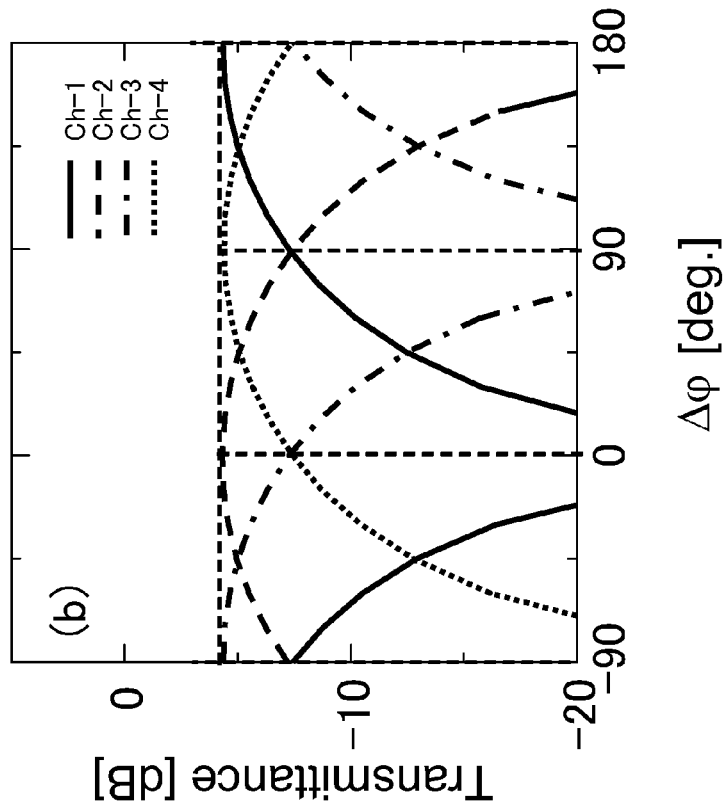
FIG. 27A is a view illustrating a relative output intensity (Transmittance) of the 90-degree hybrid which uses a 4:4 MMI coupler with respect to $\Delta\phi$.
Figure 27B:
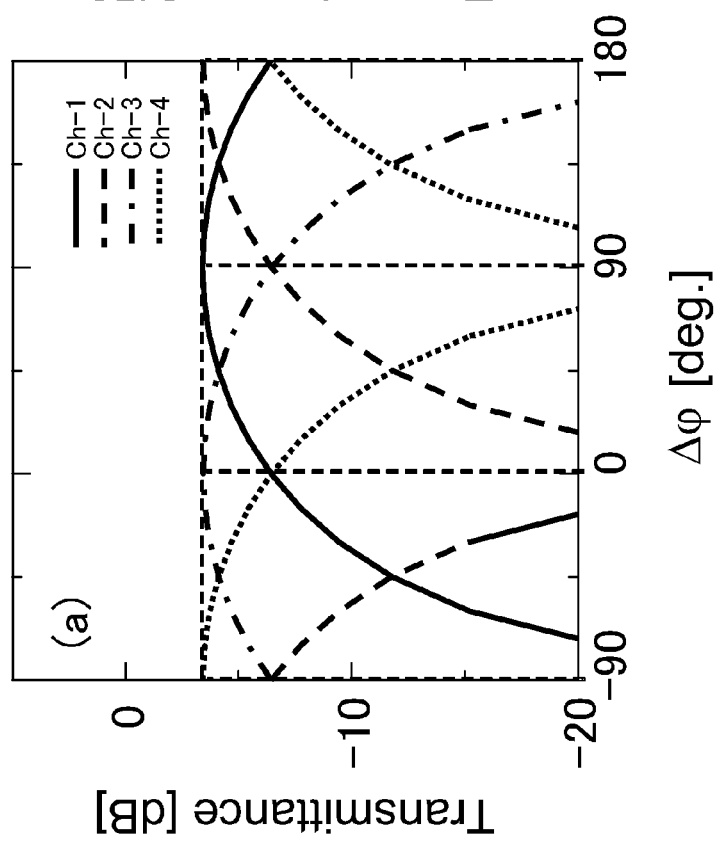
FIG. 27B is a view illustrating a relative output intensity (Transmittance) of the 90-degree hybrid according to the second embodiment with respect to $\Delta\phi$.

FIG. 27A illustrates a relative output intensity (transmittance) with respect to the relative phase difference $\Delta\phi$ of the conventional 90-degree hybrid [refer to FIG. 50A] which uses a 4:4 MMI coupler, and FIG. 27B illustrates a relative output intensity (transmittance) with respect to the relative phase difference $\Delta\phi$ of the present 90-degree hybrid.

It is to be noted that FIGS. 27A and 27B illustrate relative intensity of each of the output channels where the relative phase difference $\Delta\phi$ varies continuously.

As illustrated in FIGS. 27A and 27B, in all cases, the relative output intensity with respect to the relative phase difference $\Delta\phi$ varies in a sine wave function. However, in FIG. 27A, the relative output intensity is plotted reflecting the phase difference of 45 degrees which is inevitably caused by mode interference of the 4:4 MMI coupler.

As illustrated in FIG. 27A, it can be recognized that, with the conventional 90-degree hybrid, the output intensity variation of the first output channel (Ch-1) and the output intensity variation of the fourth output channel (Ch-4) have a relationship in phase displaced by 180 degrees from each other. Further, it can be recognized that the output intensity variation of the second output channel (Ch-2) and the output intensity variation of the third output channel (Ch-3) have a relationship in phase displaced by 180 degrees from each other.

It can be recognized that, particularly where the relative phase difference $\Delta\phi$ is 0, the output intensity of the third output channel (Ch-3) is the highest. Meanwhile, it is recognized that, where the relative phase difference $\Delta\phi$ is n, the output intensity of the second output channel (Ch-2) is the highest. Further, it is recognized that, where the relative phase difference $\Delta\phi$ is $-\pi/2$, the output intensity of the fourth output channel (Ch-4) is the highest. Further, it is recognized that, where the relative phase difference $\Delta\phi$ is $+\pi/2$, the output intensity of the first output channel (Ch-1) is the highest.

In this instance, the optical signal outputted from the first output channel (Ch-1) and the optical signal outputted from the fourth output channel (Ch-4) have an in-phase relationship with each other. Meanwhile, the optical signal outputted from the second output channel (Ch-2) and the optical signal outputted from the third output channel (Ch-3) have an in-phase relationship with each other. Further, the optical signals outputted from the second and third output channels have a quadrature phase relationship with the optical signals outputted from the first and fourth output channels.

This signifies that, in order to input optical signals outputted from the conventional 90-degree hybrid to photodiodes (BPDs) for photoelectric conversion, intersection of optical waveguides cannot be avoided (refer to FIG. 51). Therefore, excessive loss is caused by the intersection of the optical waveguides, and the optical reception efficiency deteriorates.

In contrast, as illustrated in FIG. 27B, it is recognized that, in the present 90-degree hybrid 1, the phases of the output intensity variation of the first output channel (Ch-1) and the output intensity variation of the second output channel (Ch-2) have a relationship that they are displaced by 180 degrees from each other. Further, it is recognized that the phases of the output intensity variation of the third output channel (Ch-3) and the output intensity variation of the fourth output channel (Ch-4) have a relationship that they are displaced by 180 degrees from each other.

It can be recognized that, particularly where the relative phase difference $\Delta\phi$ is 0, the output intensity of the second output channel (Ch-2) is the highest. Meanwhile, it is recognized that, where the relative phase difference $\Delta\phi$ is $\pi$, the output intensity of the first output channel (Ch-1) is the highest. Further, it is recognized that, where the relative phase difference $\Delta\phi$ is $-\pi/2$, the output intensity of the third output channel (Ch-3) is the highest. Further, it is recognized that, where the relative phase difference $\Delta\phi$ is $+\pi/2$, the output intensity of the fourth output channel (Ch-4) is the highest.

In this instance, the optical signal outputted from the first output channel (Ch-1) and the optical signal outputted from the second output channel (Ch-2) have an in-phase relationship with each other. Meanwhile, the optical signal outputted from the third output channel (Ch-3) and the optical signal outputted from the fourth output channel (Ch-4) have an in-phase relationship with each other. Further, the optical signals outputted from the third and fourth output channels have a quadrature phase relationship with the optical signals outputted from the first and second output channels.

In this instance, different from the example illustrated in FIG. 4, no crosstalk occurs with the output components of third output channel (Ch-3) and the fourth output channel (Ch-4) which are quadrature phase components. This signifies that the relative phase difference between the output components of Ch-3 and Ch-4 are made proper by the 2:4 MMI coupler 2B having a linear function tapered shape and a phase matching with the 2:2 MMI coupler 3 is established.

Figure 28:
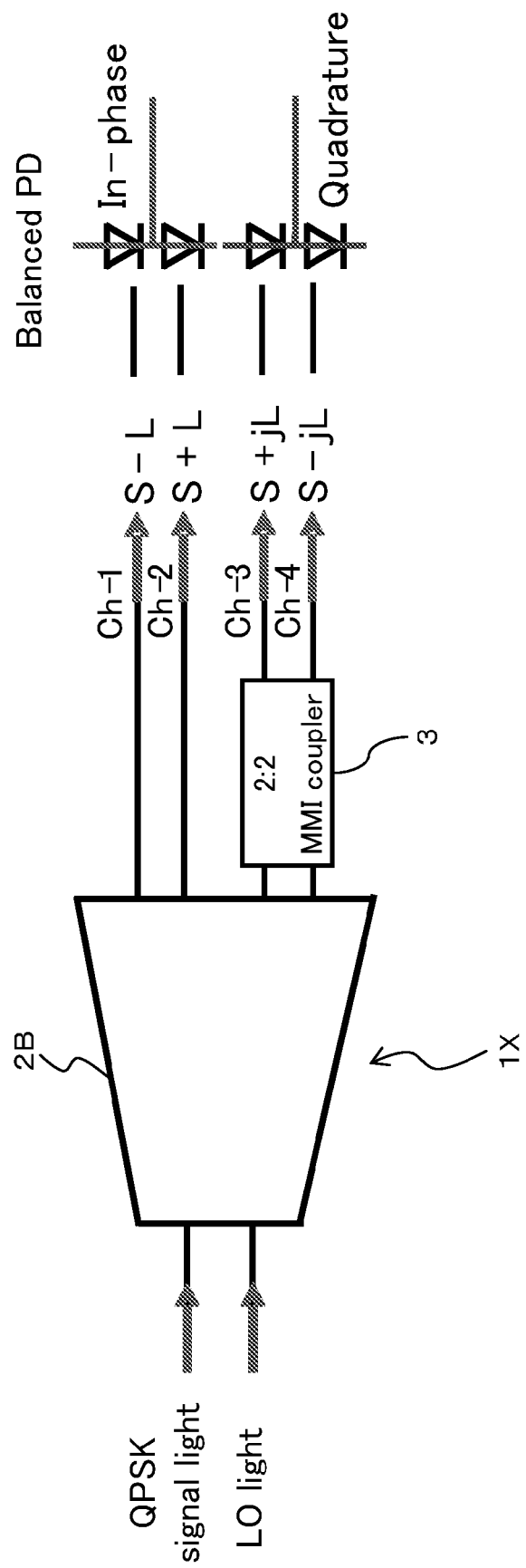
FIG. 28 is a view illustrating a connection relationship between the optical hybrid circuit according to the second embodiment and photodiodes.
Figure 29:
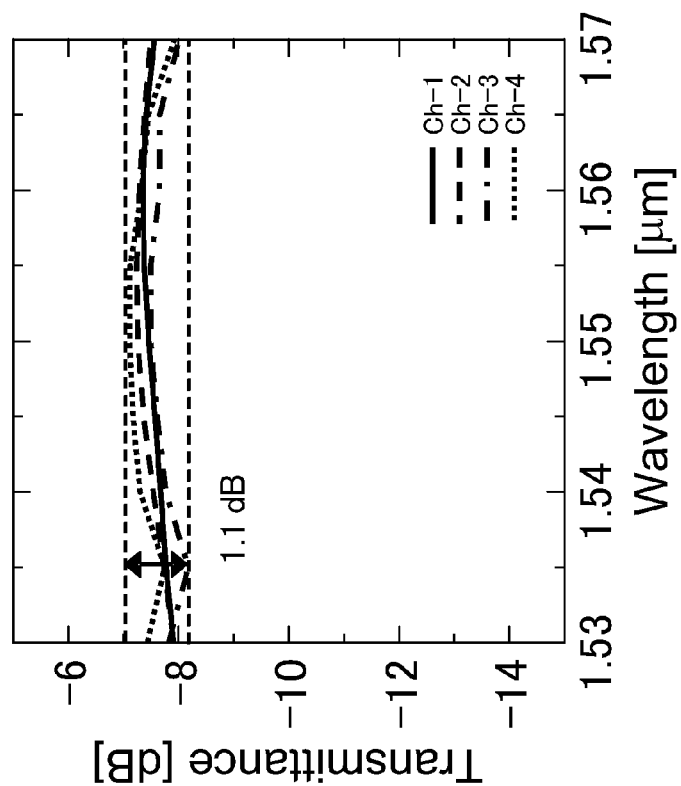
FIG. 29A is a view illustrating a wavelength dependency of the transmittance of lights outputted from the four output channels (Ch-1, Ch-2, Ch-3 and Ch-4) where the signal light is inputted to one input channel in an example of a configuration of a 90-degree hybrid which uses a 4:4 MMI coupler.
FIG. 29B is a view illustrating a wavelength dependency of the transmittance of lights outputted from the four output channels (Ch-1, Ch-2, Ch-3 and Ch-4) where the signal light is inputted to one input channel in an example of the configuration of the 90-degree hybrid according to the second embodiment.
Figure 29:
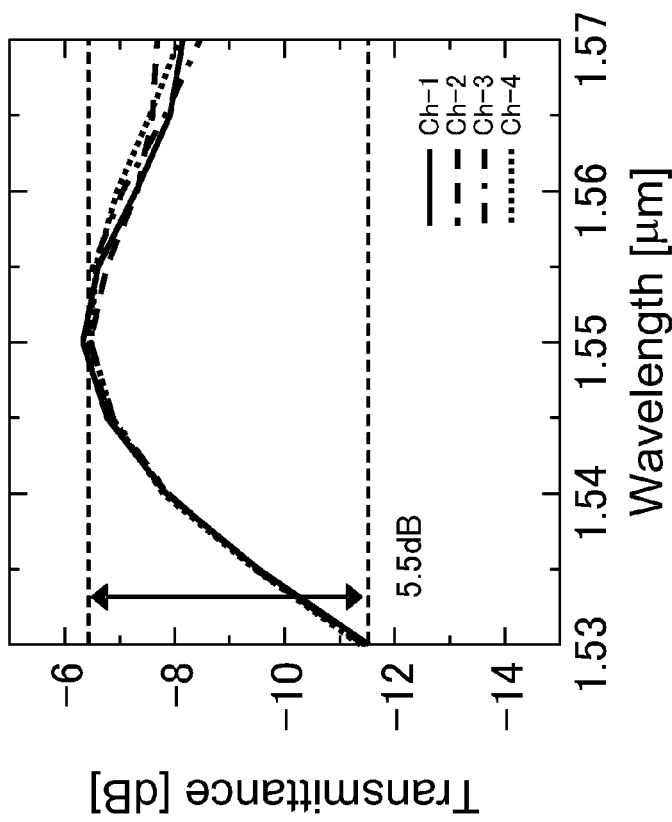
Figure 30:
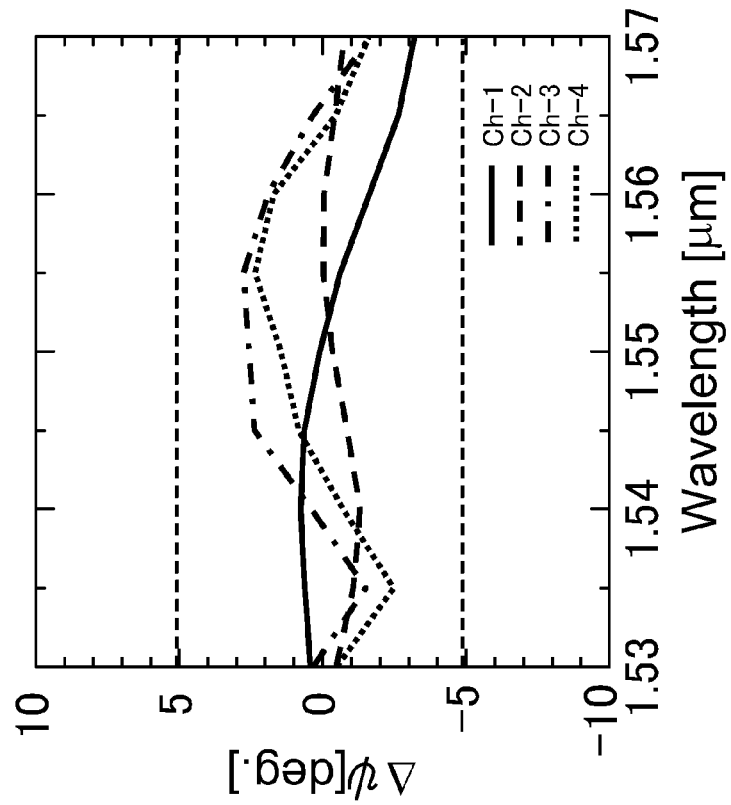
FIG. 30A is a view illustrating a wavelength dependency of the phase displacement amount $\Delta\psi$ of lights outputted from the four output channels (Ch-1, Ch-2, Ch-3 and Ch-4) where the signal light and the LO light have an in-phase relationship with each other ($\Delta\phi=0$) in an example of a configuration of a 90-degree hybrid which uses a 4:4 MMI coupler.
FIG. 30B is a view illustrating a wavelength dependency of the phase displacement amount $\Delta\psi$ of lights outputted from the four output channels (Ch-1, Ch-2, Ch-3 and Ch-4) where the signal light and the LO light have an in-phase relationship with each other ($\Delta\phi=0$) in the example of the configuration of the 90-degree hybrid according to the second embodiment.
Figure 30:
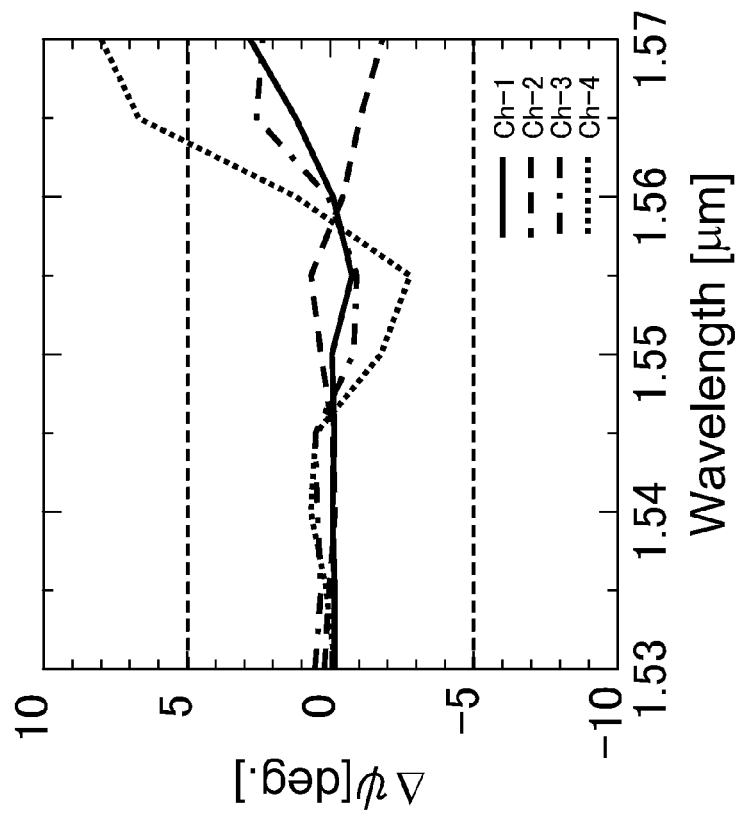

Further, it is signified that it is not necessary to make the optical waveguides intersect with each other as illustrated in FIG. 28 in order to input the optical signals outputted from the present 90-degree hybrid 1 to the photodiodes (BPDs) for photoelectric conversion. Therefore, excessive loss can be prevented.

FIG. 29A illustrates a wavelength dependency of the transmittance for each of the four output channels where QPSK signal light is inputted from one of the input channels of the conventional 90-degree hybrid [refer to FIG. 50A] which uses a 4:4 MMI coupler. Meanwhile, FIG. 29B illustrates a wavelength dependency of the transmittance for each of the four output channels where QPSK signal light is inputted from one of the channels of the optical hybrid circuit 1. It is to be noted that the characteristics illustrated in FIGS. 29A and 29B are similar from whichever one of the input channels QPSK signal light is inputted.

Here, in all cases, the minimum distance (gap) between the input/output waveguides is set to approximately 3.5 µm.

Then, if the input/output waveguide width W is approximately 2 µm, then the MMI width $W_{M44}$ of the 4:4 MMI coupler, the width $W_M$ of the output end 2BY and the width $W_S$ of the input end 2BX of the MMI coupler 2B and the MMI width $W_{M22}$ of the 2:2 MMI coupler 3 based on GI are approximately 22 µm, approximately 33 µm, approximately 16 µm and approximately 7.5 µm, respectively.

In this instance, the length $L_{M44}$ of the 4:4 MMI coupler, the length $L_{M24}$ of the 2:4 MMI coupler 2B and the length $L_{M22}$ of the 2:2 MMI coupler 3 are approximately 1,011 µm, approximately 368 µm and approximately 235 µm.

It is to be noted that, in the present 90-degree hybrid 1, the length (an access wavelength length) $L_A$ of an optical waveguide 4B (an access waveguide; an access region) for connecting the 2:4 MMI coupler 2B and the 2:2 MMI coupler 3 to each other is approximately 20 µm (refer to FIG. 22A).

In this instance, the device length $L_{Tot1}$ ($=L_{M44}$) of the conventional 90-degree hybrid which uses a 4:4 MMI coupler and the device length $L_{Tot2}$ ($=L_{M24}+L_A+L_{M22}$) of the 90-degree hybrid 1 are approximately 1,011 µm and approximately 622 µm, respectively. Accordingly, with the 90-degree hybrid 1, the device length can be shortened by approximately 40% in comparison with the conventional 90-degree hybrid which uses a 4:4 MMI coupler.

As illustrated in FIGS. 29A and 29B, the present 90-degree hybrid 1 has a significantly reduced wavelength dependency of the transmittance within the wavelength range of the C band in comparison with the conventional 90-degree hybrid. On the other hand, while, with the conventional 90-degree hybrid, the loss difference which occurs in the wavelength range of the C band is approximately 5.5 dB in the maximum, with the present 90-degree hybrid, the loss difference is suppressed to approximately 1.1 dB in the maximum.

FIG. 30A illustrates a wavelength dependency of the phase displacement in the conventional 90-degree hybrid [refer to FIG. 50A] which uses a 4:4 MMI coupler. Meanwhile, FIG. 30B illustrates a wavelength dependency of the phase displacement grin the present 90-degree hybrid 1. It is to be noted that the parameters of the 90-degree hybrid are similar to those in the cases described hereinabove with reference to FIGS. 29A and 29B.

It is to be noted that, in FIGS. 30A and 30B, the difference (phase displacement amount) $\Delta\psi$ between the absolute phase of an output component outputted from each of the four output channels and a reference phase where the relative phase difference between QPSK signal light and LO light is 0 ($\Delta\phi=0$) is plotted. Here, the reference phase is a phase of an output component outputted from each of the channels in the phase relationship diagrams of FIGS. 50B and 22B. Meanwhile, the phase displacement amount is an excessive phase displacement amount from the reference phase. Accordingly, the smaller the phase displacement amount, the better. In order to demodulate a QPSK modulation signal in error-free, it is desirable that no phase displacement occurs. Even if phase displacement occurs, it is preferable to suppress it to the minimum, and usually it is desirable to suppress the phase displacement amount $\Delta\psi$ so as to be ±5 degrees or less (preferably ±3 degrees or less).

As illustrated in FIGS. 30A and 30B, where it is intended to suppress the phase displacement amount $\Delta\psi$ so as to be ±5 degrees or less, the permissible bandwidths of the conventional 90-degree hybrid and the present 90-degree hybrid 1 are approximately 33 nm or more and approximately 40 nm or more, respectively. In particular, while, with the conventional 90-degree hybrid, the entire C band range cannot be covered, with the present 90-degree hybrid 1, the entire C band range can be covered.

Further, with the present 90-degree hybrid 1, the C band range (region) can be covered where the phase displacement $\Delta\psi$ is within a range of approximately ±3 degrees.

It is to be noted that, since details of the other part are similar to those of the first embodiment described hereinabove, overlapping description of them is omitted herein.

Accordingly, the optical hybrid circuit according to the present embodiment is advantageous in that it exhibits a low wavelength dependency, a low phase displacement characteristic and low insertion loss and a 90-degree hybrid suitable for compactness and monolithic integration can be implemented.

Further, since an intersecting portion of optical waveguides which cannot be avoided with the conventional 90-degree hybrid [refer to FIG. 50A] which uses a 4:4 MMI coupler is not required, there is an advantage also in that excessive loss can be suppressed to the minimum. Further, since the phase relationship of the four output signals can be made similar to that of the conventional 90-degree hybrid [refer to FIGS. 48A and 49A], the 90-degree hybrid according to the present embodiment is superior also in compatibility with 90-degree hybrids which are used in coherent optical receivers, coherent detection systems and so forth at present.

It is to be noted that, while the description of the embodiment described above is given taking a case wherein the 2:4 MMI coupler 2B is used as the MMI coupler at the preceding stage as an example, the MMI coupler at the preceding stage is not limited to this. The MMI coupler at the preceding stage may be any MMI coupler which converts quadratic phase shift keying modulation signal light into a pair of first optical signals having an in-phase relationship with each other and a pair of second optical signals having an in-phase relationship with each other.

For example, the 2:4 MMI coupler 2B which composes the optical hybrid circuit 1X of the embodiment described may be replaced by the 4:4 MMI coupler 2A which has four channels on the input side and four channels on the output side thereof. Thus, if light is inputted to two channels (a pair of input channels) which are provided at symmetrical positions with respect to the center position in the widthwise direction from among the four channels on the input side of the 4:4 MMI coupler 2A, then 90-degree hybrid operation is obtained similarly as in the embodiment described above. Consequently, the necessity to make optical waveguides intersect with each other in order to connect them to photo detectors as in the conventional 90-degree hybrid (refer to FIG. 51) which uses a 4:4 MMI coupler is eliminated.

Here, while light is inputted to the first channel and the fourth channel from above from among the four channels on the input side of the 4:4 MMI coupler 2A, light may otherwise be inputted to the second channel and the third channel. According to this input scheme, the 4:4 MMI coupler 2A functions as a 180-degree hybrid similarly to the 2:4 MMI coupler 2B of the embodiment described above.

In this instance, the 4:4 MMI coupler 2A is based on GI and the input channels and the output channels can be freely positioned within a range within which the center axis symmetrical property of the MMI region is not lost. In particular, the first and second channels from above on the input side and the third and fourth input channels from above on the input side may be positioned at any positions only if the center axis symmetrical property is maintained. Further, the first and second channels from above on the output side and the third and fourth channels from above on the output side may be positioned at any positions only if the center axis symmetrical property is maintained. However, the channel positions have some influence on the branching characteristic.

Further, while, in the description of the embodiment described above, a case wherein a 2:2 MMI coupler is used as the optical coupler 3 at the succeeding state is taken as an example, the optical coupler 3 is not limited to this. The optical coupler 3 at the succeeding stage may be any optical coupler only if it converts the first optical signals or the second optical signals into a pair of third optical signals having a quadrature phase relationship with the first or second optical signals.

Further, while, in the embodiment described above, description is given taking a case wherein the 2:2 MMI coupler 3 is connected to the two third and fourth channels (that is, a pair of second output channels neighboring with each other) from above on the output side of the inclined 2:4 MMI coupler 2B such that the optical coupler 3 converts a pair of second optical signals having an in-phase relationship with each other into a pair of third optical signals having a quadrature phase relationship with the pair of first optical signals as an example, the conversion by the 2:2 MMI coupler 3 is not limited to this.

Figure 31:
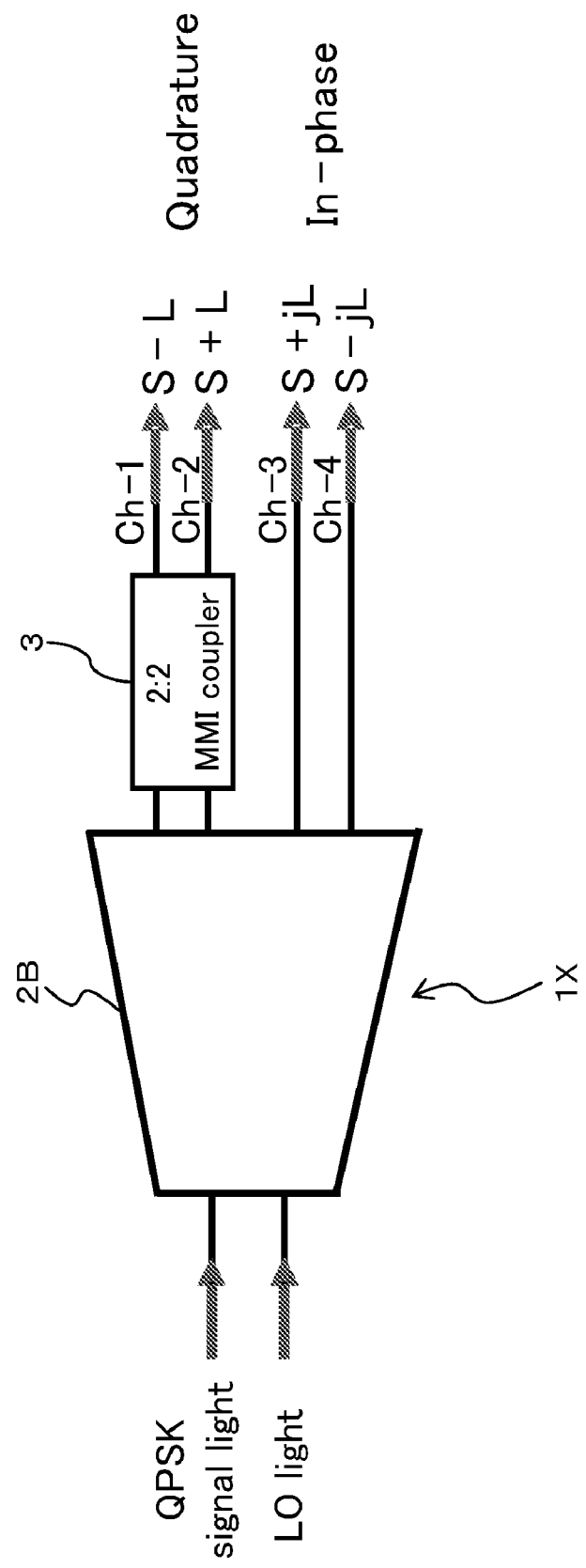
FIG. 31 is a schematic view illustrating a configuration of an optical hybrid circuit according to a modification to the second embodiment.

For example, a pair of first optical signals having an in-phase relationship with each other may be converted into a pair of third optical signals having a quadrature phase relationship with the pair of second optical signals as illustrated in FIG. 31.

In this instance, the optical coupler 3 is connected to a pair of first output channels, which neighbor with each other, on the output side of the MMI coupler 2 at the preceding stage as illustrated in FIG. 31.

In particular, as illustrated in FIG. 31, the 2:2 MMI coupler 3 is connected to the two first and second channels from above on the output side of the inclined 2:4 MMI coupler 2B (in particular, to a pair of first output channels neighboring with each other).

Where such a configuration as just described is adopted, the positional relationship of the In-phase output signals and the Quadrature output signals of the 90-degree hybrid is reversed from that of the embodiment and modifications described hereinabove. Further, where the relative phase difference $\Delta\phi$ is 0, $\pi$, $-\pi/2$ and $+\pi/2$, the output intensity ratio is 1:1:2:0, 1:1:0:2, 2:0:1:1 and 0:2:1:1, respectively.

Figure 32:
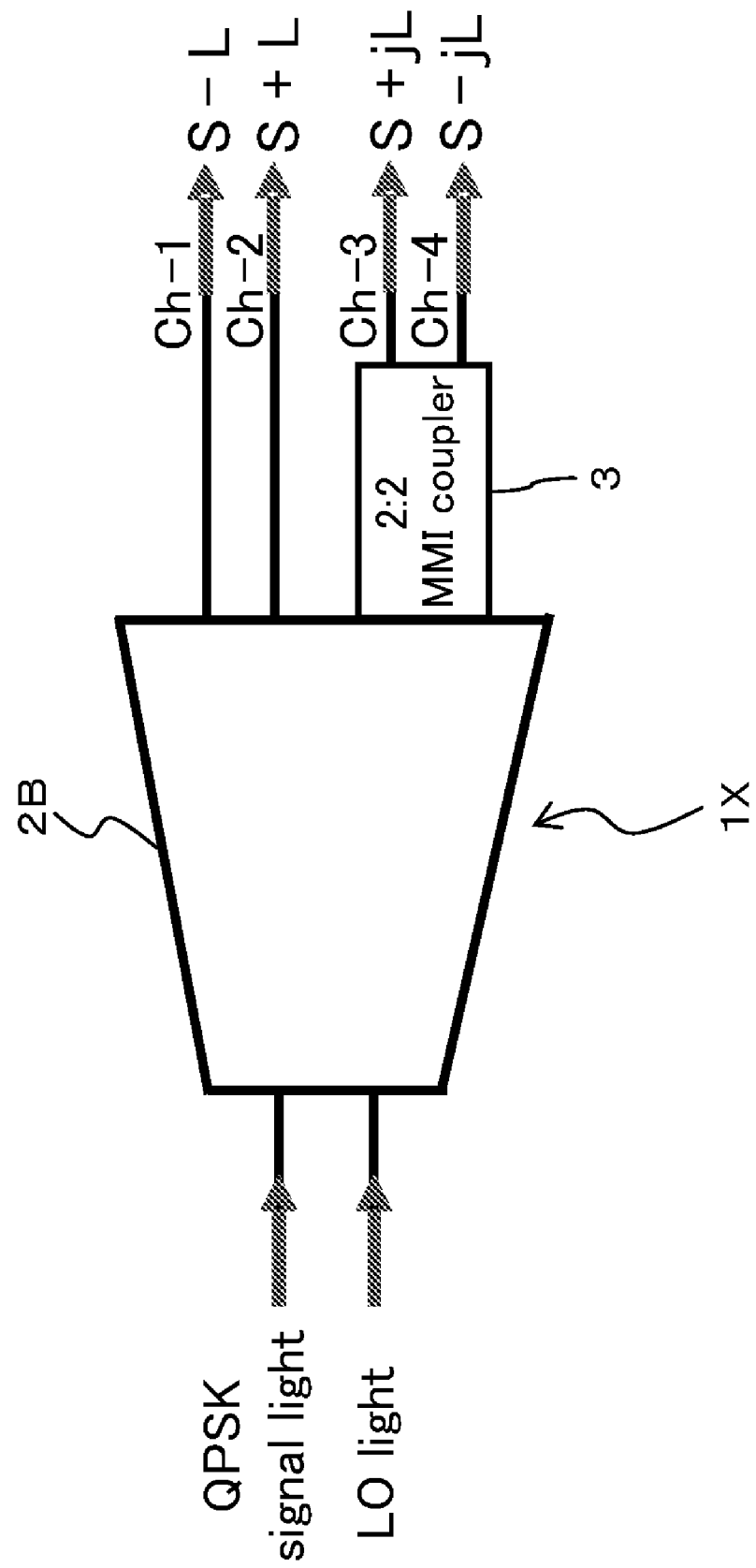
FIG. 32 is a schematic view illustrating a configuration of an optical hybrid circuit according to a different modification to the second embodiment.
Figure 33:
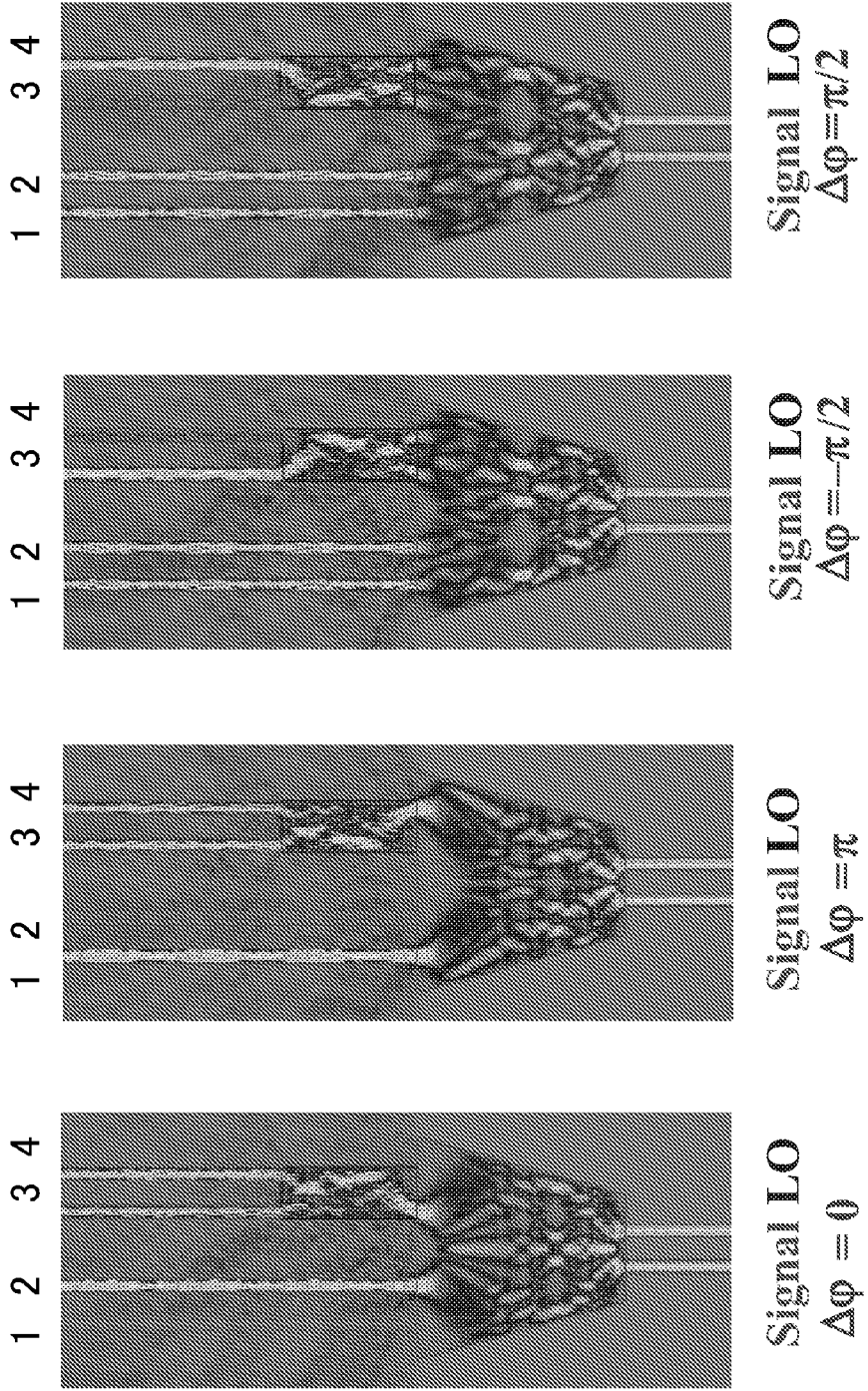

Further, while, in the embodiment described above, the 2:4 MMI coupler 2B and the 2:2 MMI coupler 3 are connected to each other by the optical waveguide (access waveguide) 4B, the connection scheme between them is not limited to this. For example, as illustrated in FIG. 32, depending upon the length $L_{M24}$ of the 2:4 MMI coupler 2B, the 2:4 MMI coupler 2B and the 2:2 MMI coupler 3 may be connected directly to each other without the intervention of the access waveguide 4B. Also in this instance, similar action and effects can be achieved.

FIGS. 33A to 33D illustrate an input/output characteristic where QPSK signal light and LO light are inputted to the optical hybrid circuit 1X having such a configuration as just described for each relative phase difference $\Delta\phi$ between the QPSK signal light and the LO light. It is to be noted that the device parameters are similar to those in the embodiment described hereinabove (refer to FIG. 22A).

It is to be noted that the calculation results illustrated in FIGS. 33A to 33D are based on a beam propagation method (BPM). FIG. 33A illustrates an input/output characteristic where the relative phase difference $\Delta\phi$ is 0; FIG. 33B illustrates an input/output characteristic where the relative phase difference Δφ is π; FIG. 33C illustrates an input/output characteristic where the relative phase difference Δφ is −π/2; and FIG. 33D illustrates an input/output characteristic where the relative phase difference Δφ is +π/2.

As illustrated in FIGS. 33A and 33B, where the relative phase difference Δφ is 0 and π, the intensity ratio of the optical hybrid circuit 1X is 0:2:1:1 and 2:0:1:1, respectively.

Meanwhile, as illustrated in FIGS. 33(C) and 33(D), where the relative phase difference Δφ is −π/2 and +π/2, the output intensity ratio of the optical hybrid circuit 1X is 1:1:2:0 and 1:1:0:2, respectively.

In this manner, even where the 2:4 MMI coupler 2B and the 2:2 MMI coupler 3 are connected directly to each other, output forms having different branching ratios from each other are obtained with respect to the phase state of the QPSK signal similarly as in the case of the embodiment described above. Further, in the present optical hybrid circuit 1X, the 2:4 MMI coupler is used which has a linear function tapered shape with which the width $W_M$ of the output end 2BY and the width $W_S$ of the input end 2BX of the 2:4 MMI coupler 2B satisfy the condition of $|\Delta\theta|=\pi/2$ and the length $L_{M24}$ of the 2:4 MMI coupler 2B satisfies the condition of $\chi^{ST}$=approximately 2.06. Therefore, crosstalk does not occur between the output signals from the 2:2 MMI coupler 3. Accordingly, the present optical hybrid circuit 1X functions as a 90-degree hybrid. Further, where the 2:4 MMI coupler 2B and the 2:2 MMI coupler 3 are connected directly to each other, further shortening of the device length and simplification of the structure can be achieved.

Figure 34:
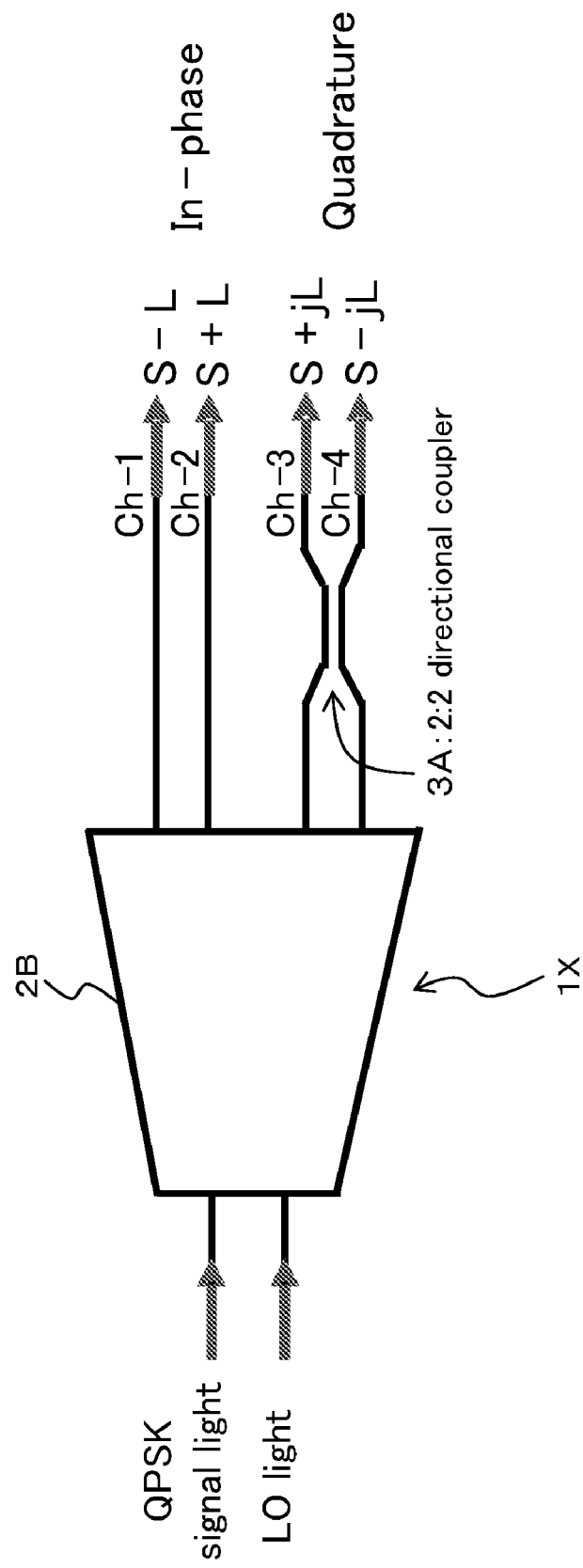
FIG. 34 is a schematic view illustrating a configuration of an optical hybrid circuit according to a further modification to the second embodiment.
Figure 35:
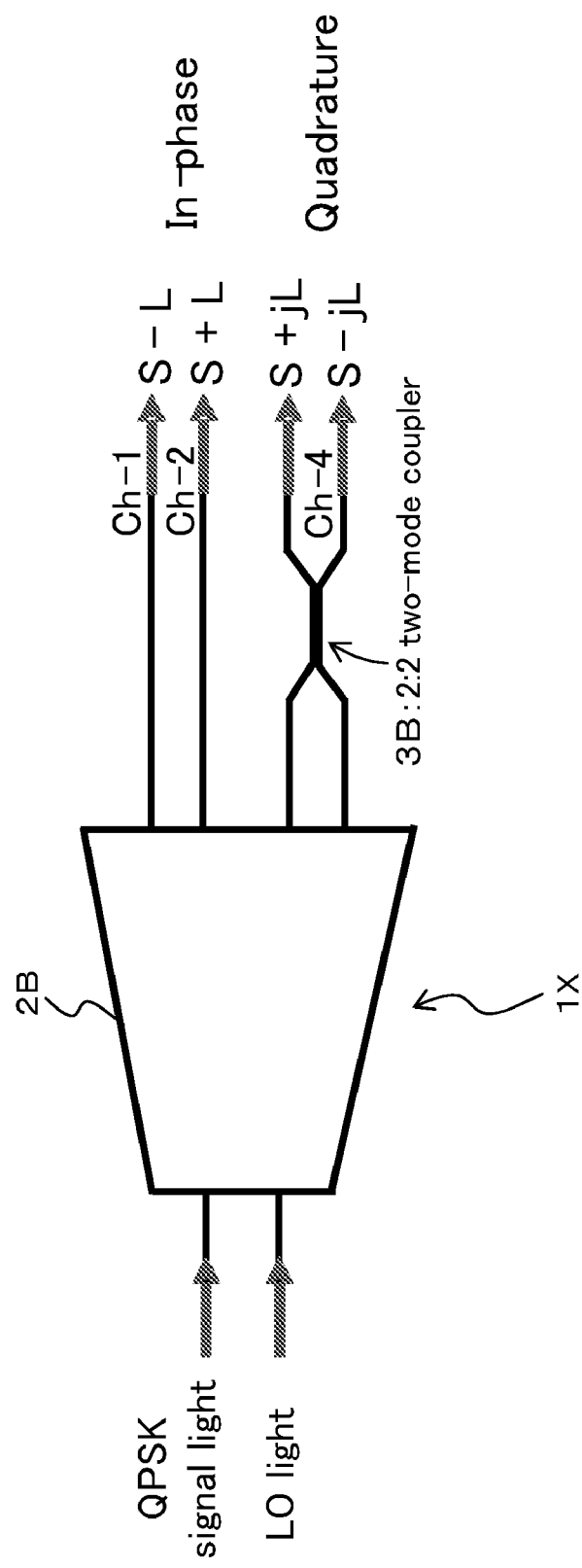
FIG. 35 is a schematic view illustrating a configuration of an optical hybrid circuit according to a still further modification to the second embodiment.

Further, for example, the 2:2 MMI coupler 3 which forms the optical hybrid circuit 1X of the embodiment described above may be replaced by a directional coupler (3-dB coupler; for example, a 2:2 directional coupler) 3A. It is to be noted that, in FIG. 34, like elements to those of the embodiment described hereinabove [refer to FIG. 22A] are denoted by like reference characters. Further, for example, the 2:2 MMI coupler 3 which composes the optical hybrid circuit 1X of the embodiment described above may be replaced by a two-mode interference coupler 3B (for example, a 2:2 two-mode interference coupler) as illustrated in FIG. 35. It is to be noted that, in FIG. 35, like elements to those of the embodiment described above [refer to FIG. 22A] are denoted by like reference characters. Also in those cases, similar effects to those of the embodiment described hereinabove are obtained. Further, while the directional coupler 3A and the two-mode interference coupler 3B are described as modifications to the embodiment described hereinabove [refer to FIG. 22A], also it is possible to apply the modifications to a modification wherein a 4:4 MMI coupler is used as the MMI coupler at the preceding stage.

It is to be noted that, while the foregoing description of the embodiment described above is given taking a case wherein InP is used as a semiconductor material as an example, the semiconductor material is not limited to this. For example, some other group III-V compound semiconductor material (for example, GaAS), a group IV semiconductor material (for example, Si) or the like may be used to form a similar waveguide structure. Also in this instance, similar action and effects can be achieved.

Third Embodiment

Now, an optical hybrid circuit according to a third embodiment is described with reference to FIGS. 36 to 38.

The optical hybrid circuit according to the present embodiment is different in the tapered shape of the 2:4 MMI coupler from that of the second embodiment described hereinabove.

Figure 36:
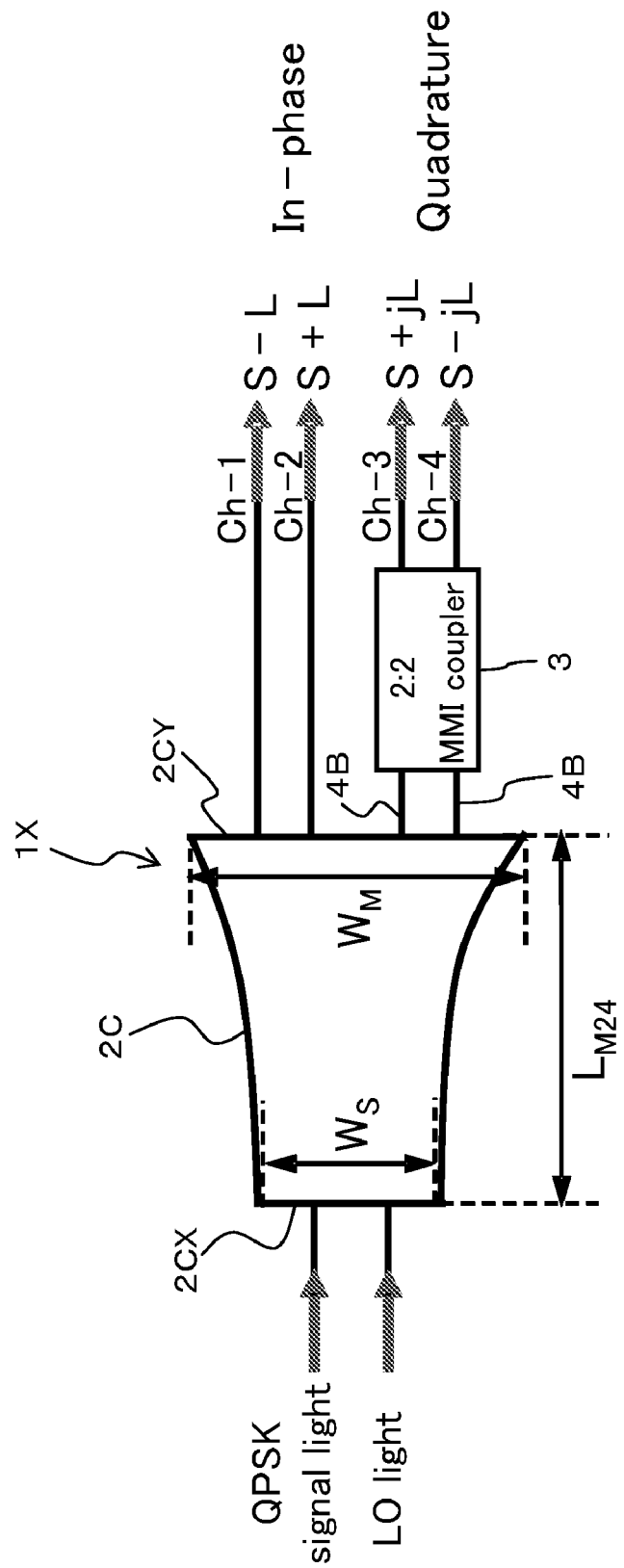
FIG. 36 is a schematic view illustrating a configuration of an optical hybrid circuit according to a third embodiment.

In particular, in the present optical hybrid circuit, the 2:4 MMI coupler 2C has a tapered shape (square function tapered shape; width tapered structure) wherein the width (MMI width; waveguide width) thereof varies in a square function toward the propagation direction as illustrated in FIG. 36. Here, the 2:4 MMI coupler 2C has a tapered shape wherein the width increases in a square function from an input end 2CX toward an output end 2CY thereof. It is to be noted that, in FIG. 36, like elements to those of the second embodiment described above [refer to FIG. 22A] are denoted by like reference characters.

In this manner, in the present embodiment, the 2:4 MMI coupler 2C has a width tapered structure with which the phase difference Δθ of a pair of second optical signals outputted from the 2:4 MMI coupler 2C becomes π/2+p*π (p is an integer) so that the phase difference of lights to be inputted to the two channels on the input side of the 2:2 MMI coupler 3 may be 90 degrees.

In this instance, the 2:4 MMI coupler 2C (inclined 2:4 MMI coupler) has an input end 2CX of a first width $W_S$ and an output end 2CY of a second width $W_M$ different from the first width $W_S$ and is configured such that the phase difference Δθ between a pair of second optical signals becomes π/2+p*π (p is an integer). It is to be noted that the values of the width $W_S$ and the width $W_M$ are different from those in the second embodiment described hereinabove.

Where the width taper varies in a square function as illustrated in FIG. 36, the propagation constant difference between the fundamental mode and an arbitrary higher-order mode varies locally.

In this instance, the net phase shift (Δρ) in the MMI region is similar to that given by the expression (9).

However, since, in the present embodiment, a square function tapered shape is used and the variation of the width taper is different, the width taper function $W_M(z)$ is given by the following expression (14):

$$W_M(z) = W_S + (W_M - W_S) \cdot \left(\frac{z}{L_{M24}}\right)^2 \tag{14}$$

From the expressions (9) and (14) above, the propagation constant difference $\langle\beta_0-\beta_v\rangle$ between the fundamental mode and an arbitrary higher-order mode is represented by the following expression:

$$\langle\beta_0 - \beta_v\rangle = \frac{v(v+2)\pi\lambda}{4n_r W_M^2} \chi^{SQ} \tag{15}$$

$$\chi^{SQ} = \frac{W_M}{2}\left(\frac{1}{W_S} + \frac{W_M \tanh^{-1}\left[\sqrt{\frac{-W_M + W_S}{W_S}}\right]}{W_S\sqrt{W_S}\sqrt{-W_M + W_S}}\right) \tag{16}$$

where $\chi^{ST}$ is a proportionality constant which relies upon the tapered shape.

From the expressions (15) and (16), the beat length $L_\pi^{SQ}$ of the 2:4 MMI coupler which has such a square function tapered shape can be represented by the following expression (17):

$$L_\pi^{SQ} = \frac{L_\pi}{\chi^{SQ}} \quad (17)$$

Accordingly, the beat length $L_\pi^{SQ}$ of the 2:4 MMI coupler 2C which has such a square function tapered shape as illustrated in FIG. 36 decreases as the proportionally constant $\chi^{SQ}$ increases with respect to the beat length $L_\pi$ of the 2:4 MMI coupler (refer to FIG. 6) which does not have a tapered shape. It is to be noted that the MMI width of the 2:4 MMI coupler (refer to FIG. 6) which does not have a tapered shape is set equal to the width $W_M$ of the output end 2CY of the 2:4 MMI coupler 2C which has a square function tapered shape of the present embodiment. Here, $1/\chi^{SQ}$ is considered a parameter which represents the shortening ratio (the reduction ratio) of the MMI length $L_{M24}$ of the 2:4 MMI coupler 2C having a square function tapered shape of the present embodiment with respect to the MMI length of the 2:4 MMI coupler (refer to FIG. 6) which does not have a tapered shape. It is to be noted that the value of the MMI length $L_{M24}$ is different from that in the second embodiment described hereinabove.

Meanwhile, the phase variation of the 2:4 MMI coupler 2C relies upon the tapered shape which varies in a square function.

Therefore, where $\Delta\phi$ is $-\pi/2$ and $+\pi/2$, 90-degree hybrid operation is obtained with certainty by setting $\chi^{SQ}$ such that the phase difference $\Delta\theta$ between a pair of second optical signals to be outputted from the 2:4 MMI coupler 2C becomes equal to $\pi/2+p*\pi$ (p is an integer). In other words, by setting $\chi^{SQ}$ to a proper value, such an optical hybrid circuit as shown in FIG. 36 functions as a 90-degree hybrid. Also shortening of the 2:4 MMI length $L_{M24}$ can be achieved.

Figure 37:
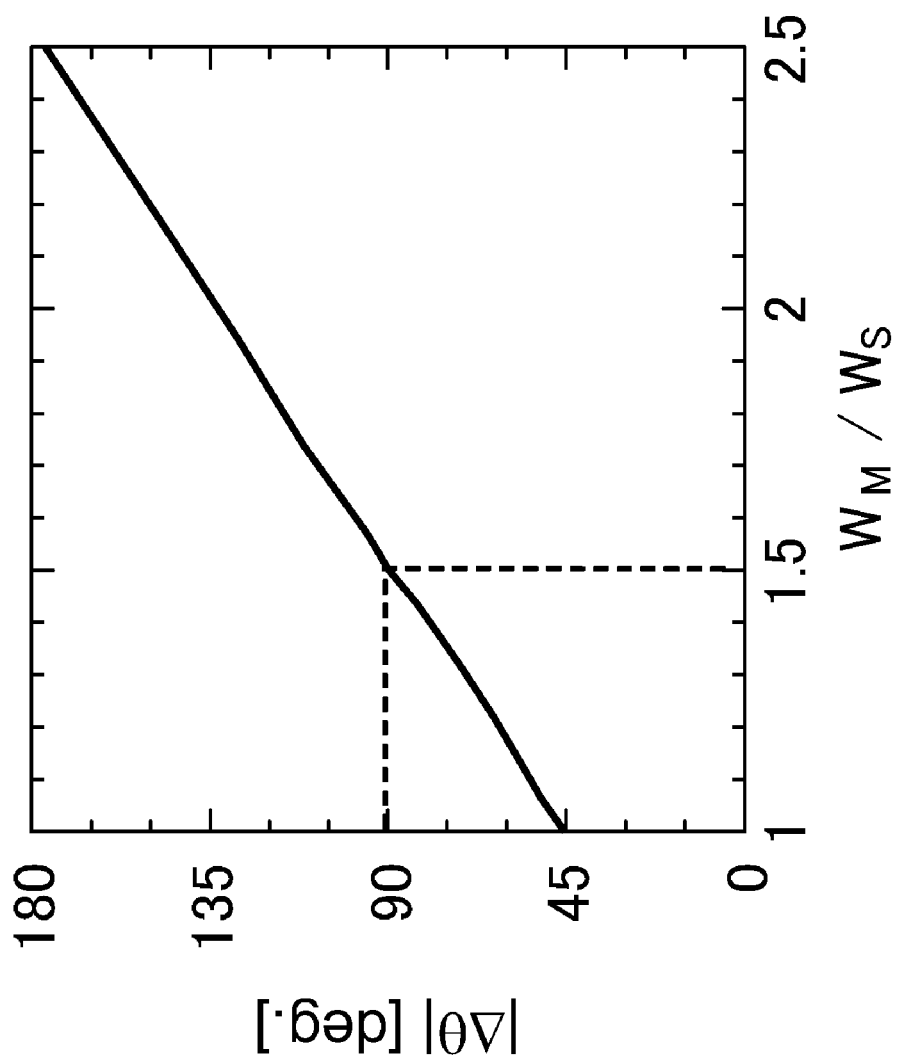
FIG. 37 is a view illustrating a relationship between a ratio $W_M/W_S$ between the width $W_S$ of an input end and the width $W_M$ of an output end of a 2:4 MMI coupler which composes the optical hybrid circuit according to the third embodiment and the absolute value $|\Delta\theta|$ of a phase difference between channels of output signals.

FIG. 37 illustrates a relationship between the rate of change of the MMI width of the 2:4 MMI coupler 2C, that is, a relationship between the ratio $W_M/W_S$ between the width $W_S$ of the input end 2CX and the width $W_M$ of the output end 2CY of the 2:4 MMI coupler 2C, and the absolute value $|\Delta\theta|$ of the inter-channel phase difference of the output signals. It is to be noted that, in FIG. 37, the absolute value $|\Delta\theta|$ of the inter-channel phase difference of the output signals is an absolute value of the inter-channel phase difference between the output signals (a pair of second optical signals) outputted from the third and fourth output channels of the 2:4 MMI coupler 2C.

Meanwhile, FIG. 37 illustrates a relationship between the rate $W_M/W_S$ of change of the MMI width of the 2:4 MMI coupler 2C and the reduction ratio of the 2:4 MMI length $L_{M24}$, that is, $1/\chi^{SQ}$ (that is, $W_S/W_M$).

It is to be noted that, where the value of $W_M/W_S$ is 1, the 2:4 MMI coupler does not have a tapered shape (refer to FIG. 6). Further, the width $W_M$ of the output end 2CY of the 2:4 MMI coupler 2C is set equal (fixed) while the width $W_S$ of the input end 2CX is varied with respect to the 2:4 MMI coupler (FIG. 6) which does not have a tapered shape. It is to be noted that alternatively the width $W_S$ of the input end 2CX of the 2:4 MMI coupler 2C may be fixed while the width $W_M$ of the output end 2CY is varied.

Figure 38:
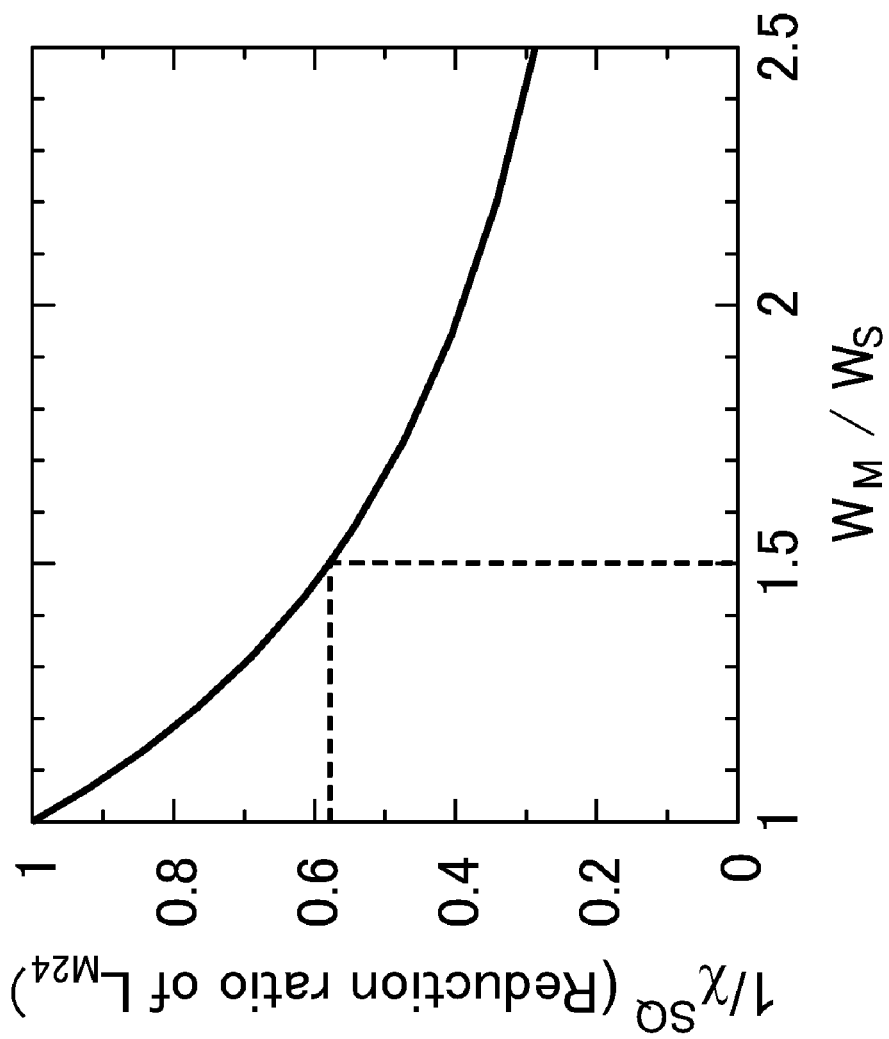
FIG. 38 is a view illustrating the ratio $W_M/W_S$ between the width $W_S$ of the input end and the width $W_M$ of the output end of the 2:4 MMI coupler which composes the optical hybrid circuit and $1/\chi^{SQ}$ according to the third embodiment.

As shown in FIGS. 37 and 38, it can be recognized that, as the value of $W_M/W_S$ increases, the value of the absolute value $|\Delta\theta|$ of the inter-channel phase difference of the output signals increases linearly and the value of $1/\chi^{SQ}$ decreases (in other words, the MMI length $L_{M24}$ is shortened).

Further, since a square function tapered shape is used, the rate of change of the value of $|\Delta\theta|$ with respect to the value of $W_M/W_S$ is greater than that where a linear function tapered shape is used (refer to FIGS. 24 and 25) as illustrated in FIGS. 37 and 38.

Therefore, the absolute value $|\Delta\theta|$ of the inter-channel phase difference of the output signals can be set to $\pi/2$ which is the desired value by setting of the value of the width $W_S$ of the input end 2CX of the 2:4 MMI coupler 2C (that is, of the value of $W_M/W_S$).

Here, where the absolute value $|\Delta\theta|$ of the inter-channel phase difference of the output signals, the value of $W_M/W_S$ is approximately 1.5 as illustrated in FIG. 37, and where the value of $W_M/W_S$ is approximately 1.5, the value of $1/\chi^{SQ}$ is approximately 0.58 as illustrated in FIG. 38. In this instance, the value of $\chi^{ST}$ is approximately 1.74.

Accordingly, the MMI length $L_{m24}$ of the 2:4 MMI coupler 2C having a square function tapered shape is equal to $1/\chi^{SQ}$ time, that is, to approximately 0.58 times, the MMI length of the 2:4 MMI coupler (refer to FIG. 6) which does not have a tapered shape. In other words, the MMI length $L_{M24}$ of the 2:4 MMI coupler 2C having a square function tapered shape is shortened by approximately 42% in comparison with the MMI length of the 2:4 MMI coupler (refer to FIG. 6) which does not have a tapered shape.

Further, the relationships illustrated in FIGS. 37 and 38 is satisfied with regard to an arbitrary width $W_S$ of the input end 2CX and an arbitrary width $W_M$ of the output end 2CY. In particular, if the condition of $\chi^{SQ}$=approximately 1.74 is satisfied with regard to an arbitrary width $W_S$ of the input end 2CX and an arbitrary width $W_M$ of the output end 2CY, then $|\Delta\theta|=\pi/2$ is satisfied, and 90-degree hybrid operation is obtained with certainty using the 2:4 MMI coupler 2C having such a square function tapered shape as illustrated in FIG. 36.

In particular, where the width $W_M$ of the input end 2CX of the 2:4 MMI coupler 2C having a square function tapered shape is approximately 33 μm, the width $W_S$ of the input end 2CX is decided to approximately 21 μm from the condition of the absolute value $|\Delta\theta|$ of the inter-channel phase difference of the output signals=$\pi/2$ (refer to FIG. 37). After the width $W_M$ of the output end 2CY and the width $W_S$ of the input end 2CX of the 2:4 MMI coupler 2C are decided in this manner, the length $L_{24}$ of the 2:4 MMI coupler 2C is decided to approximately 440 μm from the condition of $1/\chi^{SQ}$=approximately 0.58, that is, $\chi^{SQ}$=approximately 1.74. The square function tapered shape of the 2:4 MMI coupler 2C is defined by an expression [width taper function $W_M(z)$] obtained by substituting the decided values into the expression (14) given hereinabove.

If it is assumed that the width $W_M$ of the output end 2CY of the 2:4 MMI coupler 2C having a square function tapered shape is set to approximately 26.4 μm (which corresponds to approximately 80% of approximately 33 μm), then the desired width $W_S$ of the input end 2CX is approximately 16.8 μm (which corresponds to approximately 80% of approximately 21 μm).

Since the square function tapered shape is defined in this manner and the MMI width is modulated with a predetermined taper function, the phase difference $\Delta\theta$ between a pair of second optical signals outputted from the 2:4 MMI coupler 2C becomes $\pi/2+p*\pi$ (p is an integer). Therefore, the present optical hybrid circuit 1X outputs a pair of first optical signals (S−L and S+L) having an in-phase relationship with each other and a pair of third optical signals (S−jL and S+jL) having a quadrature phase relationship with the pair of first optical signals, and 90-degree hybrid operation is obtained with certainty. In other words, QPSK signal light is converted into a pair of first optical signals which include only an in-phase component (I-component) and a pair of third optical signals which include only a quadrature phase component (Q-component) by the present optical hybrid circuit 1X, and 90-degree hybrid operation is obtained with certainty.

Here, the pair of first optical signals having an in-phase relationship with each other, that is, the pair of first optical signals which include only an in-phase component, are a pair of optical signals whose phases are displaced by 180 degrees from each other. Meanwhile, the pair of third optical signals having a quadrature phase relationship with the pair of first optical signals, that is, the pair of third optical signals which include only a quadrature phase component, are a pair of optical signals whose phases are displaced by 90 degrees from those of the pair of first optical signals. It is to be noted that the pair of third optical signals are a pair of optical signals whose phases are displaced by 180 degrees from each other.

It is to be noted that reference characters S−L, S+L, S+jL and S−jL in FIG. 36 indicate what relative relationship the phase of the LO light (L) has with reference to the phase of the signal light (S). Here, S−L and S+L indicate that they have a phase relationship displaced by 180 degrees from each other, and S+jL and S−jL have a phase relationship displaced by 90 degrees with respect to S+L and S−L, respectively.

It is to be noted that, since details of the other part are similar to those of the second embodiment and the modifications [refer to, for example, FIGS. 31 to 35] described hereinabove, overlapping description of them is omitted herein.

Accordingly, the optical hybrid circuit according to the present embodiment is advantageous in that it exhibits a low wavelength dependency, a low phase displacement characteristic and low insertion loss and a 90-degree hybrid suitable for compactness and monolithic integration can be implemented similarly to the second embodiment described hereinabove.

Further, since an intersecting portion of optical waveguides which cannot be avoided with the conventional 90-degree hybrid [refer to FIG. 50A] which uses a 4:4 MMI coupler is not required, there is an advantage also in that excessive loss can be suppressed to the minimum. Further, since the phase relationship of the four output signals can be made similar to that of the conventional 90-degree hybrid [refer to FIGS. 48A and 49A], the optical hybrid circuit according to the present embodiment is superior also in compatibility with 90-degree hybrids which are used in coherent optical receivers, coherent detection systems and so forth at present.

Fourth Embodiment

Now, an optical hybrid circuit according to a fourth embodiment is described with reference to FIGS. 39 to 41.

The optical hybrid circuit according to the present embodiment is different from that of the second embodiment described hereinabove in the tapered shape of the 2:4 MMI coupler.

Figure 39:
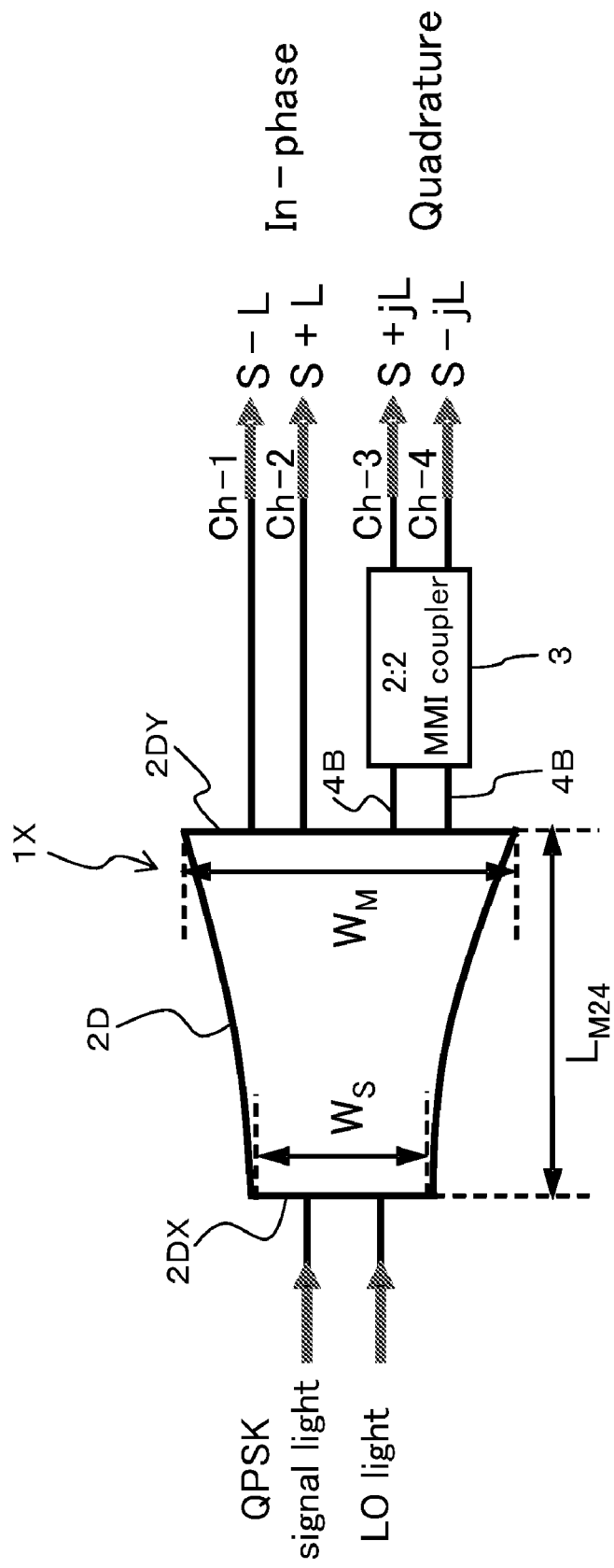
FIG. 39 is a schematic view illustrating a configuration of an optical hybrid circuit according to a fourth embodiment.

In particular, in the present optical hybrid circuit, the 2:4 MMI coupler 2D has a tapered shape (exponential function tapered shape; width tapered structure) wherein the width (MMI width; waveguide width) thereof varies in an exponential function toward the propagation direction as illustrated in FIG. 39. Here, the 2:4 MMI coupler 2D has a tapered shape wherein the width increases in an exponential function from an input end 2DX toward an output end 2DY thereof. It is to be noted that, in FIG. 39, like elements to those of the second embodiment described above [refer to FIG. 22A] are denoted by like reference characters.

In this manner, in the present embodiment, the 2:4 MMI coupler 2D has a width tapered structure with which the phase difference Δθ between a pair of second optical signals outputted from the 2:4 MMI coupler 2D becomes π/2+p*π (p is an integer) so that the phase difference between lights to be inputted to the two channels on the input side of the 2:2 MMI coupler 3 may be 90 degrees.

In this instance, the 2:4 MMI coupler 2D (inclined 2:4 MMI coupler) has an input end 2DX of a first width $W_S$ and an output end 2DY of a second width $W_M$ different from the first width $W_S$ and is configured such that the phase difference Δθ between a pair of second optical signals becomes π/2+p*π (p is an integer). It is to be noted that the values of the width $W_S$ and the width $W_M$ are different from those in the second embodiment described hereinabove.

Where the width taper varies in an exponential function as illustrated in FIG. 39, the propagation constant difference between the fundamental mode and an arbitrary higher-order mode varies locally.

In this instance, the net phase shift (Δρ) in the MMI region is similar to that given by the expression (9).

However, since, in the present embodiment, an exponential function tapered shape is used and the variation of the width taper is different, the width taper function $W_M(z)$ is given by the following expression (18):

$$W_M(z) = W_S + (W_M - W_S) \cdot \left( \frac{\operatorname{Exp}(z/L_{M24}) - 1}{e - 1} \right) \tag{18}$$

From the expressions (9) and (18) above, the propagation constant difference $<\beta_0 - \beta_\nu>$ between the fundamental mode and an arbitrary higher-order mode is represented by the following expression:

$$\langle \beta_0 - \beta_\nu \rangle = \frac{\nu(\nu+2)\pi\lambda}{4 n_r W_M^2} \chi^{EXP} \tag{19}$$

$$\chi^{EXP} = \frac{(e-1)W_M \left( \begin{array}{c} W_M^2 - 2 W_S W_M + e \cdot W_S^2 - \\ (e-1) W_S W_M \log(W_M/W_S) \end{array} \right)}{W_S(W_M - e \cdot W_S)} \tag{20}$$

Where $\chi^{EXP}$ is a proportionality constant which relies upon the tapered shape.

From the expressions (19) and (20), the beat length $L_\pi^{EXP}$ of the 2:4 MMI coupler which has an exponential function tapered shape can be represented by the following expression (21):

$$L_\pi^{EXP} = \frac{L_\pi}{\chi^{EXP}} \tag{21}$$

Accordingly, the beat length $L_\pi^{EXP}$ of the 2:4 MMI coupler 2D which has such an exponential function tapered shape as illustrated in FIG. 39 decreases as the proportionality constant $\chi^{EXP}$ increases with respect to the beat length $L_\pi$ of the 2:4 MMI coupler (refer to FIG. 6) which does not have a tapered shape. It is to be noted that the MMI width of the 2:4 MMI coupler (refer to FIG. 6) which does not have a tapered shape is set equal to the width $W_M$ of the output end 2DY of the 2:4 MMI coupler 2D which has an exponential function tapered shape of the present embodiment. Here, $1/\chi^{EXP}$ is considered a parameter which represents the shortening ratio (the reduction ratio) of the MMI length $L_{M24}$ of the 2:4 MMI coupler 2D having an exponential function tapered shape of the present embodiment with respect to the MMI length of the 2:4 MMI coupler (refer to FIG. 6) which does not have a tapered shape. It is to be noted that the value of the MMI length $L_{M24}$ is different from that in the second embodiment described hereinabove.

Meanwhile, the phase shift in the 2:4 MMI coupler 2D relies upon the tapered shape which varies in an exponential function.

Therefore, where $\Delta\phi$ is $-\pi/2$ and $+\pi/2$, 90-degree hybrid operation is obtained with certainty by setting $\chi^{EXP}$ such that the phase difference $\Delta\theta$ between a pair of second optical signals to be outputted from the 2:4 MMI coupler 2D becomes equal to $\pi/2+p^*\pi$ (p is an integer). In other words, by setting $\chi^{EXP}$ to a proper value, such an optical hybrid circuit as shown in FIG. 39 functions as a 90-degree hybrid. Also shortening of the 2:4 MMI length $L_{M24}$ can be achieved.

Figure 40:
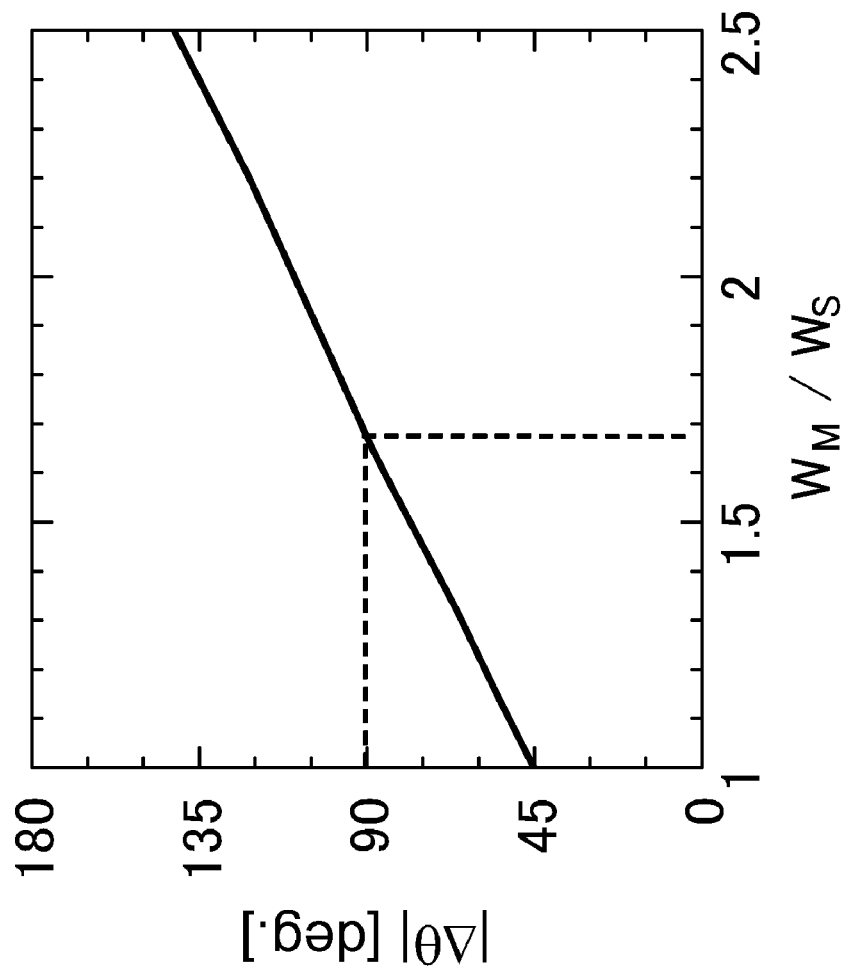
FIG. 40 is a view illustrating a relationship between a ratio $W_M/W_S$ between the width $W_S$ of an input end and the width $W_M$ of an output end of a 2:4 MMI coupler which composes the optical hybrid circuit according to the fourth embodiment and the absolute value $|\Delta\theta|$ of a phase difference between channels of output signals.

FIG. 40 illustrates a relationship between the rate of change of the MMI width of the 2:4 MMI coupler 2D, that is, the ratio $W_M/W_S$ between the width $W_S$ of the input end 2DX and the width $W_M$ of the output end 2DY of the 2:4 MMI coupler 2D, and the absolute value $|\Delta\theta|$ of the inter-channel phase difference of the output signals. It is to be noted that, in FIG. 40, the absolute value $|\Delta\theta|$ of the inter-channel phase difference of the output signals is an absolute value of the inter-channel phase difference of the output signals (a pair of second optical signals) outputted from the third and fourth output channels of the 2:4 MMI coupler 2D.

Figure 41:
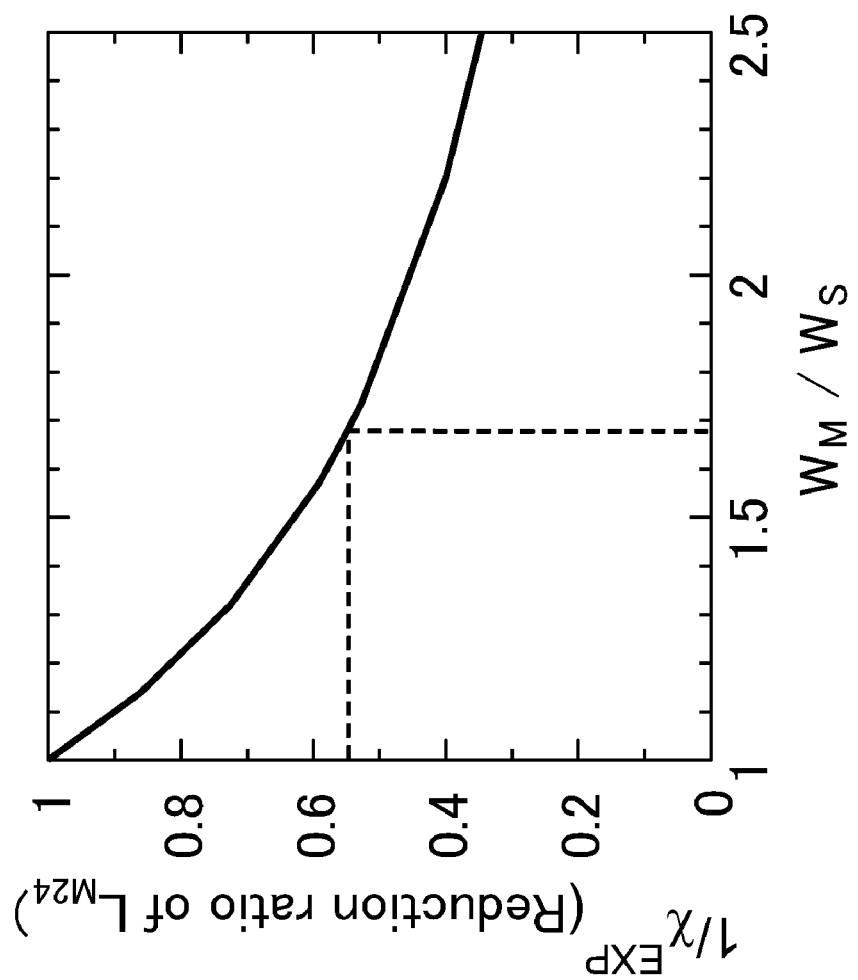
FIG. 41 is a view illustrating the ratio $W_M/W_S$ between the width $W_S$ of the input end and the width $W_M$ of the output end of the 2:4 MMI coupler which composes the optical hybrid circuit and $1/\chi^{EXP}$ according to the fourth embodiment.

Meanwhile, FIG. 41 illustrates a relationship between the rate $W_M/W_S$ of change of the MMI width of the 2:4 MMI coupler 2D and the reduction ratio of the 2:4 MMI length $L_{M24}$, that is, $1/\chi^{EXP}$ (that is, $W_S/W_M$).

It is to be noted that, where the value of $W_M/W_S$ is 1, the 2:4 MMI coupler does not have a tapered shape (refer to FIG. 6). Further, the width $W_M$ of the output end 2DY of the 2:4 MMI coupler 2D is set equal (fixed) while the width $W_S$ of the input end 2DX is varied with respect to the 2:4 MMI coupler (refer to FIG. 6) which does not have a tapered shape. It is to be noted that alternatively the width $W_S$ of the input end 2DX of the 2:4 MMI coupler 2D may be fixed while the width $W_M$ of the output end 2DY is varied.

As shown in FIGS. 40 and 41, it can be recognized that, as the value of $W_M/W_S$ increases, the value of the absolute value $|\Delta\theta|$ of the inter-channel phase difference of the output signals increases linearly and the value of $1/\chi^{EXP}$ decreases (in other words, the MMI length $L_{M24}$ is shortened).

Further, since an exponential function tapered shape is used, the rate of change of the value of $|\Delta\theta|$ with respect to the value of $W_M/W_S$ is greater than that where a linear function tapered shape is used (refer to FIGS. 24 and 25) as illustrated in FIGS. 40 and 41.

Therefore, the absolute value $|\Delta\theta|$ of the inter-channel phase difference of the output signals can be set to $\pi/2$ which is the desired value by setting of the value of the width $W_S$ of the input end 2DX of the 2:4 MMI coupler 2D (that is, of the value of $W_M/W_S$).

Here, where the absolute value $|\Delta\theta|$ of the inter-channel phase difference of the output signal, the value of $W_M/W_S$ is approximately 1.68, as illustrated in FIG. 40, and where the value of $W_M/W_S$ is 1.68, the value of $\chi^{EXP}$ is approximately 0.56 as illustrated in FIG. 41. In this instance, $\chi^{EXP}$ is approximately 1.79.

Accordingly, the MMI length $L_{M24}$ of the 2:4 MMI coupler 2D having an exponential function tapered shape is equal to $1/\chi^{EXP}$ time, that is, to approximately 0.56 times, the MMI length of the 2:4 MMI coupler (refer to FIG. 6) which does not have a tapered shape. In other words, the MMI length $L_{M24}$ of the 2:4 MMI coupler 2D having an exponential function tapered shape is shortened by approximately 44% in comparison with the MMI length of the 2:4 MMI coupler (refer to FIG. 6) which does not have a tapered shape.

Further, the relationships illustrated in FIGS. 40 and 41 are satisfied with regard to an arbitrary width $W_S$ of the input end 2DX and an arbitrary width $W_M$ of the output end 2DY. In particular, if the condition of $\chi^{EXP}$=approximately 1.79 is satisfied with regard to an arbitrary width $W_S$ of the input end 2DX and an arbitrary width $W_M$ of the output end 2DY, then $|\Delta\theta|=\pi/2$ is satisfied, and 90-degree hybrid operation is obtained with certainty using the 2:4 MMI coupler 2D having such an exponential function tapered shape as illustrated in FIG. 39.

In particular, where the width $W_M$ of the output end 2DY of the 2:4 MMI coupler 2D having an exponential function tapered shape is 33 μm, the width $W_S$ of the input end 2DX is decided to 20 μm from the condition that the absolute value $|\Delta\theta|$ of the inter-channel phase difference of the output signals is $\pi/2$ ($|\Delta\theta|=\pi/2$) (refer to FIG. 40). After the width $W_M$ of the output end 2DY and the width $W_S$ of the input end 2DX of the 2:4 MMI coupler 2D are decided in this manner, the length $L_{M24}$ of the 2:4 MMI coupler 2D is decided to approximately 423 μm from the condition of $1/\chi^{EXP}$=approximately 0.56, that is, $\chi^{EXP}$=approximately 1.79. The exponential function tapered shape of the 2:4 MMI coupler 2D is defined by an expression [width taper function $W_M(z)$] obtained by substituting the decided values into the expression (18) given hereinabove.

Since the exponential function tapered shape is defined in this manner and the MMI width is modulated with a predetermined taper function, the phase difference $\Delta\theta$ between a pair of second optical signals outputted from the 2:4 MMI coupler 2D becomes $\pi/2+p^*\pi$ (p is an integer). Therefore, the present optical hybrid circuit 1X outputs a pair of first optical signals (S−L and S+L) having an in-phase relationship with each other and a pair of third optical signals (S−jL and S+jL) having a quadrature phase relationship with the pair of first optical signals, and 90-degree hybrid operation is obtained with certainty. In other words, QPSK signal light is converted into a pair of first optical signals which include only an in-phase component (I-component) and a pair of third optical signals which include only a quadrature phase component (Q-component) by the present optical hybrid circuit 1X, and 90-degree hybrid operation is obtained with certainty.

Here, the pair of first optical signals having an in-phase relationship with each other, that is, the pair of first optical signals which include only an in-phase component, are a pair of optical signals whose phases are displaced by 180 degrees from each other. Meanwhile, the pair of third optical signals having a quadrature phase relationship with the pair of first optical signals, that is, the pair of third optical signals which include only a quadrature phase component, are a pair of optical signals whose phases are displaced by 90 degrees from those of the pair of first optical signals. It is to be noted that the pair of third optical signals are a pair of optical signals whose phases are displaced by 180 degrees from each other.

It is to be noted that reference characters S−L, S+L, S+jL and S−jL in FIG. 39 indicate what relative relationship the phase of the LO light (L) has with reference to the phase of the signal light (S). Here, S−L and S+L indicate that they have a phase relationship displaced by 180 degrees from each other, and S+jL and S−jL have a phase relationship displaced by 90 degrees with respect to S+L and S−L, respectively.

It is to be noted that, since details of the other part are similar to those of the second embodiment and the modifications [refer to, for example, FIGS. 31 to 35] described hereinabove, overlapping description of them is omitted herein.

Accordingly, the optical hybrid circuit according to the present embodiment is advantageous in that it exhibits a low wavelength dependency, a low phase displacement characteristic and low insertion loss and a 90-degree hybrid suitable for compactness and monolithic integration can be implemented similarly to the second embodiment described hereinabove.

Further, since an intersecting portion of optical waveguides which cannot be avoided with the conventional 90-degree hybrid [refer to FIG. 50A] which uses a 4:4 MMI coupler is not required, there is an advantage also in that excessive loss can be suppressed to the minimum. Further, since the phase relationship of the four output signals can be made similar to that of the conventional 90-degree hybrid [refer to FIGS. 48A and 49A], the optical hybrid circuit according to the present embodiment is superior also in compatibility with 90-degree hybrids which are used in coherent optical receivers, coherent detection systems and so forth at present.

It is to be noted that the taper function which defines the taper face of 2:4 MMI coupler which composes the optical hybrid circuit 1X according to the second to fourth embodiments described above must be defined only such that the phase difference between a pair of first optical signals or between a pair of second optical signals becomes $\pi/2 + p \cdot \pi$ (p is an integer). Therefore, the tapered shape of the 2:4 MMI coupler is not limited to any of the liner function tapered shape in the second embodiment, the square function tapered shape in the third embodiment and the exponential function tapered shape in the fourth embodiment, but, for example, a square root function tapered shape, a sine wave function tapered shape or a tapered shape of a combination of any ones of the functions may be used.

Fifth Embodiment

Now, an optical receiver, an optical transceiver and an optical reception method according to a fifth embodiment are described with reference to FIG. 42.

The optical receiver according to the present embodiment is a coherent optical receiver 20 which includes the optical hybrid circuit 1 of any of the first embodiment and the modifications to the first embodiment [90-degree hybrid for a QPSK signal: refer to FIGS. 1A, 3A and 16 to 21B]. The coherent optical receiver 20 converts an optical signal identified by the 90-degree hybrid 1 and carries out a digital signal processing.

Figure 42:
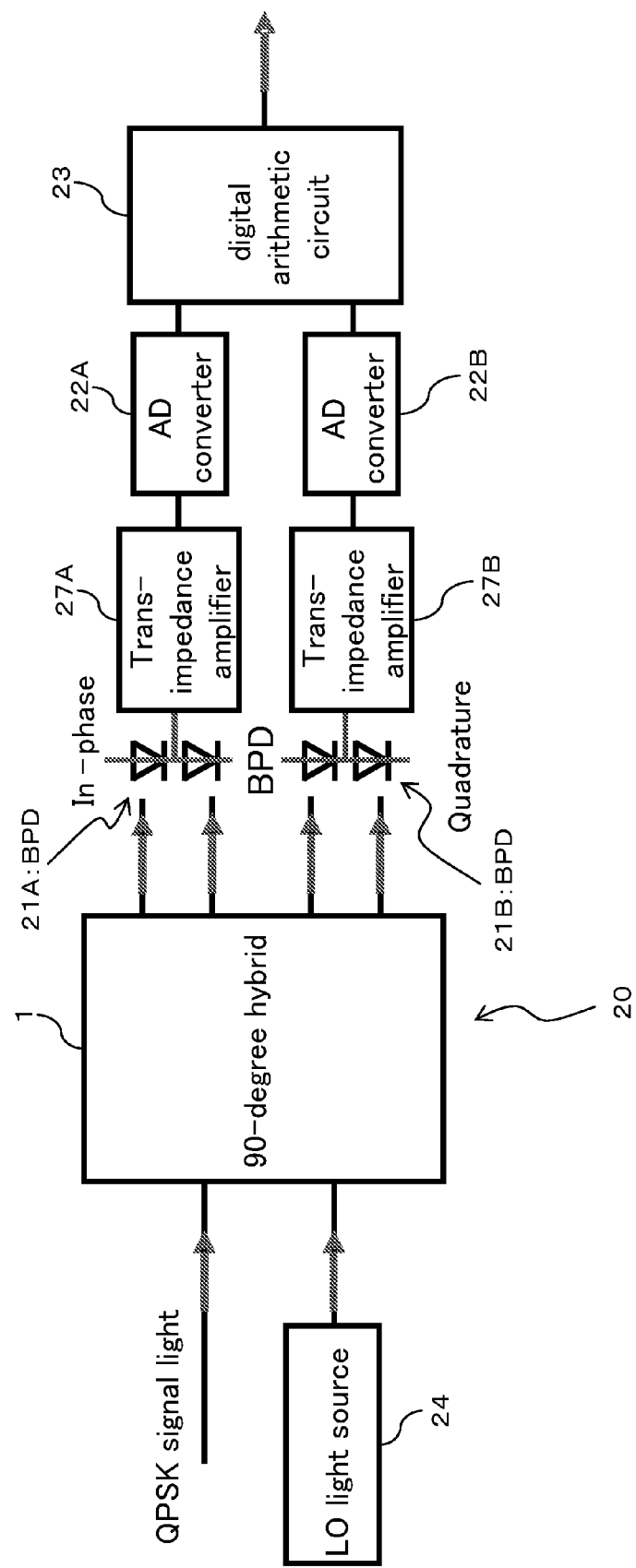
FIG. 42 is a schematic view illustrating a configuration of an optical receiver according to a fifth embodiment.

To this end, the present coherent optical receiver 20 includes, as illustrated in FIG. 42, the optical hybrid circuit 1 of the first embodiment described hereinabove, a pair of photodiodes (photoelectric conversion sections) 21A and 21B, a pair of trans-impedance amplifier (TIA) 27A, 27B, a pair of AD conversion circuits (AD conversion sections) 22A and 22B, and a digital arithmetic circuit (digital arithmetic section) 23.

Here, the present optical hybrid circuit 1 includes an MMI coupler 2 for converting QPSK signal light into a pair of first optical signals having an in-phase relationship with each other and a pair of second optical signals having an in-phase relationship with each other, and an optical coupler 3 for converting the first optical signals or the second optical signals into a pair of third optical signals having a quadrature phase relationship with the first or second optical signals [refer to FIGS. 1A, 3A and 16 to 21(B)].

Here, the MMI coupler 2 is a 2:4 MMI coupler. Meanwhile, the optical coupler 3 is a 2:2 MMI coupler. The optical hybrid circuit 1 is formed from an optical semiconductor device.

In the present embodiment, QPSK signal light is inputted to one of channels on the input side of the 2:4 MMI coupler 2 of the optical hybrid circuit 1 and LO light is inputted to the other channel on the input side of the 2:4 MMI coupler 2 as illustrated in FIG. 42. In other words, the one channel on the input side of the 2:4 MMI coupler 2 of the optical hybrid circuit 1 is a channel for inputting QPSK signal light. Meanwhile, the other channel on the input side of the 2:4 MMI coupler 2 of the optical hybrid circuit 1 is a channel for inputting LO light.

Therefore, the coherent optical receiver 20 further includes a local oscillation light generation section (LO light source) 24 for inputting LO light to the other channel on the input side of the 2:4 MMI coupler 2 of the optical hybrid circuit 1.

Thus, if QPSK signal light (QPSK signal pulse) and LO light synchronized in time with the QPSK signal light are inputted to the optical hybrid circuit 1, then one of output forms having different branching rations from each other is obtained in response to the relative phase difference $\Delta\phi$ between the QPSK signal light and the LO light. Here, where the relative phase difference $\Delta\phi$ is 0, $\pi$, $-\pi/2$ and $+\pi/2$, the output intensity ratio of the optical hybrid circuit 1 is 0:2:1:1, 2:0:1:1, 1:1:2:0 and 1:1:0:2 [refer to FIGS. 9A to 9D], respectively.

The photodiodes 21A and 21B are photodiodes for photoelectrically converting pairs of optical signals outputted from the multimode interference coupler 2 and the optical coupler 3 of the optical hybrid circuit 1 into analog electric signals (analog current signals).

Here, for photoelectric conversion and signal demodulation, the differential photodiodes (BPDs) 21A and 21B are provided at the succeeding stage of the optical hybrid circuit 1. Here, each of the BPDs 21A and 21B includes two photodiodes (PDs). If an optical signal is inputted only to one of the PDs in each of the BPDs 21A and 21B, then current corresponding to "1" flows, but if an optical signal is inputted only to the other PD, current corresponding to "−1" flows. However, if an optical signal is inputted to both of the PDs simultaneously, then no current flows.

Therefore, if optical signals having different output intensity ratios are inputted from the optical hybrid circuit 1 to the two BPDs 21A and 21B in response to the relative phase difference $\Delta\phi$, then electric signals of different patterns are outputted from the two BPDs 21A and 21B. In particular, phase information of the QPSK signal light is identified and converted into electric signals of different patterns by the two BPDs 21A and 21B.

In particular, the first BPD 21A is connected to the first and second channels on the output side of the optical hybrid circuit 1, and the second BPD 21B is connected to the third and fourth channels on the output side of the optical hybrid circuit 1. In other words, the first BPD 21A is connected to the first and second channels (a pair of first output channels neighboring with each other) from which a pair of first optical signals having an in-phase relationship with each other are outputted, and the second BPD 21B is connected to the third and fourth channels (a pair of second output channels neighboring with each other) to which a pair of second optical signals having an in-phase relationship with each other (but having a quadrature phase relationship with the first optical signals) are outputted.

Trans-impedance amplifiers 27A and 27B are provided between the photodiodes 21A and 21B and the AD conversion circuits 22A and 22B, respectively. More specifically, the trans-impedance amplifiers 27A and 27B are connected to the photodiodes 21A and 21B, and to the AD conversion circuits 22A and 22B. The trans-impedance amplifiers 27A and 27B are adapted to convert the analog current signals output from the photodiodes 21A and 21B into analog voltage signals (analog electric signals).

The AD conversion circuits 22A and 22B are AD conversion circuits that convert the analog electric signals that are output from the photodiodes 21A and 21B and then undergo the conversion at the trans-impedance amplifiers 27A and 27B, into digital electric signals. More specifically, the AD conversion circuits 22A and 22B are adapted to convert the analog electric signals that are output from the trans-impedance amplifiers 27A and 27B, into digital electric signals.

The digital arithmetic circuit 23 is a digital arithmetic circuit (digital signal processing circuit) which uses the digital electric signals outputted from the AD conversion circuits 22A and 22B to execute an arithmetic operation for estimating information of reception signal light.

Since the present optical receiver 20 is configured in such a manner as described above, it receives an optical signal in the following manner (light receiving method).

In particular, the multimode interference coupler (here the 2:4 MMI coupler 2) of the optical hybrid circuit 1 is used to convert QPSK signal light into a pair of first optical signals having an in-phase relationship with each other and a pair of second optical signals having an in-phase relationship with each other. Then, the optical coupler (here the 2:2 MMI coupler 3) is used to convert the first optical signals or the second optical signals into a pair of third optical signals having a quadrature phase relationship with the first or second optical signals. Then, the first optical signals or second optical signals and the third optical signals are received.

It is to be noted that, since details of the optical hybrid circuit 1 are similar to those of the first embodiment and the modifications to the first embodiment described hereinabove, description of the same is omitted here.

Accordingly, the optical receiver according to the present embodiment is advantageous in that it exhibits a low wavelength dependency, a low phase displacement characteristic and low insertion loss and a 90-degree hybrid suitable for compactioness and monolithic integration can be implemented.

Figure 43:
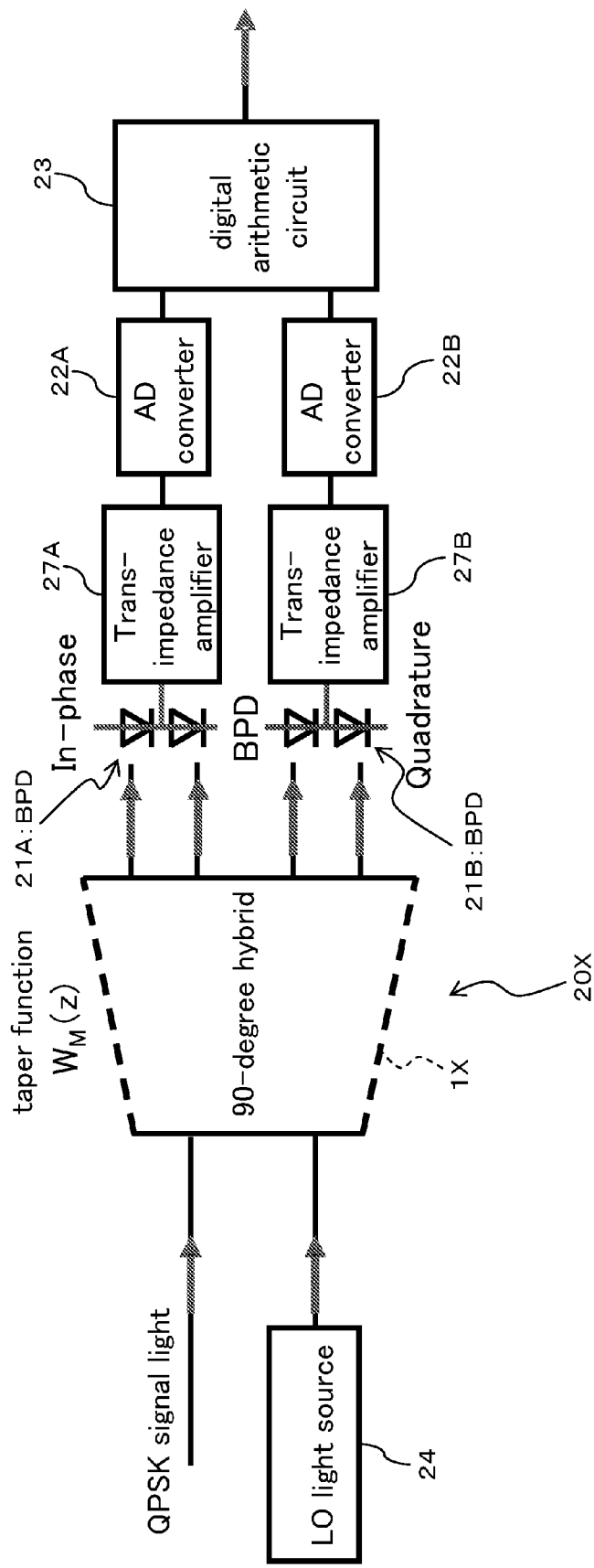
FIG. 43 is a schematic view illustrating a configuration of an optical receiver according to a modification to the fifth embodiment.

It is to be noted that, while, in the description of the embodiment and the modifications described hereinabove, the optical receiver is described taking an optical receiver including any of the optical hybrid circuits of the first embodiment and the modifications to the first embodiment described above as an example, the optical receiver is not limited to this. For example, the optical receiver may be configured as an optical receiver 20X which includes one of the optical hybrid circuits 1X of the second to fourth embodiments and the modifications to them described hereinabove as illustrated in FIG. 43. It is to be noted that, in FIG. 43, like elements to those of the embodiment described above [refer to FIG. 42] are denoted by like reference characters.

Further, while the description of the embodiment and the modifications described above is given taking an optical receiver as an example, the optical receiver is not limited to this, but also it is possible to configure an optical transceiver which includes the configuration of the optical receiver of the embodiment described hereinabove.

Further, while, in the embodiments and the modifications described above, the optical hybrid circuit 1 or 1X is formed from an optical semiconductor device which includes the MMI coupler 2, 2A, 2B, 2C or 2D and the optical coupler 3, it is not limited to this. For example, the optical semiconductor device which includes the MMI coupler 2, 2A, 2B, 2C or 2D and the optical coupler 3 may additionally include photodiodes (here BPDs) 21A and 21B integrated therein. In short, the MMI coupler 2, 2A, 2B, 2C or 2D, the optical coupler 3 and the photodiodes 21A and 21B (here the BPDs) may be monolithically integrated.

Sixth Embodiment

Now, an optical hybrid circuit according to a sixth embodiment is described with reference to FIG. 44.

The optical hybrid circuit according to the present embodiment is different from that of the first embodiment described hereinabove in that, while, in the optical hybrid circuit of the first embodiment, QPSK signal light and LO light are inputted in a synchronized relationship with each other in time, in the optical hybrid circuit according to the present embodiment, a differential quadrature phase shift keying (DQPSK) signal is inputted.

In particular, the present optical hybrid circuit is a 90-degree hybrid circuit (hereinafter referred to also as 90-degree hybrid) used for identification of phase modulation information of a DQPSK signal in an optical transmission system.

Figure 44:
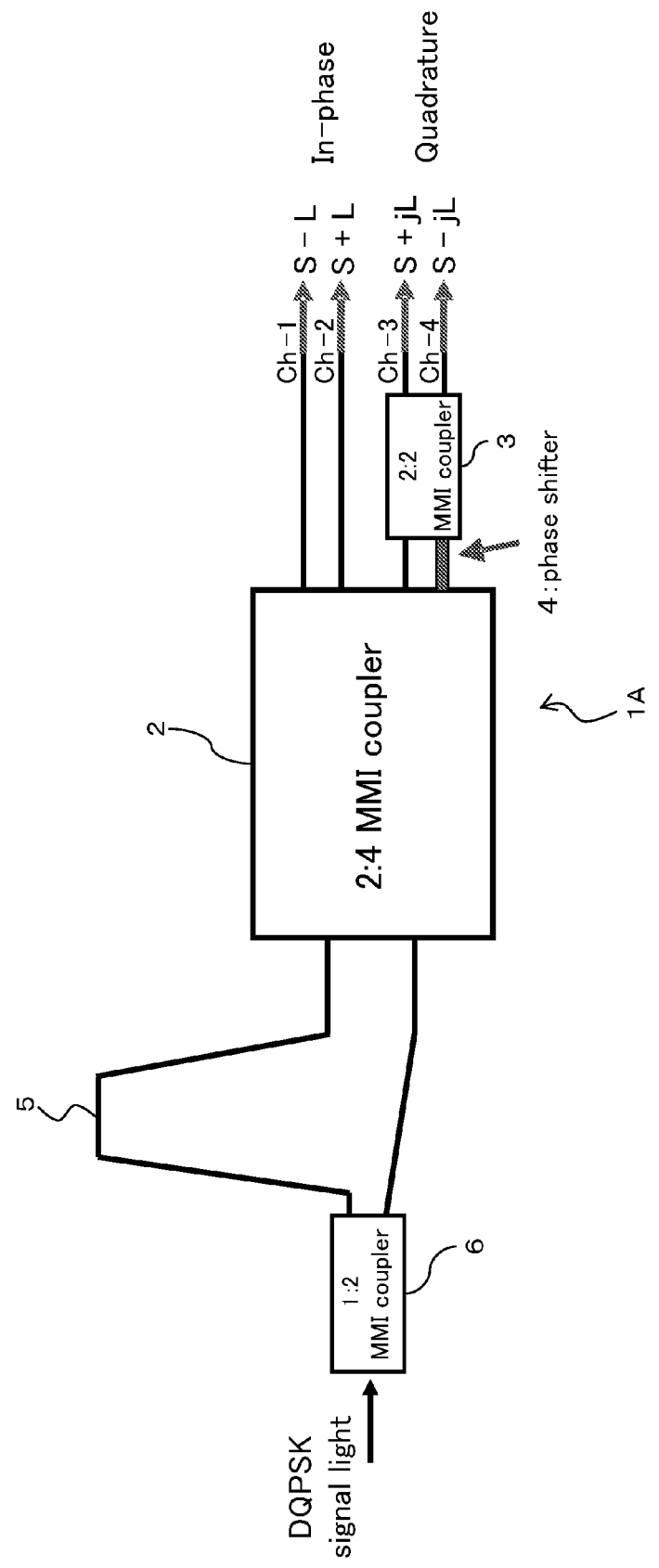
FIG. 44 is a schematic view illustrating a configuration of an optical hybrid circuit according to a sixth embodiment.

To this end, as illustrated in FIG. 44, the present optical hybrid circuit 1A includes, in addition to the configuration of the optical hybrid circuit 1 of the first embodiment described hereinabove, a light delay circuit 5, and a 1:2 optical coupler 6 having one channel on the input side thereof and having two channels on the output side thereof. In other words, the present optical hybrid circuit 1A is configured such that the 1:2 optical coupler 6 is connected in a cascade connection at the preceding stage (front end portion) of the 2:4 MMI coupler 2 included in the optical hybrid circuit 1 of the first embodiment described hereinabove through the light delay circuit 5. It is to be noted that, similarly to the first embodiment described hereinabove, the optical hybrid circuit 1 is formed from an optical semiconductor device which includes the MMI coupler 2 and the optical coupler 3. It is to be noted that, in FIG. 44, like elements to those of the embodiment described above [refer to FIG. 1A] are denoted by like reference characters.

Here, the light delay circuit 5 is connected to one of the channels on the input side of the 2:4 MMI coupler 2 included in the optical hybrid circuit 1 of the first embodiment described hereinabove.

The 1:2 optical coupler 6 is connected to the light delay circuit 5 and the other channel on the input side of the 2:4 MMI coupler 2. Here, the 1:2 optical coupler 6 is a 1:2 MMI coupler.

In particular, the length of one waveguide which connects one of the input channels of the 2:4 MMI coupler 2 and one of the output channels of the 1:2 optical coupler 6 to each other is set greater than the length of the other optical waveguide which connects the other input channel of the 2:4 MMI coupler 2 and the other output channels of the 1:2 optical coupler 6 to each other.

In particular, the two optical waveguides (arms) which connect the two input ports of the 2:4 MMI coupler 2 and the two output ports of the 1:2 MMI coupler 6 to each other are different in length (optical path length) from each other.

Here, the length of one of the optical waveguides is made longer to provide an optical path length difference which corresponds to delay of one bit of a DQPSK signal pulse. To this end, the light delay circuit 5 is one of the optical waveguides which is connected to one of the input channels of the 2:4 MMI coupler 2 includes in the optical hybrid circuit 1 of the first embodiment described hereinabove.

Thus, DQPSK signal light is inputted to the channel on the input side of the 1:2 MMI coupler 6. Therefore, the channel on the input side of the 1:2 MMI coupler 6 is an input channel for inputting DQPSK signal light. The DQPSK signal is branched into two paths through the 1:2 MMI coupler 6, and one of the branched DQPSK signal lights is delayed by one bit by the light delay circuit 5. Then, the two DQPSK signal lights are inputted to the 2:4 MMI coupler 2 in synchronism with each other in time. In this instance, the relative phase difference between the DQPSK signal lights individually inputted to the two input channels of the 2:4 MMI coupler 2 is any one of the four kinds of the relative phase difference $\Delta\phi$ described hereinabove in connection with the first embodiment (refer to FIGS. 9A to 9D). Therefore, output forms having different branching ratios from each other are obtained by the circuit configuration including the 2:4 MMI coupler and the succeeding circuit elements similar to those of the first embodiment described hereinabove. Accordingly, also the optical hybrid circuit 1A functions as a 90-degree hybrid similarly as in the case of the first embodiment described hereinabove.

It is to be noted that, since details of the other part are similar to those of the first embodiment described hereinabove, overlapping description of them is omitted herein. Here, when the first embodiment described hereinabove is applied to the present embodiment, two DQPSK signal lights having a relative phase difference $\Delta\phi$ maybe applied in place of the QPSK signal light and the LO light.

Accordingly, the optical hybrid circuit according to the present embodiment is advantageous in that it exhibits a low wavelength dependency, a low phase displacement characteristic and low insertion loss and a 90-degree hybrid suitable for compactness and monolithic integration can be implemented similarly as in the first embodiment described hereinabove.

Further, since an intersecting portion of optical waveguides which cannot be avoided with the conventional 90-degree hybrid [refer to FIG. 50A] which uses a 4:4 MMI coupler is not required, there is an advantage also in that excessive loss can be suppressed to the minimum. Further, since the phase relationship of the four output signals can be made similar to that of the conventional 90-degree hybrid [refer to FIGS. 48A and 49A], the optical hybrid circuit according to the present embodiment is superior also in compatibility with 90-degree hybrids which are used in coherent optical receivers, coherent detection systems and so forth at present.

It is to be noted that, while, in the embodiment described above, a 1:2 MMI coupler is used as the 1:2 optical coupler 6 provided at the preceding stage to the 2:4 MMI coupler 2, the 1:2 optical coupler 6 is not limited to this. For example, it is possible to use a Y branching coupler, a 2:2 directional coupler or the like in place of the 1:2 MMI coupler. Also in this instance, 90-degree hybrid operation can be obtained similarly as in the case of the embodiment described above.

Further, while, in the embodiment described above, the optical hybrid circuit 1A is configured such that it includes an optical semiconductor device which includes the MMI coupler 2 and the optical coupler 3 similarly as in the first embodiment described hereinabove, the optical hybrid circuit 1A is not limited to this. For example, the optical hybrid circuit 1A may otherwise be formed from an optical semiconductor device which includes an MMI coupler 2, an optical coupler 3, a light delay circuit 5 and a 1:2 optical coupler 6.

Further, the modifications [refer to FIG. 3A and FIGS. 16 to 21B] to the first embodiment described hereinabove can be applied also to the optical hybrid circuit according to the present embodiment.

Figure 45:
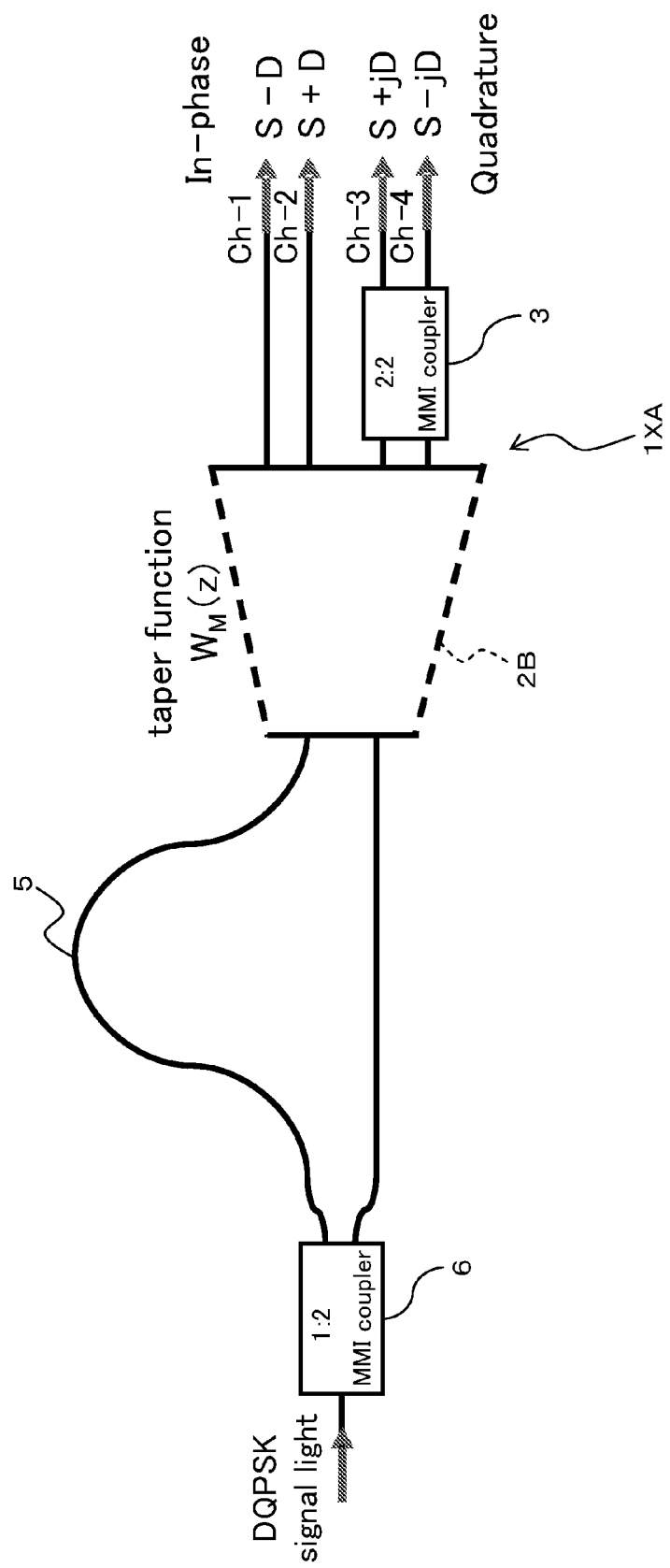
FIG. 45 is a schematic view illustrating a configuration of an optical hybrid circuit according to a modification to the sixth embodiment.

Further, while the optical hybrid circuit in the embodiment described hereinabove includes the optical hybrid circuit of the first embodiment described hereinabove and is a modification to the first embodiment, it may otherwise include any of the optical hybrid circuits of the second to fourth embodiments described above such that it is a modification to the same as illustrated in FIG. 45. In particular, the optical hybrid circuit 1XA includes, in addition to the configuration of the optical hybrid circuit 1X of any of the second to fourth embodiments described above, a light delay circuit 5 and a 1:2 optical coupler 6 which has one channel on the input side thereof and has two channels on the output side thereof. Further, the modifications to the second embodiment described hereinabove (refer to, for example, FIGS. 31 to 35) and the modifications to the third and fourth embodiments can be applied similarly also to the present embodiment.

Seventh Embodiment

Figure 46:
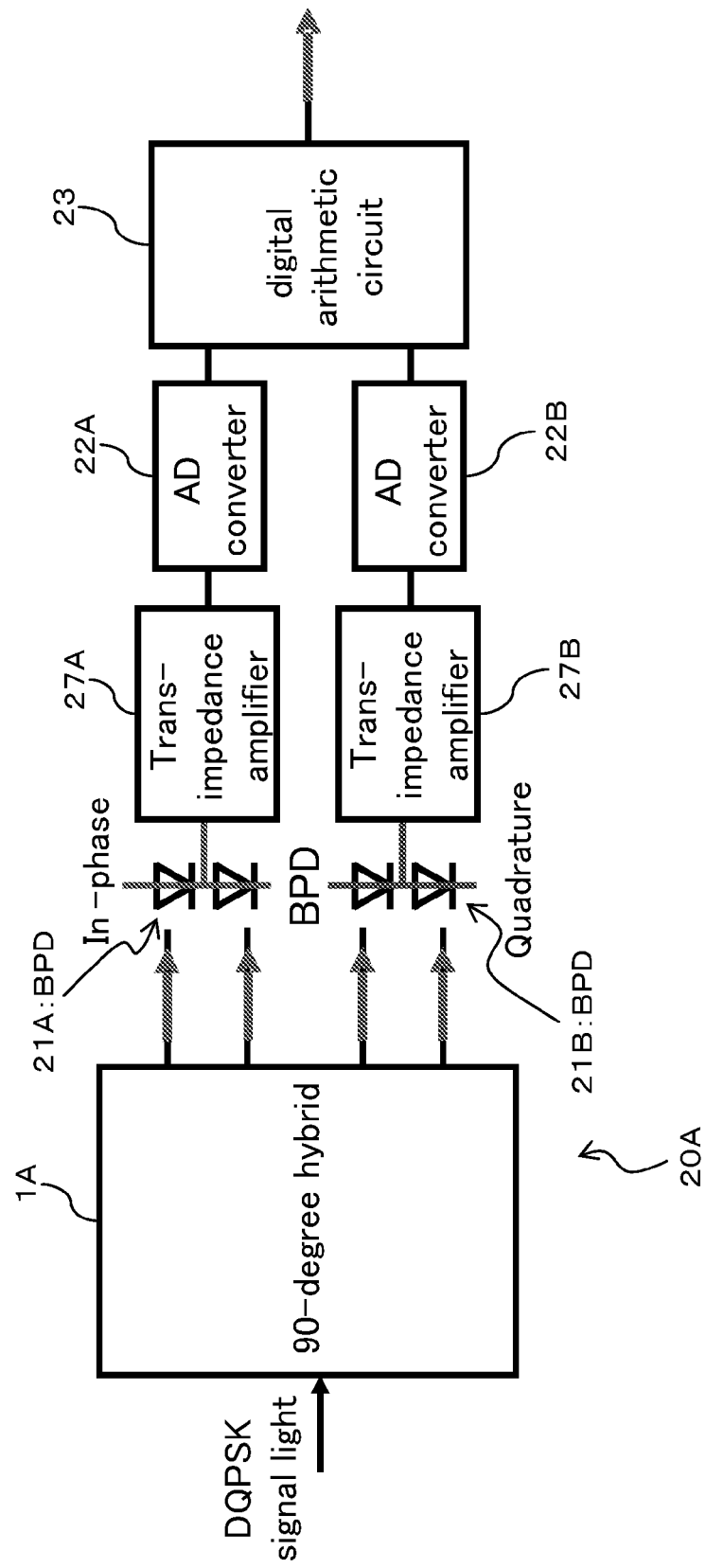
FIG. 46 is a schematic view illustrating a configuration of an optical receiver according to a seventh embodiment.
Figure 47:
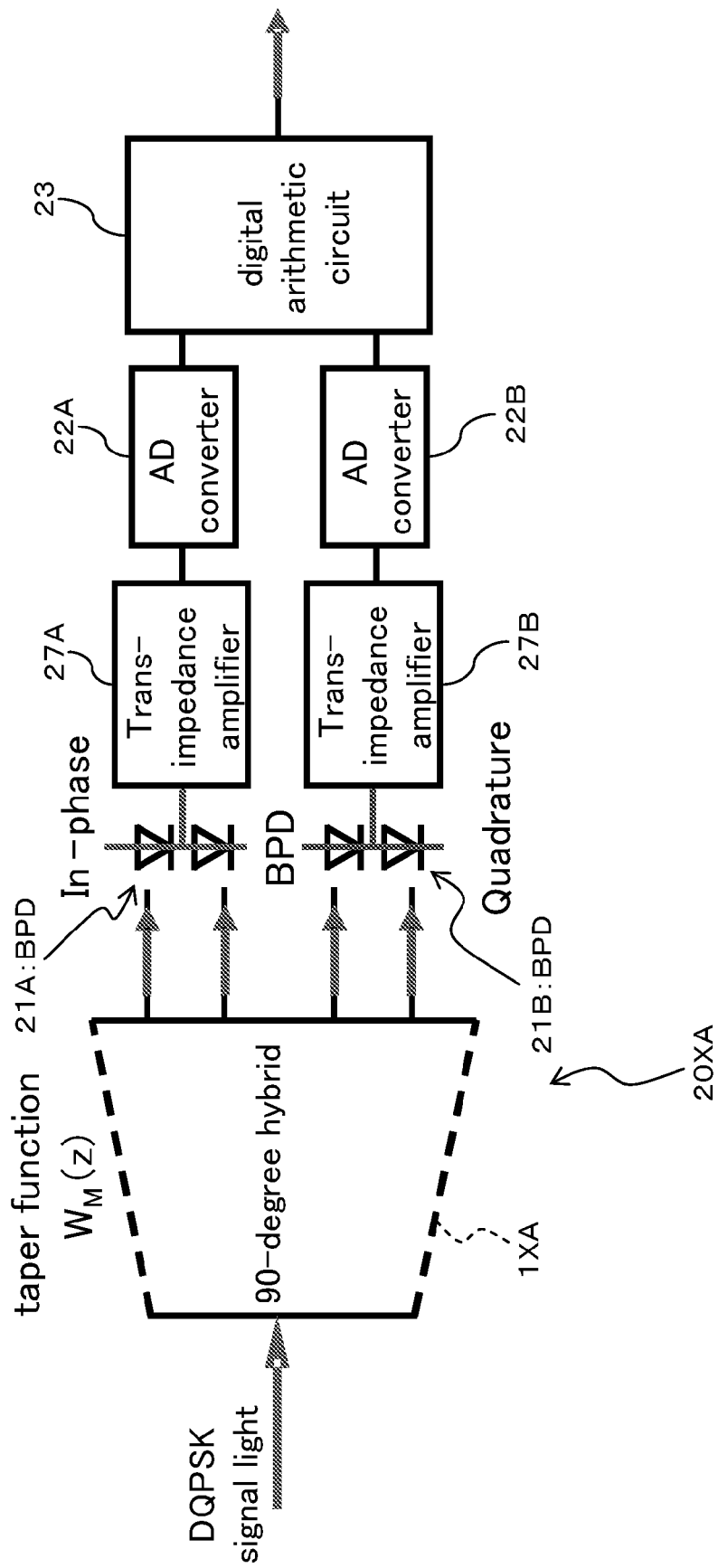
FIG. 47 is a schematic view illustrating a configuration of an optical receiver according to a modification to the seventh embodiment.

Now, an optical receiver, an optical transceiver and a light receiving method according to a seventh embodiment are described with reference to FIGS. 46 and 47.

The optical receiver according to the present embodiment is a coherent optical receiver 20A or 20XA including the optical hybrid circuit 1A or 1XA (90-degree hybrid for a DQPSK signal; refer to FIGS. 44, 45, 3 and 17 to 21B) of any of the sixth embodiment and the modifications to the sixth embodiment described above as illustrated in FIG. 46 or 47. The coherent optical receiver 20A or 20XA converts an optical signal identified by the optical hybrid circuit 1A or 1XA into electric signals and carries out a digital signal process.

To this end, the optical receiver 20A or 20XA includes the optical hybrid circuit 1A or 1XA of the sixth embodiment and the modifications to the sixth embodiment described hereinabove, the photodiodes (photoelectric conversion sections) 21A and 21B, the trans-impedance amplifier (TIA) 27A, 27B, the AD conversion circuits (AD conversion sections) 22A and 22B, and the digital arithmetic circuit (digital arithmetic section) 23.

It is to be noted that details of the optical hybrid circuit are similar to those of the sixth embodiment and the modifications to the sixth embodiment described hereinabove [refer to FIGS. 44, 45, 3A and 16 to 21B], and therefore, overlapping description of them is omitted herein. Further, since the configuration and the light receiving method of the photodiodes 21A and 21B, the trans-impedance amplifier (TIA) 27A, 27B, AD conversion circuits 22A and 22B and digital arithmetic circuit 23 are similar to that of the fifth embodiment and the modification to the fifth embodiment described above (FIGS. 42 and 43), overlapping description of them is omitted herein. However, the optical receiver 20A does not include a local oscillation light generation section. Here, when it is tried to apply the fifth embodiment and the modification to the fifth embodiment described above to the present embodiment, two DQPSK signal lights having relative phase difference $\Delta\phi$ may be applied in place of the QPSK signal light and the LO light. It is to be noted that, in FIGS. 46 and 47, like elements to those of the fifth embodiment [refer to FIG. 42] and the sixth embodiment [refer to FIG. 44] described hereinabove are denoted by like reference characters.

Accordingly, the optical receiver according to the present embodiment described above is advantageous in that it exhibits a low wavelength dependency, a low phase displacement characteristic and low insertion loss and an optical receiver including a 90-degree hybrid suitable for compactness and monolithic integration can be implemented.

It is to be noted that, while the foregoing description of the embodiment described above is given taking an optical receiver as an example, the application of the invention is not limited to this, and also it is possible to form an optical transceiver which includes the components of the optical receiver of the embodiment described above similarly to the modification to the fifth embodiment described hereinabove.

Further, while, in the embodiment described above, the optical hybrid circuit 1A or 1XA is formed from an optical semiconductor device which includes an MMI coupler 2, 2A, 2B, 2C or 2D and an optical coupler 3 (refer to the sixth embodiment), it is not limited to this. For example, the photodiodes (here, BPDs) 21A and 21B may be integrated in the optical semiconductor device which includes the MMI coupler 2, 2A, 2B, 2C or 2D and the optical coupler 3. In other words, an MMI coupler 2, 2A, 2B, 2C or 2D, an optical coupler 3 and photodiodes (here, BPDs) 21A and 21B may be monolithically integrated.

Further, while the optical hybrid circuit 1A or 1XA in the embodiment described above is formed from an optical semiconductor device which includes an MMI coupler 2, 2A, 2B, 2C or 2D, an optical coupler 3, an light delay circuit 5 and a 1:2 optical coupler 6 (refer to the modification to the sixth embodiment), it is not limited to this. For example, the photodiodes (here, BPDs) 21A and 21B may be integrated with the optical semiconductor device which includes an MMI coupler 2, 2A, 2B, 2C or 2D, an optical coupler 3, an light delay circuit 5 and a 1:2 optical coupler 6. In other words, an MMI coupler 2, 2A, 2B, 2C or 2D, an optical coupler 3, an light delay circuit 5, a 1:2 optical coupler 6 and photodiodes (here, BPDs) 21A and 21B may be monolithically integrated.

[Others]

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. An optical hybrid circuit comprising:
a multimode interference coupler including a pair of input channels provided at positions symmetrical with each other with respect to a center position in a widthwise direction thereof, a pair of first output channels neighboring with each other for outputting a pair of first optical signals having an in-phase relationship with each other, and a pair of second output channels neighboring with each other for outputting a pair of second optical signals having an in-phase relationship with each other, the multimode interference coupler being adapted to convert quadrature phase shift keying signal light or differential quadrature phase shift keying signal light into the pair of first optical signals having an in-phase relationship with each other and the pair of second optical signals having an in-phase relationship with each other; and
a 2:2 optical coupler connected to the first output channels or the second output channels and having two channels on the input side and two channels on the output side, the 2:2 optical coupler being adapted to convert the pair of first optical signals or the pair of second optical signals into a pair of third optical signals having a quadrature phase relationship with the pair of first or second optical signals.

2. The optical hybrid circuit according to claim 1, wherein one of the pair of first output channels or one of the pair of second output channels to which the 2:2 optical coupler is connected includes a phase controlling region.

3. The optical hybrid circuit according to claim 2, wherein the phase controlling region is a region in which a phase of one of the pair of first output signals or a phase of one of the pair of second output signals is controlled so that the phase difference between the pair of first optical signals or the phase difference between the pair of second optical signals becomes equal to $\pi/2+p*\pi$, p being an integer.

4. The optical hybrid circuit according to claim 1, wherein the multimode interference coupler is a 2:4 multimode interference coupler which has two channels on the input side thereof and has four channels on the output side thereof.

5. The optical hybrid circuit according to claim 4, wherein the 2:4 multimode interference coupler is a 2:4 multimode interference coupler based on paired interference.

6. The optical hybrid circuit according to claim 1, wherein the multimode interference coupler is a 4:4 multimode interference coupler which has four channels on the input side thereof and has four channels on the output side thereof, and two of the four channels on the input side which are provided at symmetrical positions with respect to the center position in the widthwise direction are input channels for inputting light.

7. The optical hybrid circuit according to claim 1, wherein one of the channels on the input side of the multimode interference coupler is an input channel for inputting quadrature phase shift keying signal light, and
the other channel on the input side of the multimode interference coupler is an input channel for inputting local oscillation light.

8. The optical hybrid circuit according to claim 1, further comprising:
a light delay circuit connected one of the channels on the input side of the multimode interference coupler; and
a 1:2 optical coupler connected to the light delay circuit and the other channel on the input side of the multimode interference coupler and having one channel on the input side and two channels on the output side; and wherein
the channel on the input side of the 1:2 optical coupler is an input channel for inputting differential quadrature phase shift keying signal light.

9. An optical hybrid circuit comprising:
a multimode interference coupler including a pair of input channels provided at positions symmetrical with each other with respect to a center position in a widthwise direction thereof, a pair of first output channels neighboring with each other for outputting a pair of first optical signals having an in-phase relationship with each other, and a pair of second output channels neighboring with each other for outputting a pair of second optical signals having an in-phase relationship with each other, the multimode interference coupler being adapted to convert quadrature phase shift keying signal light or differential quadrature phase shift keying signal light into the pair of first optical signals having an in-phase relationship with each other and the pair of second optical signals having an in-phase relationship with each other; and
a 2:2 optical coupler connected to the first output channels or the second output channels and having two channels on the input side and two channels on the output side, the 2:2 optical coupler being adapted to convert the pair of first optical signals or the pair of second optical signals into a pair of third optical signals having a quadrature phase relationship with the pair of first or second optical signals;

the multimode interference coupler having an input end of a first width and an output end of a second width different from the first width such that a phase difference between the pair of first optical signals or a phase difference between the pair of second optical signals becomes equal to π/2+p*π, p being an integer.

10. The optical hybrid circuit according to claim 9, wherein the multimode interference coupler has a shape in which the width thereof varies in a tapered manner in a propagation direction.

11. The optical hybrid circuit according to claim 9, wherein the multimode interference coupler has a tapered shape represented by a linear function, a tapered shape represented by a square function, a tapered shape represented by an exponential function, a tapered shape represented by a square root function, a tampered shape represented by a sine wave function or a tapered shape represented by a combination of any ones of the functions.

12. The optical hybrid circuit according to claim 9, wherein the multimode interference coupler and the 2:2 optical coupler are connected directly to each other.

13. The optical hybrid circuit according to claim 9, wherein the multimode interference coupler is a 2:4 multimode interference coupler which has two channels on the input side thereof and has four channels on the output side thereof.

14. The optical hybrid circuit according to claim 9, wherein the multimode interference coupler is a 4:4 multimode interference coupler which has four channels on the input side thereof and has four channels on the output side thereof, and two of the four channels on the input side which are provided at symmetrical positions with respect to the center position in the widthwise direction are input channels for inputting light.

15. The optical hybrid circuit according to claim 9, wherein one of the channels on the input side of the multimode interference coupler is an input channel for inputting quadrature phase shift keying signal light, and the other channel on the input side of the multimode interference coupler is an input channel for inputting local oscillation light.

16. The optical hybrid circuit according to claim 9, further comprising:

a light delay circuit connected one of the channels on the input side of the multimode interference coupler; and a 1:2 optical coupler connected to the light delay circuit and the other channel on the input side of the multimode interference coupler and having one channel on the input side and two channels on the output side; and wherein the channel on the input side of the 1:2 optical coupler is an input channel for inputting differential quadrature phase shift keying signal light.

17. An optical receiver comprising:

a multimode interference coupler including a pair of input channels provided at positions symmetrical with each other with respect to a center position in a widthwise direction thereof, a pair of first output channels neighboring with each other for outputting a pair of first optical signals having an in-phase relationship with each other, and a pair of second output channels neighboring with each other for outputting a pair of second optical signals having an in-phase relationship with each other, the multimode interference coupler being adapted to convert quadrature phase shift keying signal light or differential quadrature phase shift keying signal light into the pair of first optical signals having an in-phase relationship with each other and the pair of second optical signals having an in-phase relationship with each other, and a 2:2 optical coupler connected to the first output channels or the second output channels and having two channels on the input side and two channels on the output side, the 2:2 optical coupler being adapted to convert the pair of first optical signals or the pair of second optical signals into a pair of third optical signals having a quadrature phase relationship with the pair of first or second optical signals;

a photodiode adapted to convert the first optical signals or the second optical signals outputted from the multimode interference coupler and the third optical signals outputted from the 2:2 optical coupler into an analog electric signal;

an analog-digital conversion circuit adapted to convert the analog electric signal outputted from the photodiode into a digital electric signal; and a digital arithmetic circuit adapted to execute a arithmetic processing using the digital electric signal outputted from the analog-digital conversion circuit.

18. An optical receiver comprising:

an optical hybrid circuit including a multimode interference coupler including a pair of input channels provided at positions symmetrical with each other with respect to a center position in a widthwise direction thereof, a pair of first output channels neighboring with each other for outputting a pair of first optical signals having an in-phase relationship with each other, and a pair of second output channels neighboring with each other for outputting a pair of second optical signals having an in-phase relationship with each other, the multimode interference coupler being adapted to convert quadrature phase shift keying signal light or differential quadrature phase shift keying signal light into the pair of first optical signals having an in-phase relationship with each other and the pair of second optical signals having an in-phase relationship with each other, and a 2:2 optical coupler connected to the first output channels or the second output channels and having two channels on the input side and two channels on the output side, the 2:2 optical coupler being adapted to convert the pair of first optical signals or the pair of second optical signals into a pair of third optical signals having a quadrature phase relationship with the pair of first or second optical signals, the multimode interference coupler having an input end of a first width and an output end of a second width different from the first width such that a phase difference between the pair of first optical signals or a phase difference between the pair of second optical signals becomes equal to π/2+p*π, p being an integer;

a photodiode adapted to convert the first optical signals or the second optical signals outputted from the multimode interference coupler and the third optical signals outputted from the 2:2 optical coupler into an analog electric signal;

an analog-digital conversion circuit adapted to convert the analog electric signal outputted from the photodiode into a digital electric signal; and a digital arithmetic circuit adapted to execute arithmetic processing using the digital electric signal outputted from the analog-digital conversion circuit.

19. A light receiving method comprising:

converting, using a multimode interference coupler including a pair of input channels provided at positions symmetrical with each other with respect to a center position in a widthwise direction thereof, a pair of first output channels neighboring with each other for outputting a pair of first optical signals having an in-phase relationship with each other, and a pair of second output channels neighboring with each other for outputting a pair of second optical signals having an in-phase relationship with each other, quadrature phase shift keying signal light or differential quadrature phase shift keying signal light into the pair of first optical signals having an in-phase relationship with each other and the pair of second optical signals having an in-phase relationship with each other;

converting, using a 2:2 optical coupler connected to the first output channels or the second output channels and having two channels on the input side and two channels on the output side, the pair of first optical signals or the pair of second optical signals into a pair of third optical signals having a quadrature phase relationship with the pair of first or second optical signals; and receiving the first optical signals or the second optical signals and the third optical signals.

20. A light receiving method comprising:

converting, using a multimode interference coupler including a pair of input channels provided at positions symmetrical with each other with respect to a center position in a widthwise direction thereof, a pair of first output channels neighboring with each other for outputting a pair of first optical signals having an in-phase relationship with each other, and a pair of second output channels neighboring with each other for outputting a pair of second optical signals having an in-phase relationship with each other, quadrature phase shift keying signal light or differential quadrature phase shift keying signal light into the pair of first optical signals having an in-phase relationship with each other and the pair of second optical signals having an in-phase relationship with each other;

converting, using a 2:2 optical coupler connected to the first output channels or the second output channels and having two channels on the input side and two channels on the output side, the pair of first optical signals or the pair of second optical signals into a pair of third optical signals having a quadrature phase relationship with the pair of first or second optical signals;

receiving the first optical signals or the second optical signals and the third optical signals;

the multimode interference coupler having an input end of a first width and an output end of a second width different from the first width such that a phase difference between the pair of first optical signals or a phase difference between the pair of second optical signals becomes equal to $\pi/2 + p^*\pi$, p being an integer.

* * * * *